United States Patent
Liu

(10) Patent No.: US 9,558,595 B2
(45) Date of Patent: Jan. 31, 2017

(54) METHODS AND SYSTEMS FOR INTERSECTING DIGITAL IMAGES

(71) Applicant: ROSS VIDEO LIMITED, Iroquois, Ontario (CA)

(72) Inventor: Yu Liu, Kanata (CA)

(73) Assignee: Ross Video Limited, Iroquois (CA)

( * ) Notice: Subject to any disclaimer, the term of this patent is extended or adjusted under 35 U.S.C. 154(b) by 211 days.

(21) Appl. No.: 14/573,303

(22) Filed: Dec. 17, 2014

(65) Prior Publication Data

US 2016/0180600 A1  Jun. 23, 2016

(51) Int. Cl.
| | | |
|---|---|---|
| *G06T 15/00* | (2011.01) | |
| *G06T 19/20* | (2011.01) | |
| *G11B 27/00* | (2006.01) | |
| *G06T 7/00* | (2006.01) | |
| *G06T 15/50* | (2011.01) | |

(52) U.S. Cl.
CPC ............ *G06T 19/20* (2013.01); *G06T 7/00* (2013.01); *G06T 15/503* (2013.01); *G11B 27/00* (2013.01); *G06T 2210/21* (2013.01); *G06T 2219/2004* (2013.01)

(58) Field of Classification Search
None
See application file for complete search history.

(56) References Cited

U.S. PATENT DOCUMENTS

| | | | | |
|---|---|---|---|---|
| 2001/0055028 A1* | 12/2001 | Oka | .................... | G06T 11/001 345/629 |
| 2009/0135186 A1* | 5/2009 | Tsubota | ................ | H04N 5/265 345/442 |
| 2016/0005201 A1* | 1/2016 | Kunkel | .................. | H04N 9/67 345/589 |

OTHER PUBLICATIONS

Carpenter, Loren "The A-buffer, an Antialiased Hidden Surface Method", Computer Graphics, vol. 18, No. 3, Jul. 1984, pp. 103-108.
Haeberli, Paul et al. "The Accumulation Buffer: Hardware Support for High-Quality Rendering", Computer Graphics, vol. 24, No. 4, Aug. 1990, pp. 309-318.

* cited by examiner

*Primary Examiner* — Kee M Tung
*Assistant Examiner* — Frank Chen
(74) *Attorney, Agent, or Firm* — Nixon Peabody LLP; Jeffrey L. Costellia

(57) ABSTRACT

Methods and systems for providing an intersection effect are disclosed. For example, there is disclosed a method for intersecting a first digital image and a second digital image. In this method the first and second digital images are mixed to produce a first composite image in which the first digital image is layered on top of the second digital image. The first and second digital images are also mixed to produce a second composite image in which the second digital image is layered on top of the first digital image. The first composite image and the second composite image are then mixed using a wipe pattern to produce a target digital image that is the intersection of the first digital image and the second digital image. The wipe pattern is a function of a difference in depth between the first digital image and the second digital image.

20 Claims, 45 Drawing Sheets

METHODS AND SYSTEMS FOR INTERSECTING DIGITAL IMAGES

FIELD

The following relates to generating on a display the intersection of multiple digital videos and/or multiple digital images.

BACKGROUND

An intersection effect is an image or video processing technique in which multiple planar objects that each looks 3-D meet and cross each other in space.

For example, in digital video production, an intersection effect may be created in which a first video image and a second video image are each manipulated (e.g. shrunk and rotated to look 3-D), and then intersected.

In computer graphics applications, an intersection effect may also be created in which computer digital images are interested.

SUMMARY

Methods and systems for providing an intersection effect are disclosed herein.

For example, in one embodiment, there is provided a method of intersecting a first digital image and a second digital image. Specifically, the first and second digital images are mixed to produce a first composite image in which the first digital image is layered on top of the second digital image. The first and second digital images are also mixed to produce a second composite image in which the second digital image is layered on top of the first digital image. The first composite image and the second composite image are then mixed using a wipe pattern to produce a target digital image comprising the intersection of the first digital image and the second digital image. The wipe pattern is a function of a difference in depth between the first digital image and the second digital image.

The wipe pattern may include a set of values. The set of values may include one value for each pixel location of a plurality of pixel locations in the target digital image. In some of such embodiments, for a pixel location of the plurality of pixel locations in the target digital image, the wipe pattern has a value that is a function of a difference between a depth value associated with the first digital image at the pixel location and a depth value associated with the second digital image at the pixel location.

Mixing the first composite image and the second composite image using the wipe pattern could include: computing the difference between the depth value associated with the first digital image at the pixel location and the depth value associated with the second digital image at the pixel location to obtain a depth difference value; and as a function of the depth difference value, setting a pixel value of the target digital image at the pixel location as: a pixel value of the first composite image at the pixel location, or a pixel value of the second composite image at the pixel location, or a combination of the pixel value of the first composite image at the pixel location and the pixel value of the second composite image at the pixel location.

In some embodiments, the method may further include: modifying the depth difference value to obtain a wipe pattern value $w_f$, where the depth difference value is modified based on at least the pixel location and at least some parameters defining a perspective transformation of an original source image; and setting the pixel value of the target digital image at the pixel location, the pixel value being set as the pixel value of the first composite image at the pixel location where $w_f$ is greater than a first threshold, the pixel value being set as the pixel value of the second composite image at the pixel location where $w_f$ is less than a second threshold, and the pixel value otherwise being set as the combination of the pixel value of the first composite image at the pixel location and the pixel value of the second composite image at the pixel location. In some such embodiments this may provide a uniform softness around an intersection line in the target digital image.

Modifying the depth difference value to obtain the wipe pattern value $w_f$ could include multiplying the depth difference value by: (i) a gain value dependent upon at least some parameters defining the perspective transformation, and (ii) another value dependent upon at least the target image coordinate values $x_t$ and $y_t$ of the pixel location and at least some parameters defining the perspective transformation. In some embodiments, the gain value may include a user-controllable parameter that defines a range of softness around the intersection line.

In some embodiments, at least one of the depth value associated with the first digital image at the pixel location and the depth value associated with the second digital image at the pixel location may be computed using: (i) at least some parameter values that define a transformation of an original source image, and/or (ii) the target image coordinate values $x_t$ and $y_t$ of the pixel location.

The target digital image may, in some embodiments, be intersected with a third digital image by: mixing the target digital image and the third digital image to produce a third composite image in which the third digital image is layered on top of the target digital image; mixing the target digital image and the third digital image to produce a fourth composite image in which the target digital image is layered on top of the third digital image; and mixing the third composite image and the fourth composite image using another wipe pattern that is a function of a difference in depth between the target digital image and the third digital image.

The third digital image could represent the intersection of further digital images.

In some embodiments the method could involve intersecting a plurality of digital images by performing operations including intersecting the target digital image with another input digital image to obtain an output digital image and then further intersecting the output digital image with a further input digital image.

In some embodiments, computing the difference between the depth value associated with the first digital image at the pixel location and the depth value associated with the second digital image at the pixel location to obtain the depth difference value may comprise either: subtracting the depth value associated with the second digital image at the pixel location from the depth value associated with the first digital image at the pixel location, or subtracting the depth value associated with the first digital image at the pixel location from the depth value associated with the second digital image at the pixel location.

In some embodiments, mixing the first digital image and the second digital image to produce the first composite image may include: for each pixel location of a plurality of pixel locations of the first composite image, multiplying a pixel value of the second digital image at the pixel location with a complementary alpha value corresponding to the first digital image to obtain an intermediary value, and then adding a pixel value of the first digital image at the pixel location to the intermediary value. In some such embodiments, the complementary alpha value corresponding to the first digital image may be complementary to an alpha value that has already been applied to the first digital image.

In some embodiments, the depth value associated with the first digital image at the pixel location is representative of how far the first digital image appears from a viewer at the pixel location, and the depth value associated with the second digital image at the pixel location is representative of how far the second digital image appears from the viewer at the pixel location.

In some embodiments, an apparatus is disclosed to intersect a first digital image and a second digital image. The apparatus may include: a first mixer to mix the first digital image and the second digital image to produce a first composite image in which the first digital image is layered on top of the second digital image; a second mixer to mix the first digital image and the second digital image to produce a second composite image in which the second digital image is layered on top of the first digital image; a third mixer to mix the first composite image and the second composite image using a wipe pattern to produce a target digital image comprising the intersection of the first digital image and the second digital image; and a wipe pattern generator to generate the wipe pattern as a function of a difference in depth between the first digital image and the second digital image.

The first mixer, the second mixer, the third mixer, and/or the wipe pattern generator could be implemented by one or more integrated circuits. The one or more integrated circuits may include at least one of a field-programmable gate array (FPGA) and/or an application-specific integrated circuit (ASIC).

In some embodiments, the apparatus may include a memory and a processor to execute instructions stored in the memory, the instructions, when executed by the processor, cause the processor to implement the first mixer, the second mixer, the third mixer, and the wipe pattern generator.

In some embodiments, the apparatus may include circuitry to: compute the difference between the depth value associated with the first digital image at the pixel location and the depth value associated with the second digital image at the pixel location to obtain a depth difference value; and as a function of the depth difference value, set a pixel value of the target digital image at the pixel location as: a pixel value of the first composite image at the pixel location, or a pixel value of the second composite image at the pixel location, or a combination of the pixel value of the first composite image at the pixel location and the pixel value of the second composite image at the pixel location.

In some embodiments, the apparatus may comprise circuitry to: modify the depth difference value to obtain a wipe pattern value $w_f$, the depth difference value being modified based on at least the pixel location and at least some parameters defining a perspective transformation of an original source image; and set the pixel value of the target digital image at the pixel location, the pixel value being set as the pixel value of the first composite image at the pixel location where $w_f$ is greater than a first threshold, the pixel value being set as the pixel value of the second composite image at the pixel location where $w_f$ is less than a second threshold, and the pixel value otherwise being set as the combination of the pixel value of the first composite image at the pixel location and the pixel value of the second composite image at the pixel location.

The apparatus may, in some embodiments, include a multiplier to modify the depth difference value to obtain the wipe pattern value $w_f$ by multiplying the depth difference value by: (i) a gain value dependent upon at least some parameters defining the perspective transformation, and (ii) another value dependent upon at least the target image coordinate values $x_t$ and $y_t$ of the pixel location and at least some parameters defining the perspective transformation.

The apparatus may, in some embodiments, include circuitry to compute at least one of the depth value associated with the first digital image at the pixel location and the depth value associated with the second digital image at the pixel location using: (i) at least some parameter values that define a transformation of an original source image, and (ii) the target image coordinate values $x_t$ and $y_t$ of the pixel location.

In some embodiments, the apparatus may further include: a fourth mixer to mix the target digital image and a third digital image to produce a third composite image in which the third digital image is layered on top of the target digital image; a fifth mixer to mix the target digital image and the third digital image to produce a fourth composite image in which the target digital image is layered on top of the third digital image; and a sixth mixer to intersect the target digital image with the third digital image by mixing the third composite image and the fourth composite image using another wipe pattern that is a function of a difference in depth between the target digital image and the third digital image.

In one embodiment there is provided an apparatus to intersect more than two digital images, the apparatus including a plurality of identical computation circuitry, each one of the plurality of identical computational circuitry comprising the apparatus above to receive as an input a pair of input digital images and to produce as an output a target digital image comprising the intersection of the pair of input digital images. The plurality of identical computational circuitry may be arranged so that an output target digital image of one of said plurality of identical computational circuitry is used as an input digital image of another of said plurality of identical computational circuitry. In some embodiments, two of said plurality of identical computational circuitry may be arranged in parallel to each other, with the output of each of said two of said plurality of identical computational circuitry fed to an input of another of said plurality of identical computational circuitry.

Other aspects and features of embodiments of the present disclosure will become apparent to those ordinarily skilled in the art upon review of the following description.

BRIEF DESCRIPTION

Embodiments of the present application will be described, by way of example only, with reference to the accompanying figures wherein.

Figure 20A:
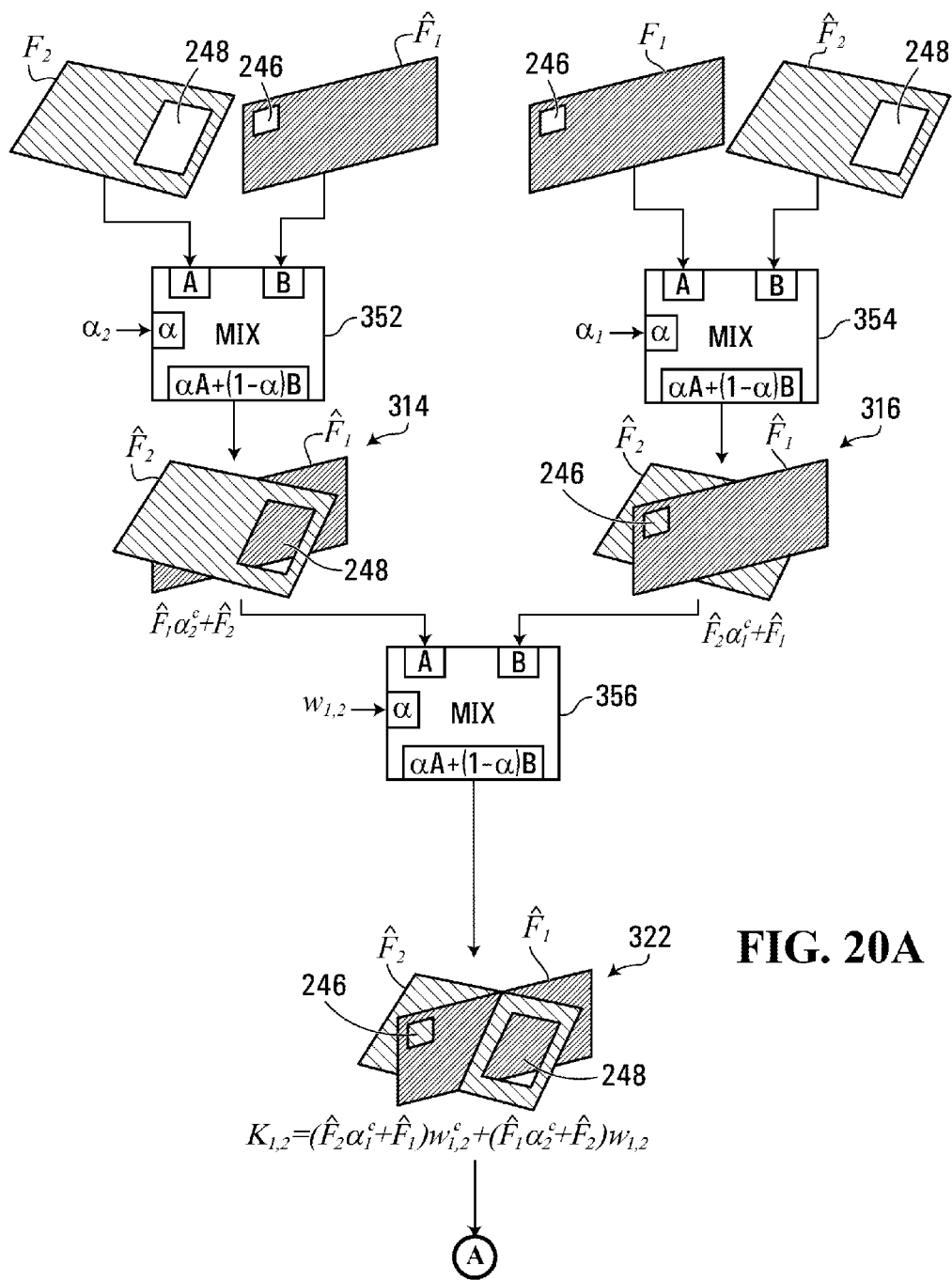
Figure 20B:
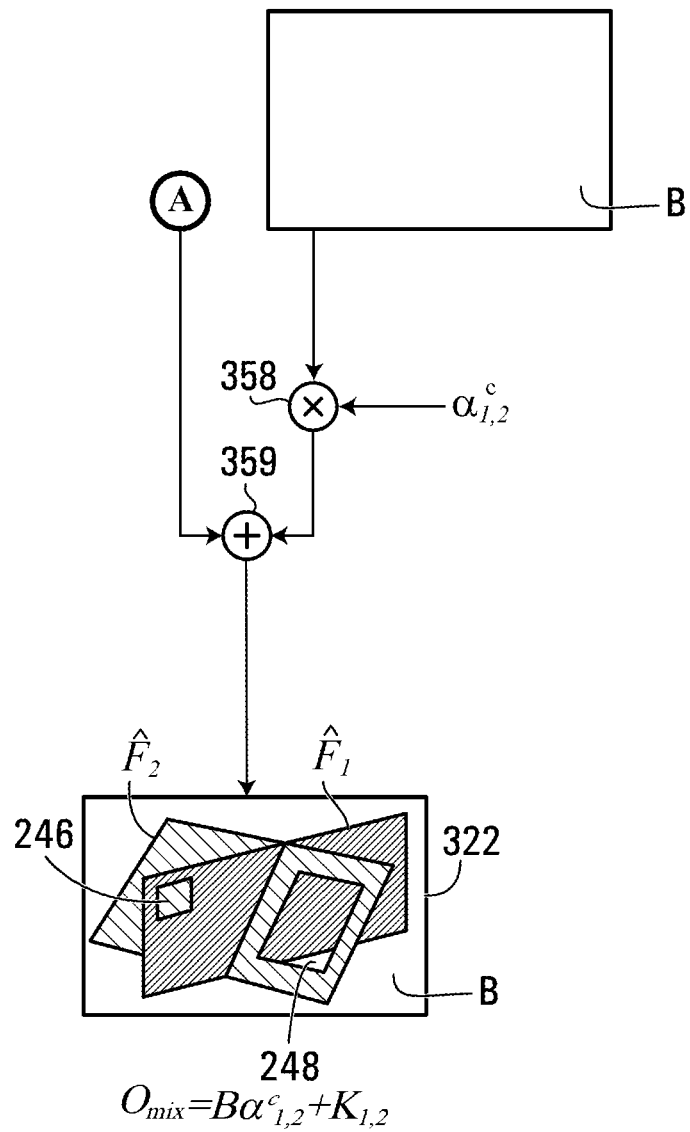
Figure 21:
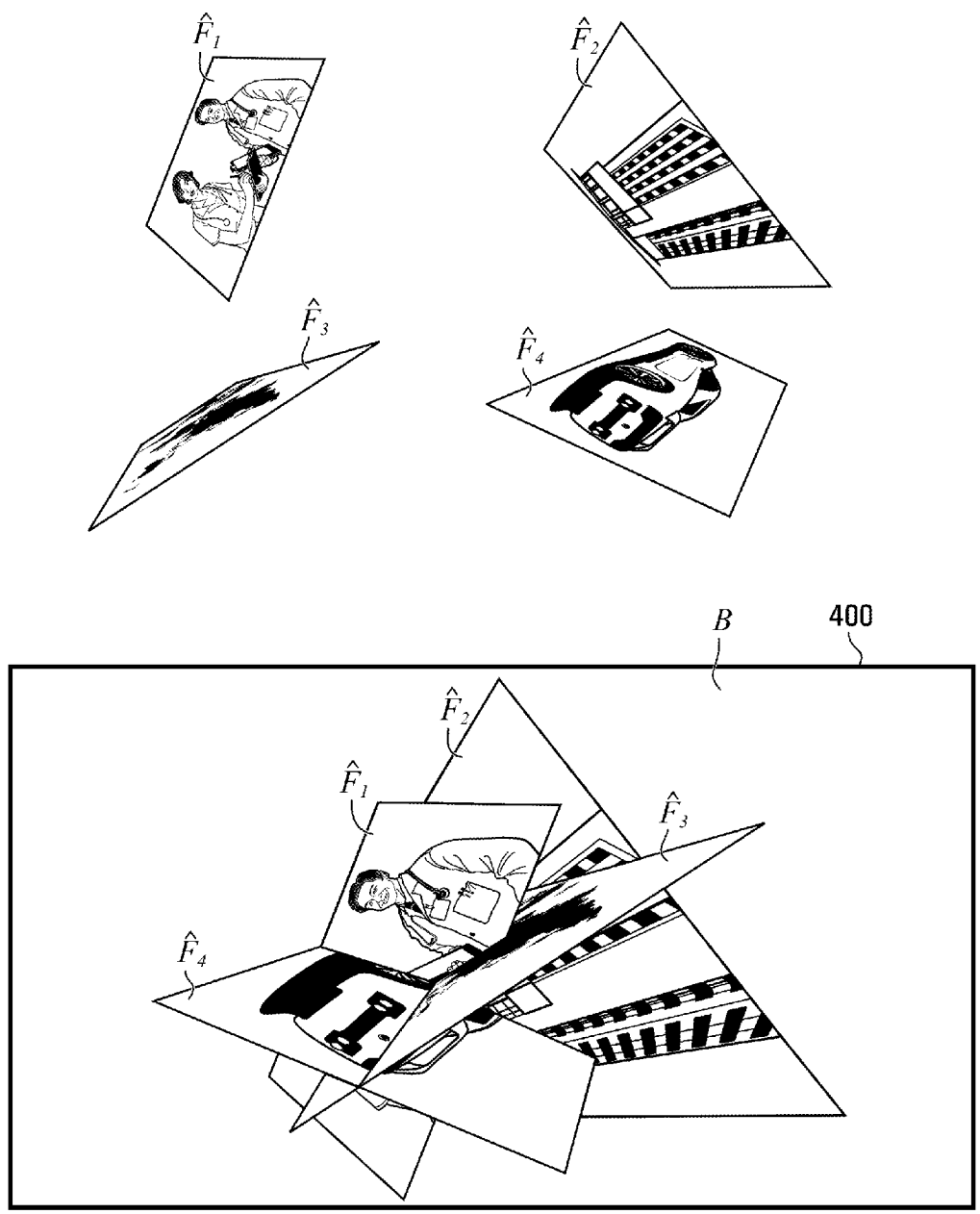
Figure 22:
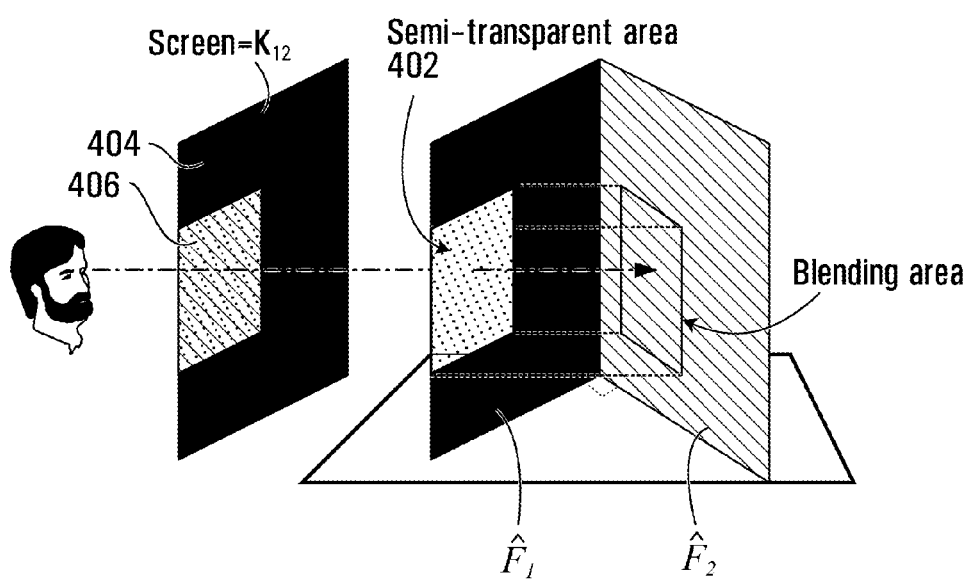
Figure 23:
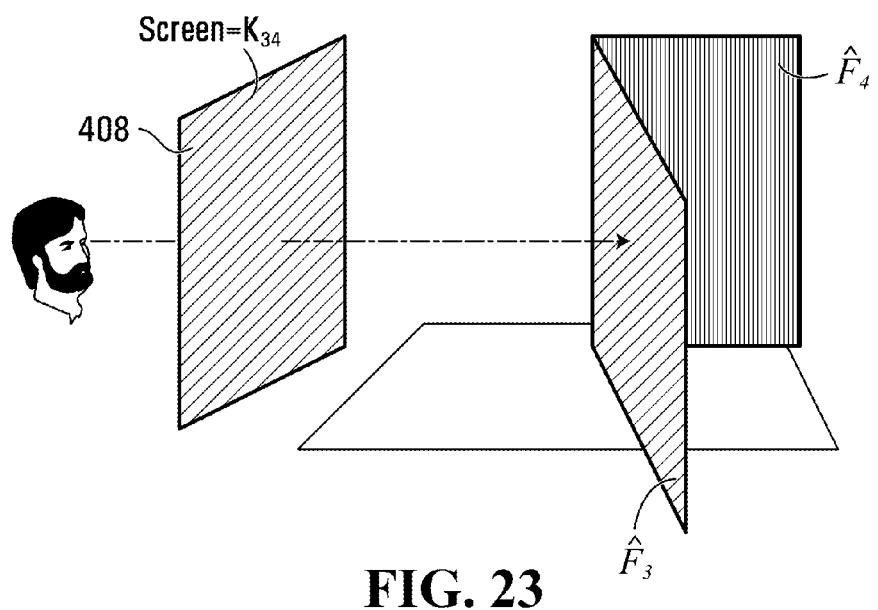
Figure 24:
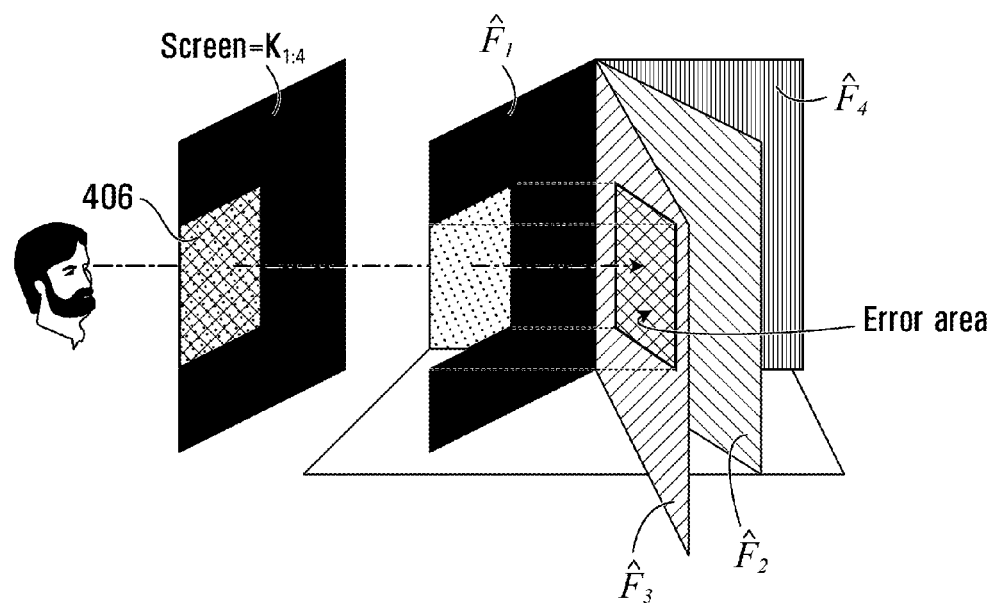
Figure 25:
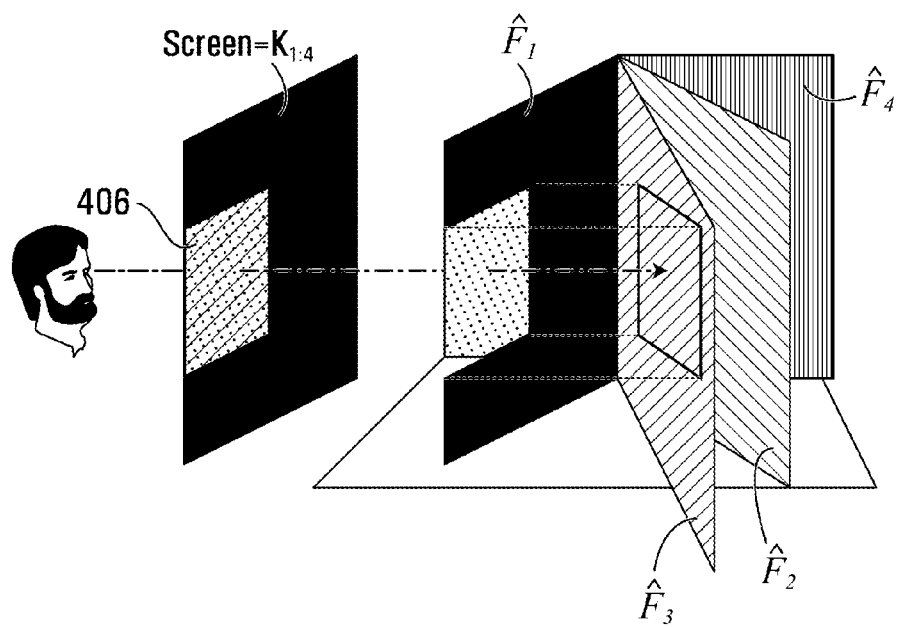
Figure 26:
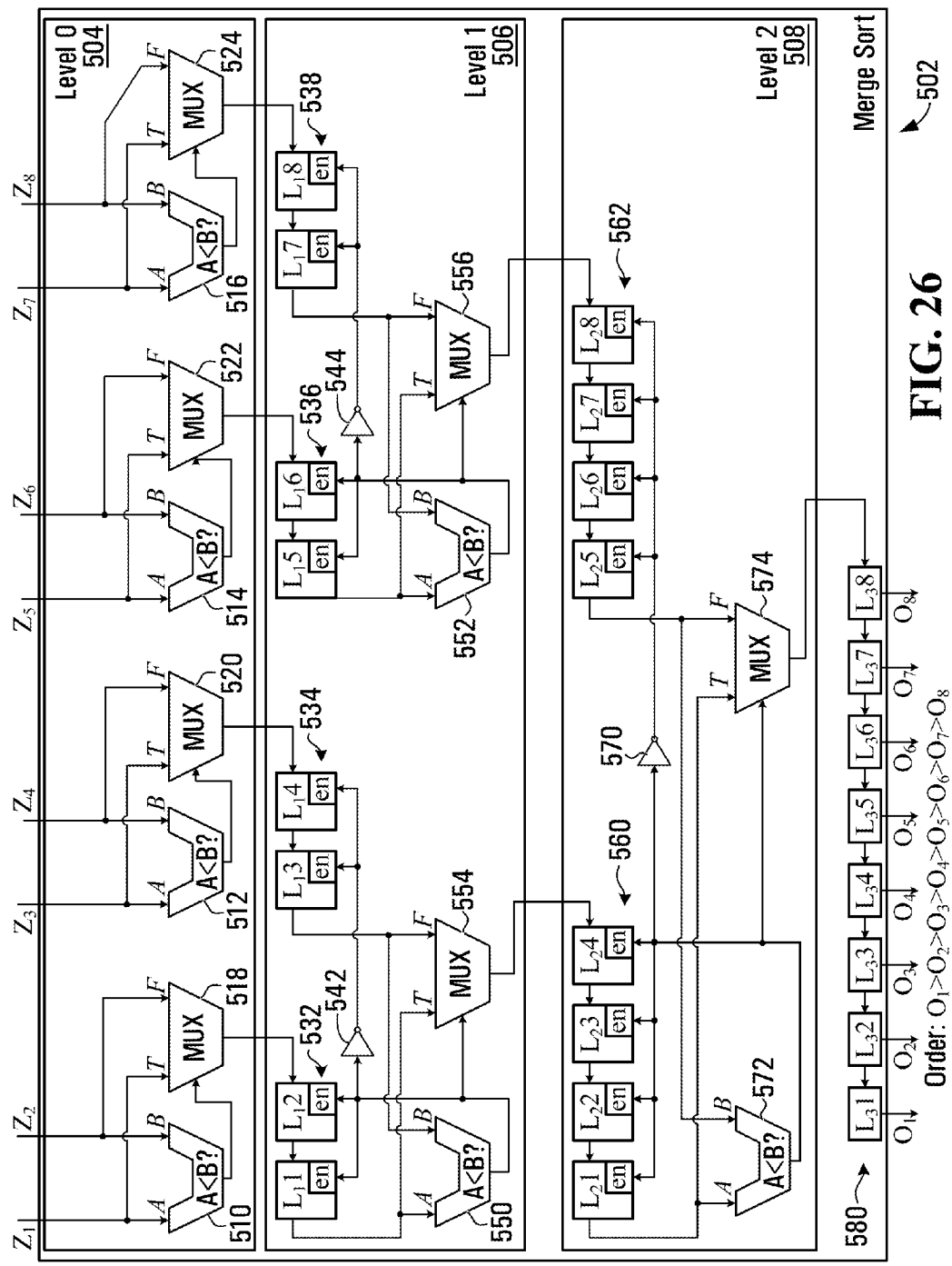
Figure 27:
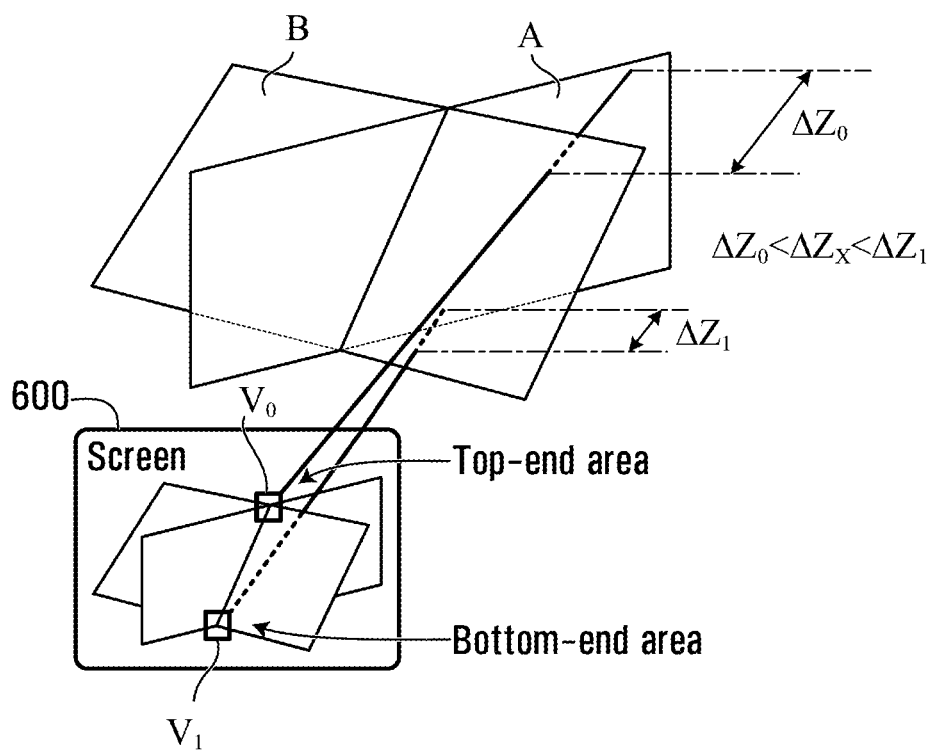
Figure 28:
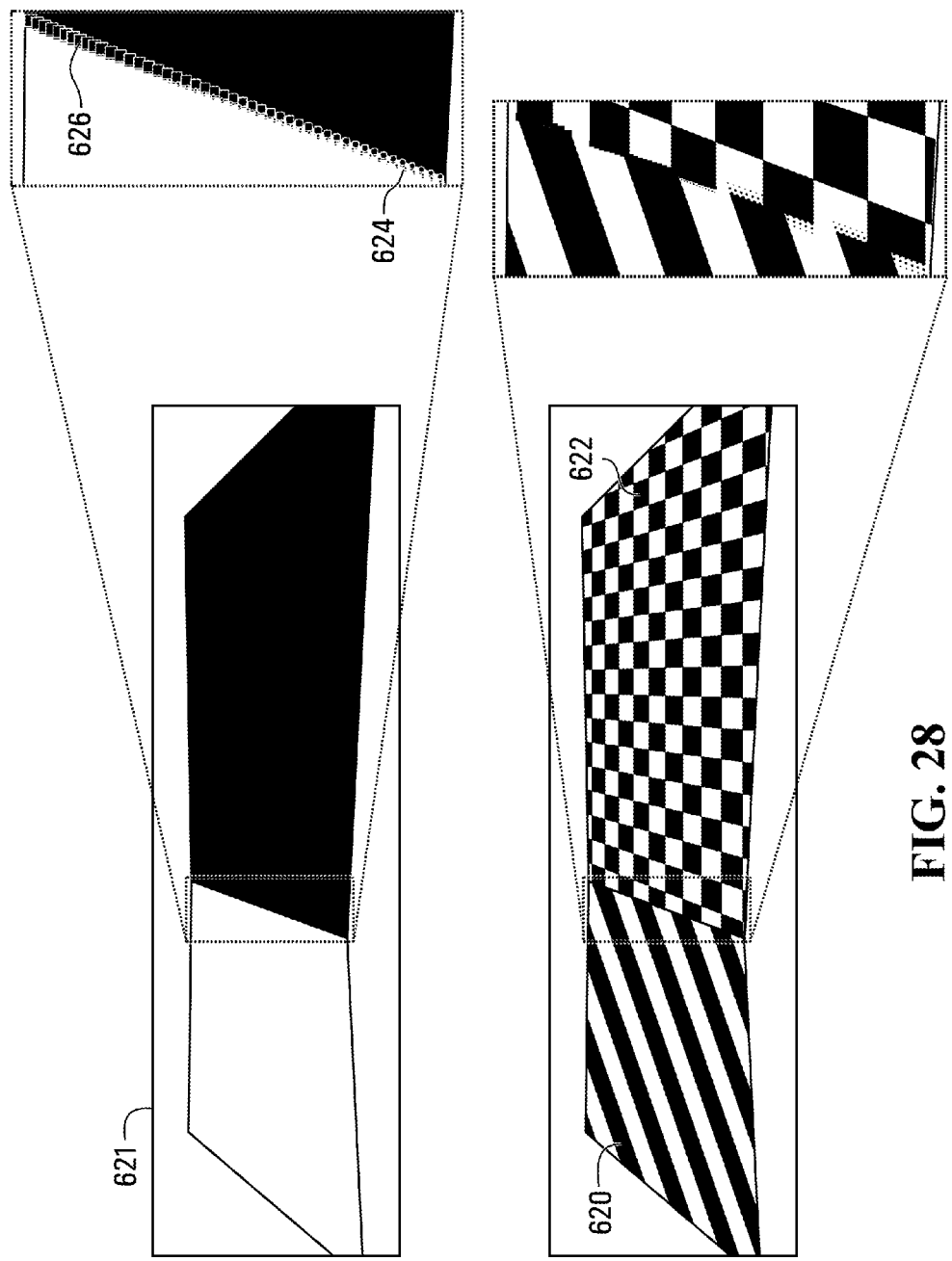
Figure 29:
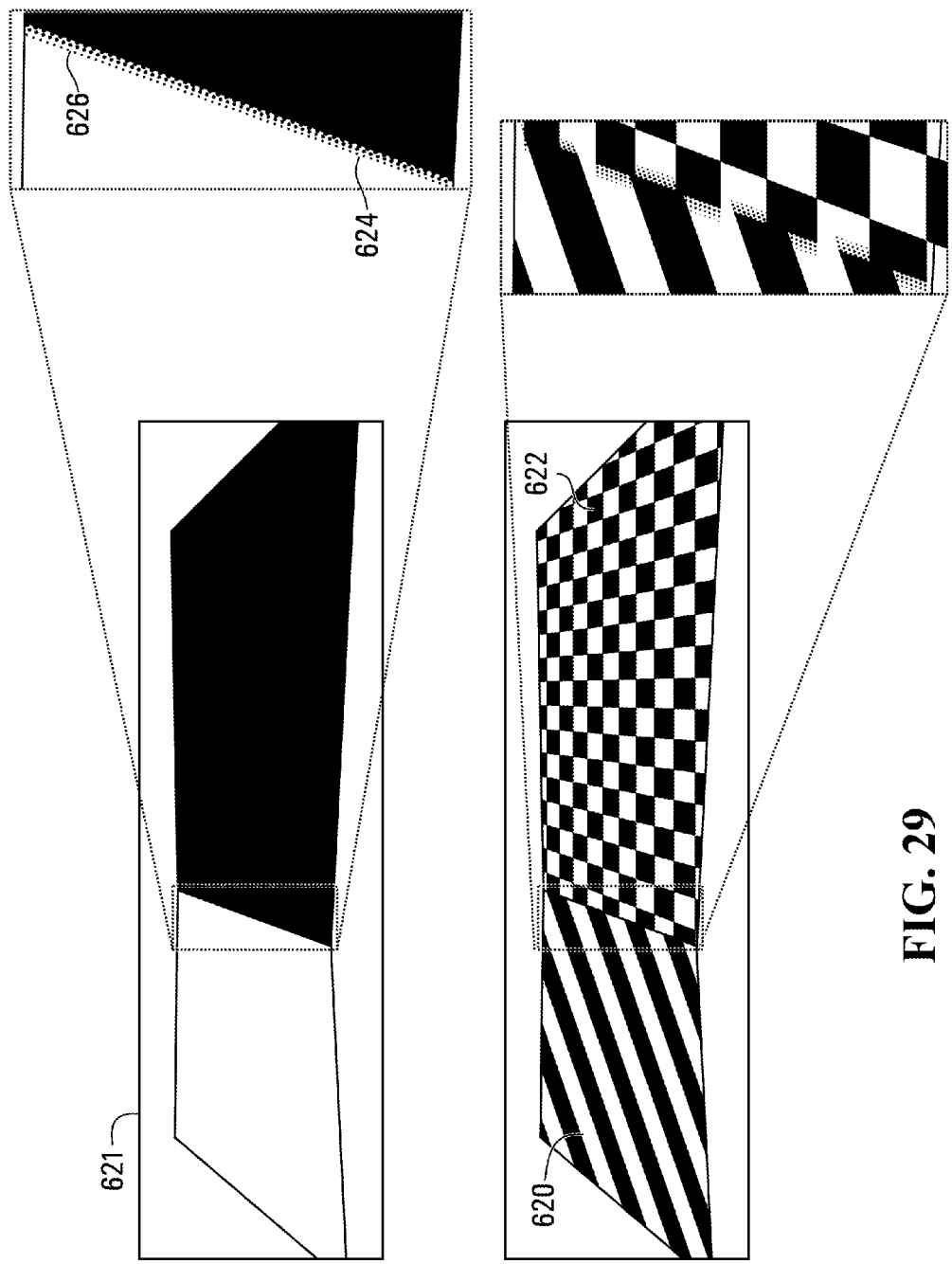
Figure 30:
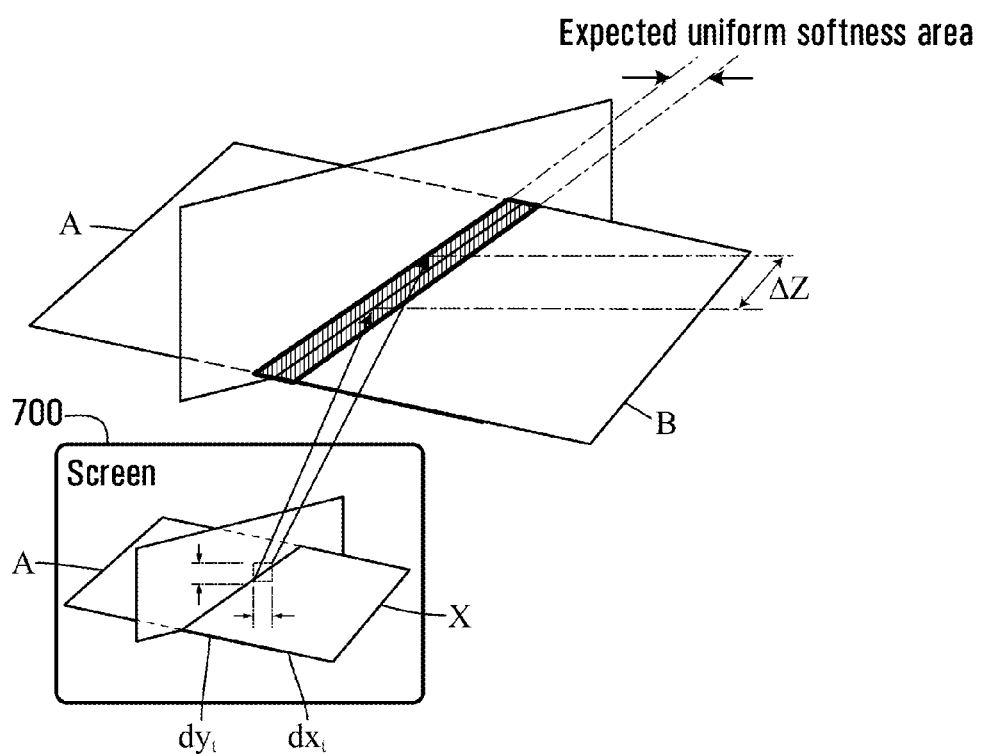
Figure 31:
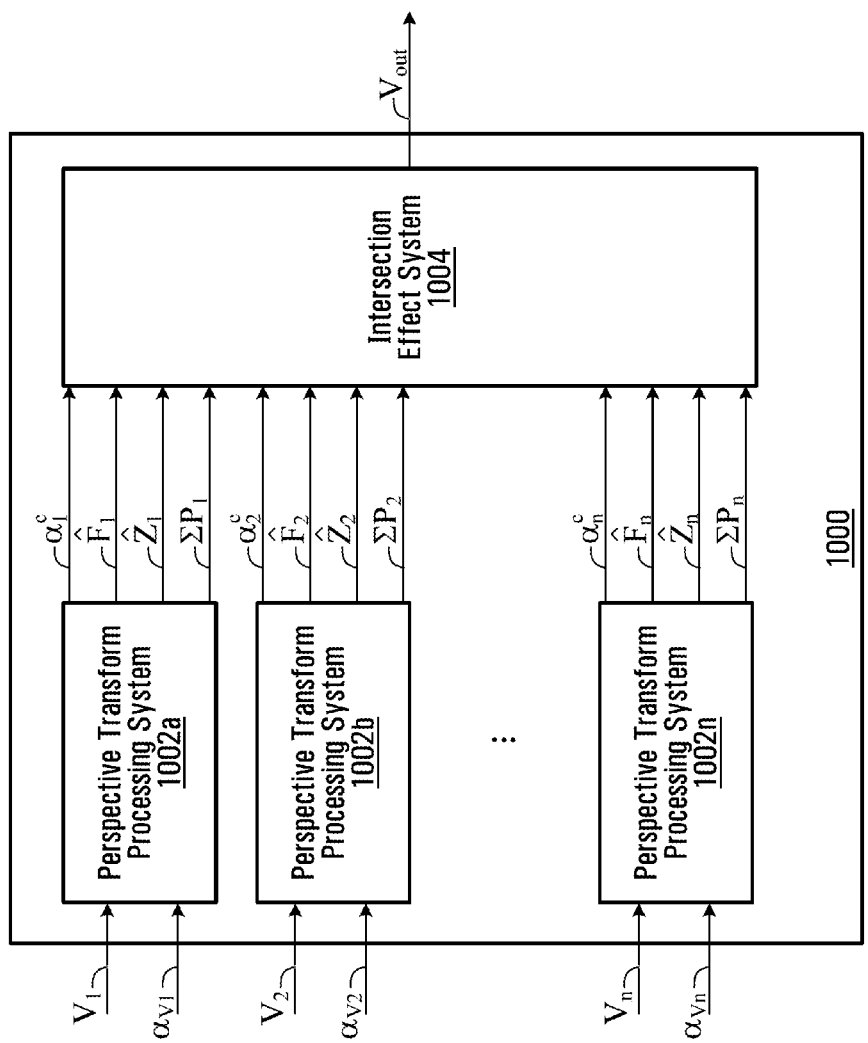
Figure 32:
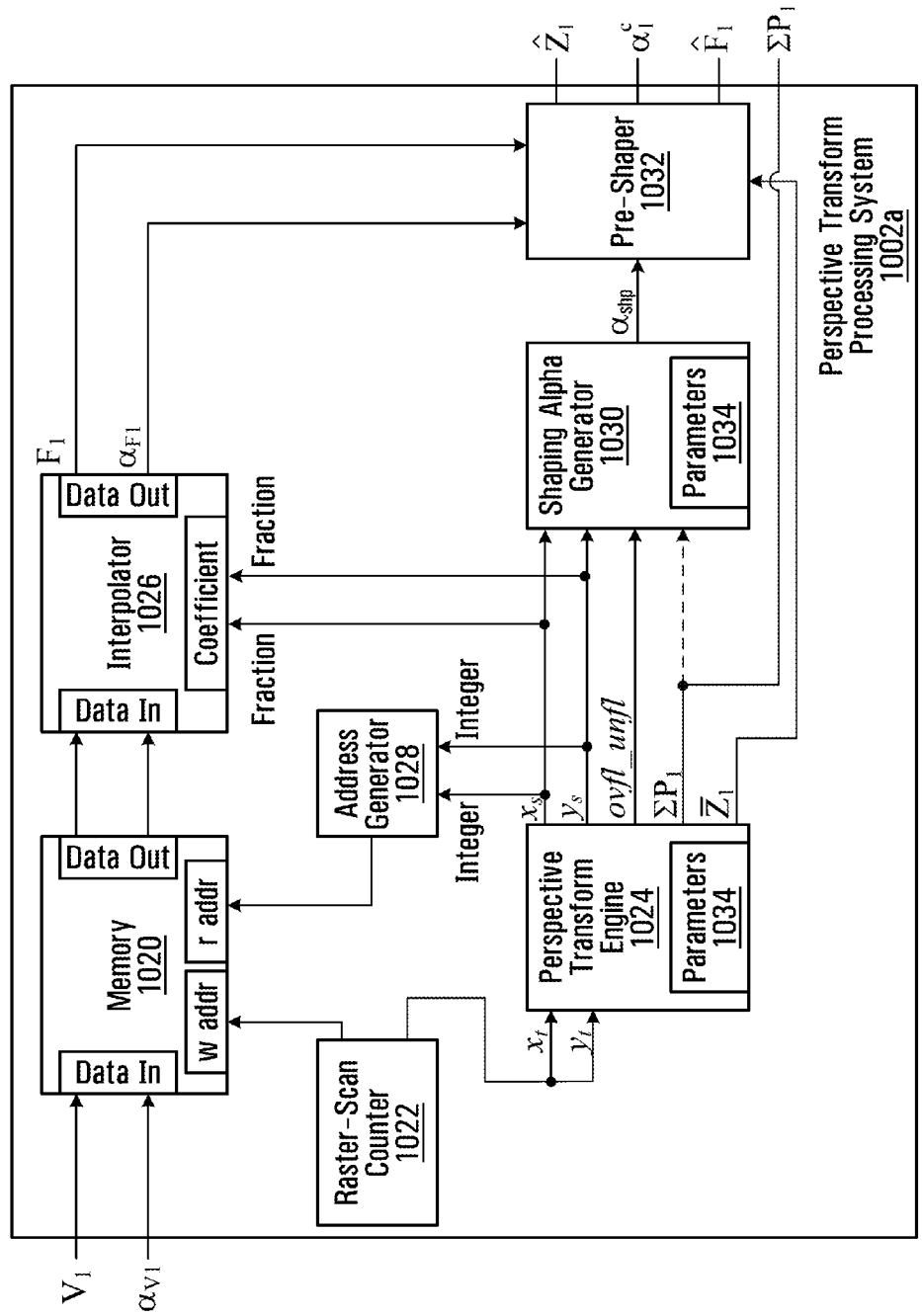
Figure 33:
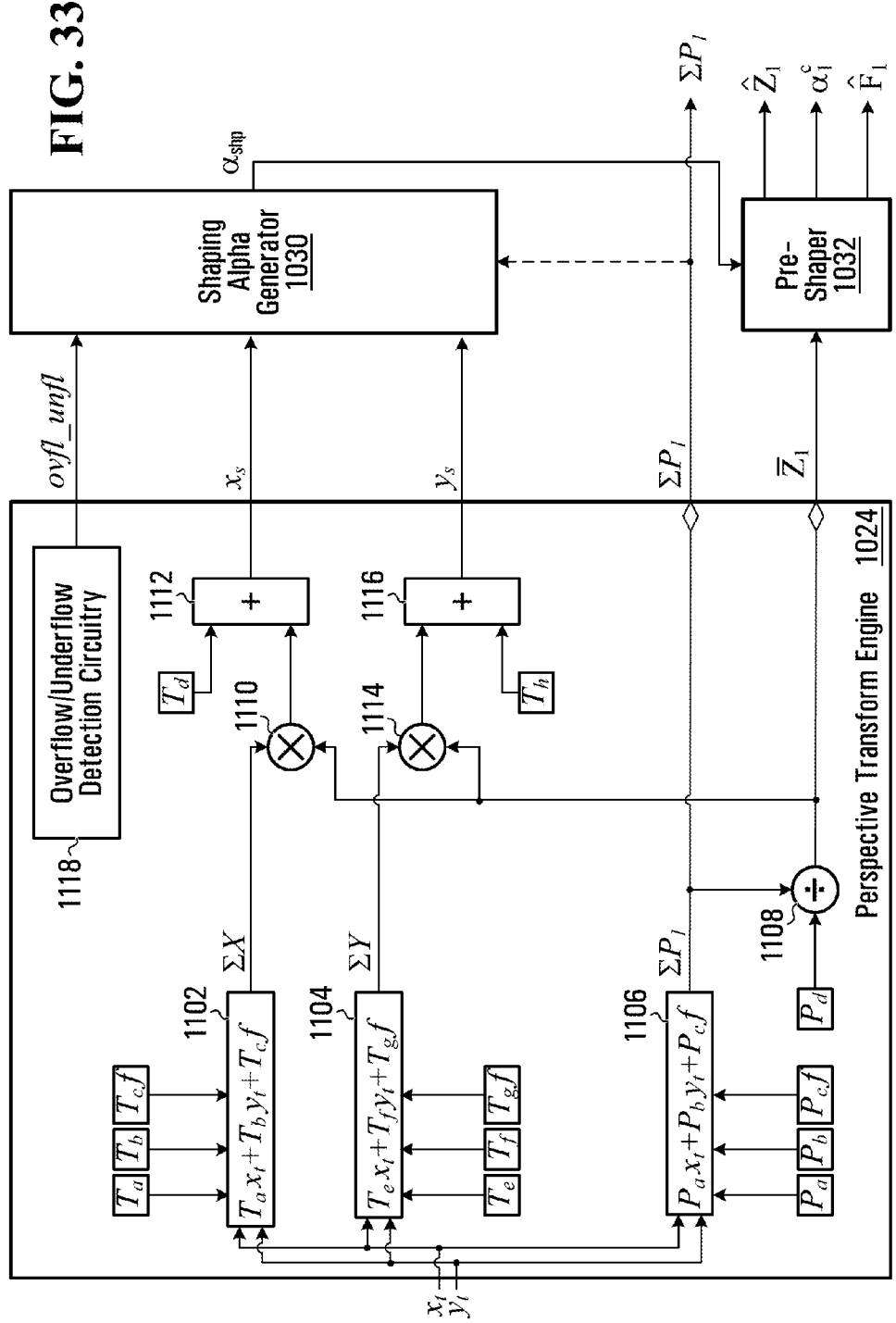
Figure 34:
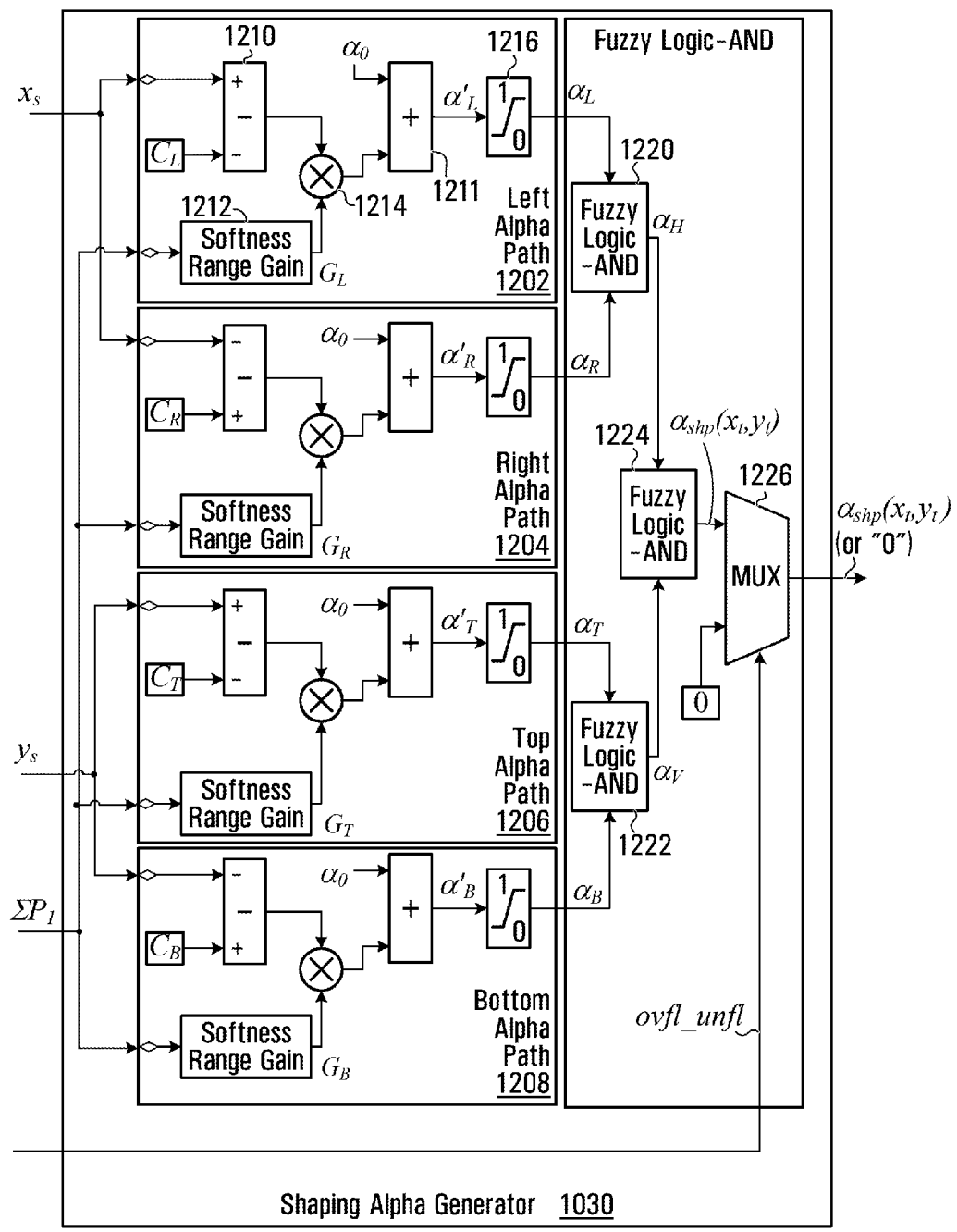
Figure 35:
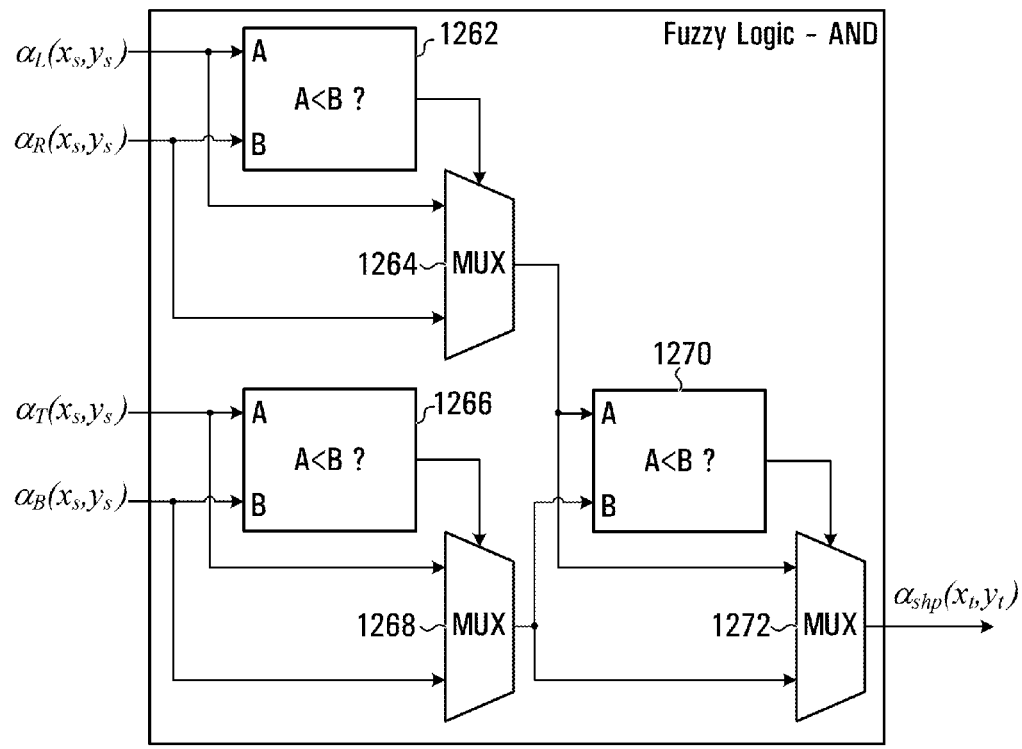
Figure 36:
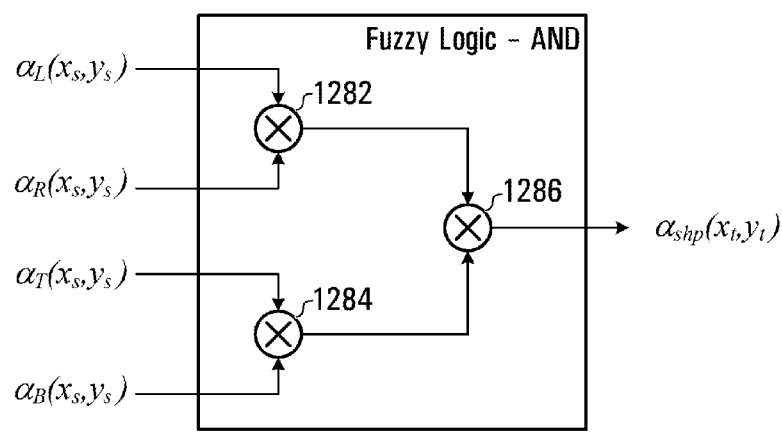
Figure 37:
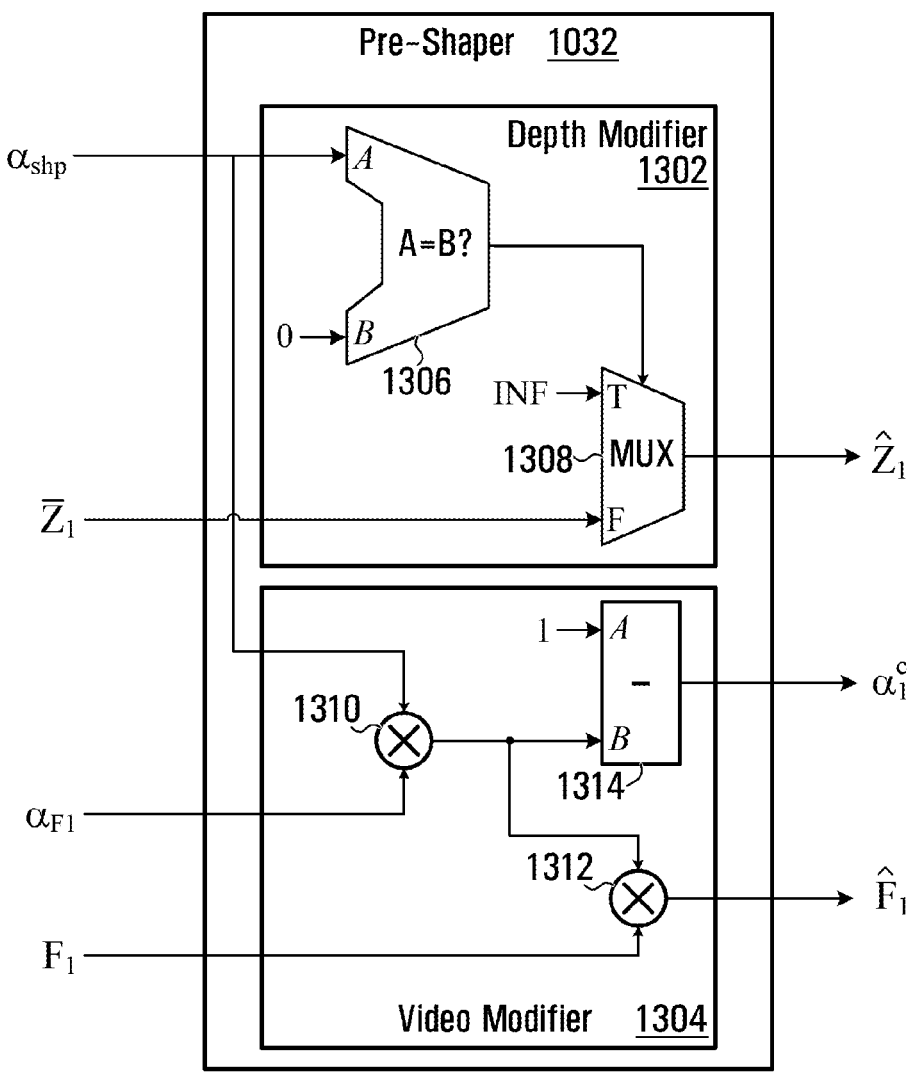
Figure 38:
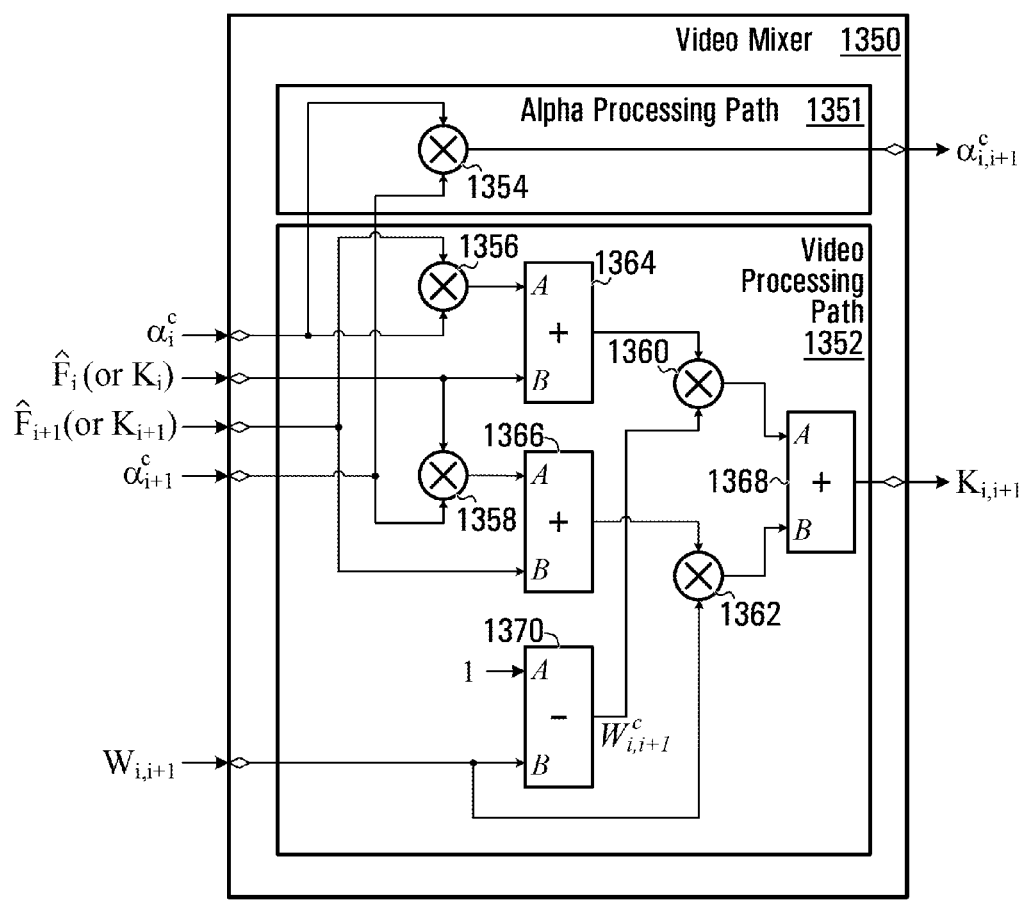
Figure 39:
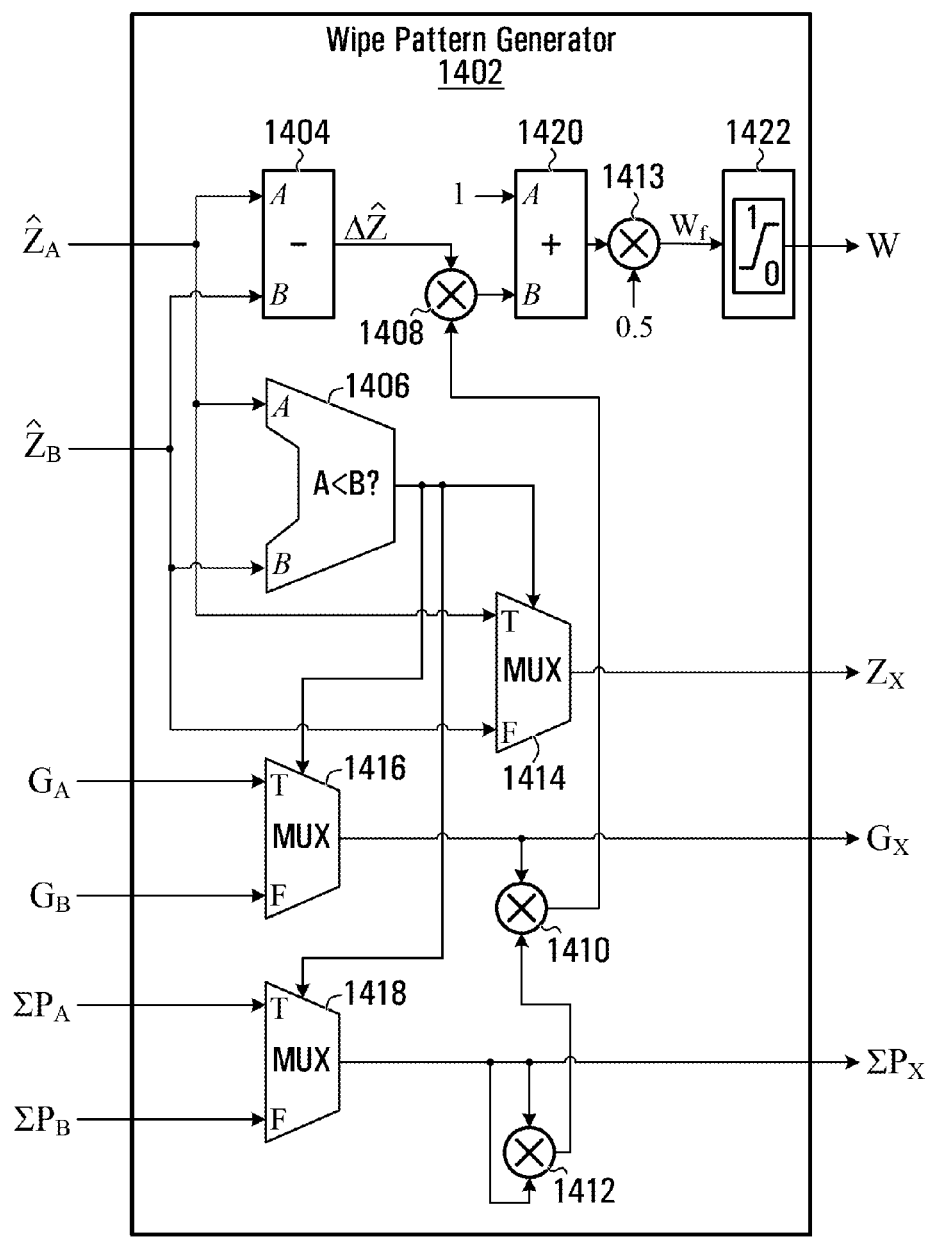
Figure 40A:
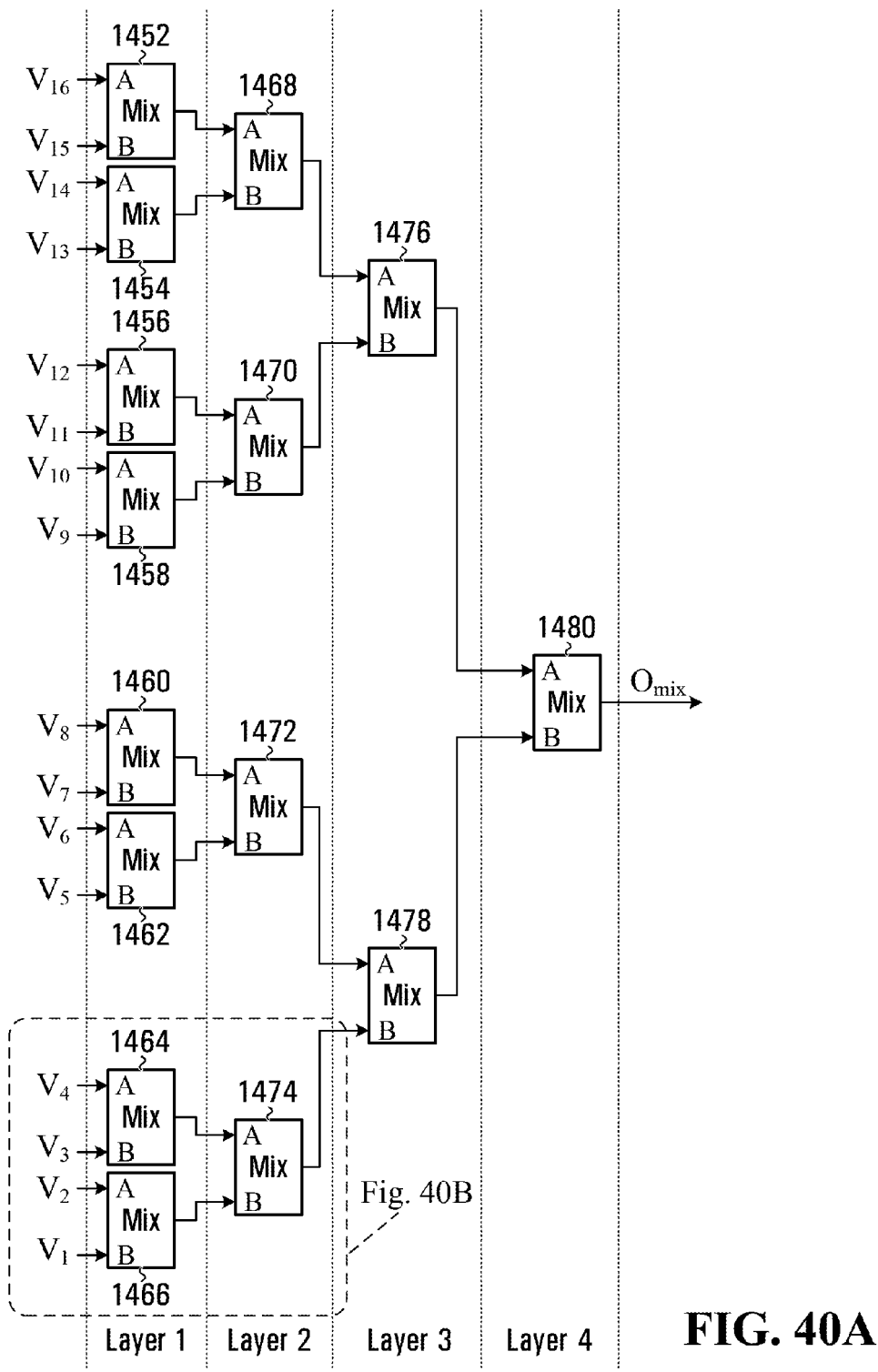
Figure 40B:
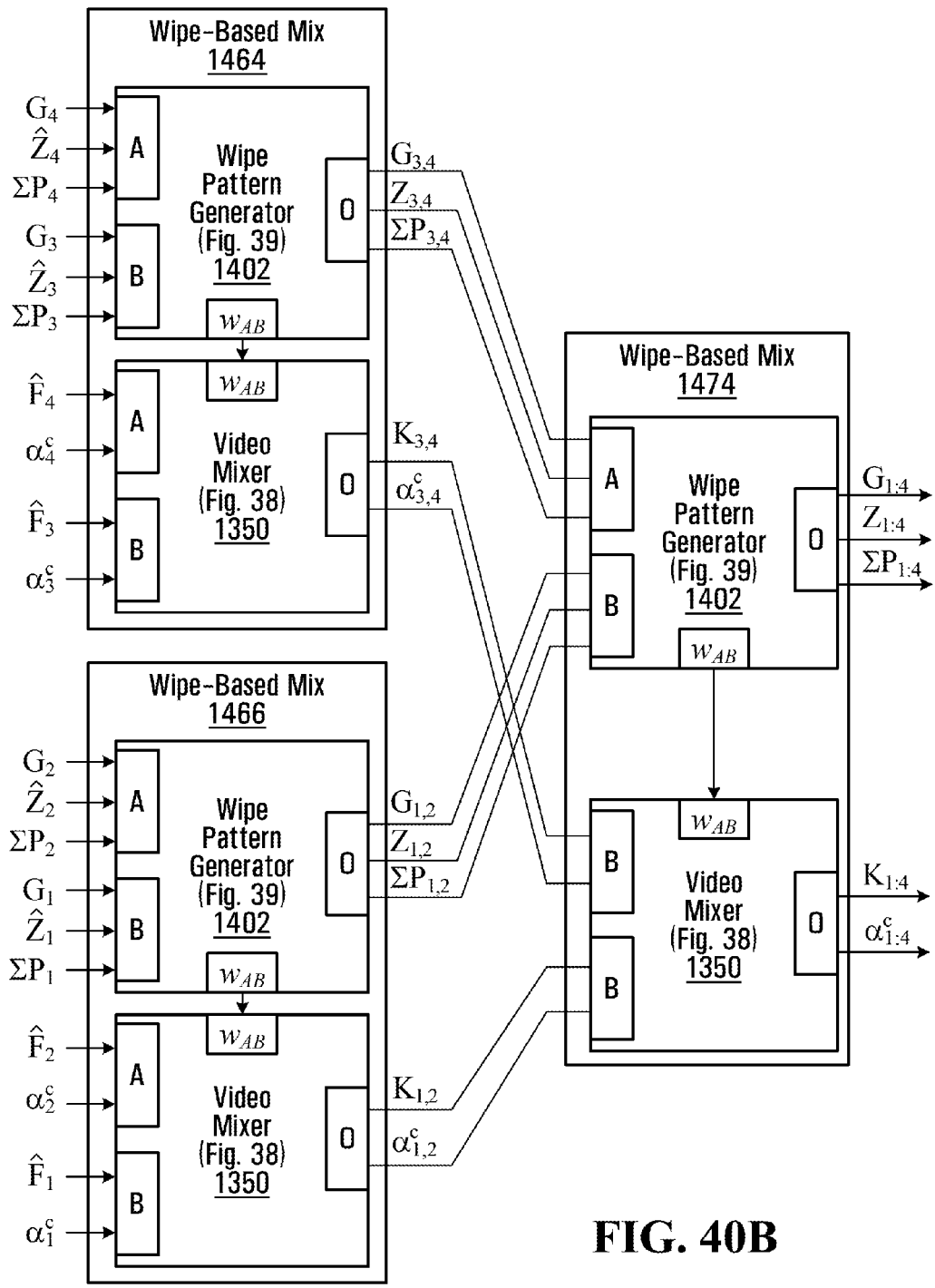
Figure 41:
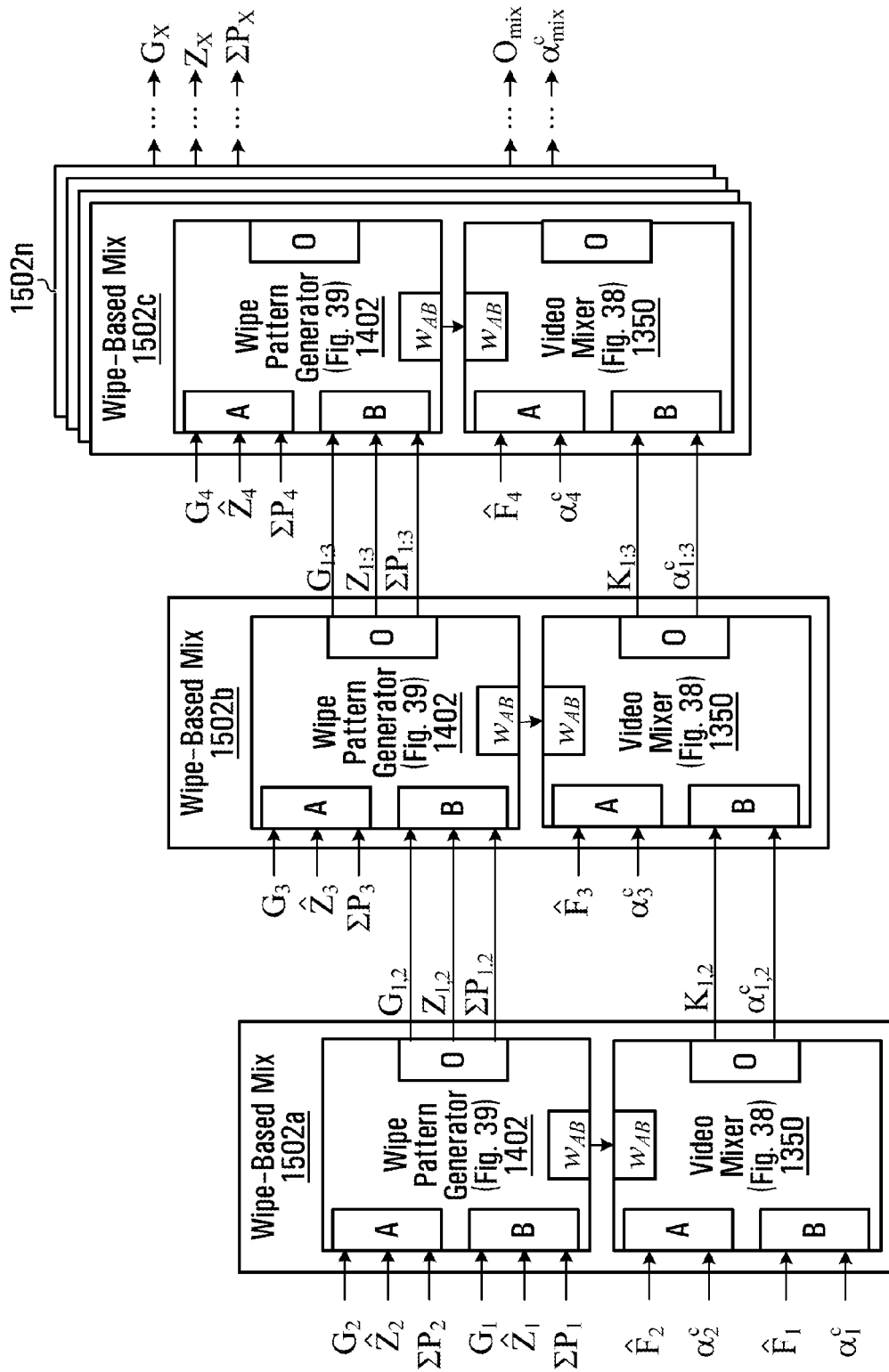
Figure 42:
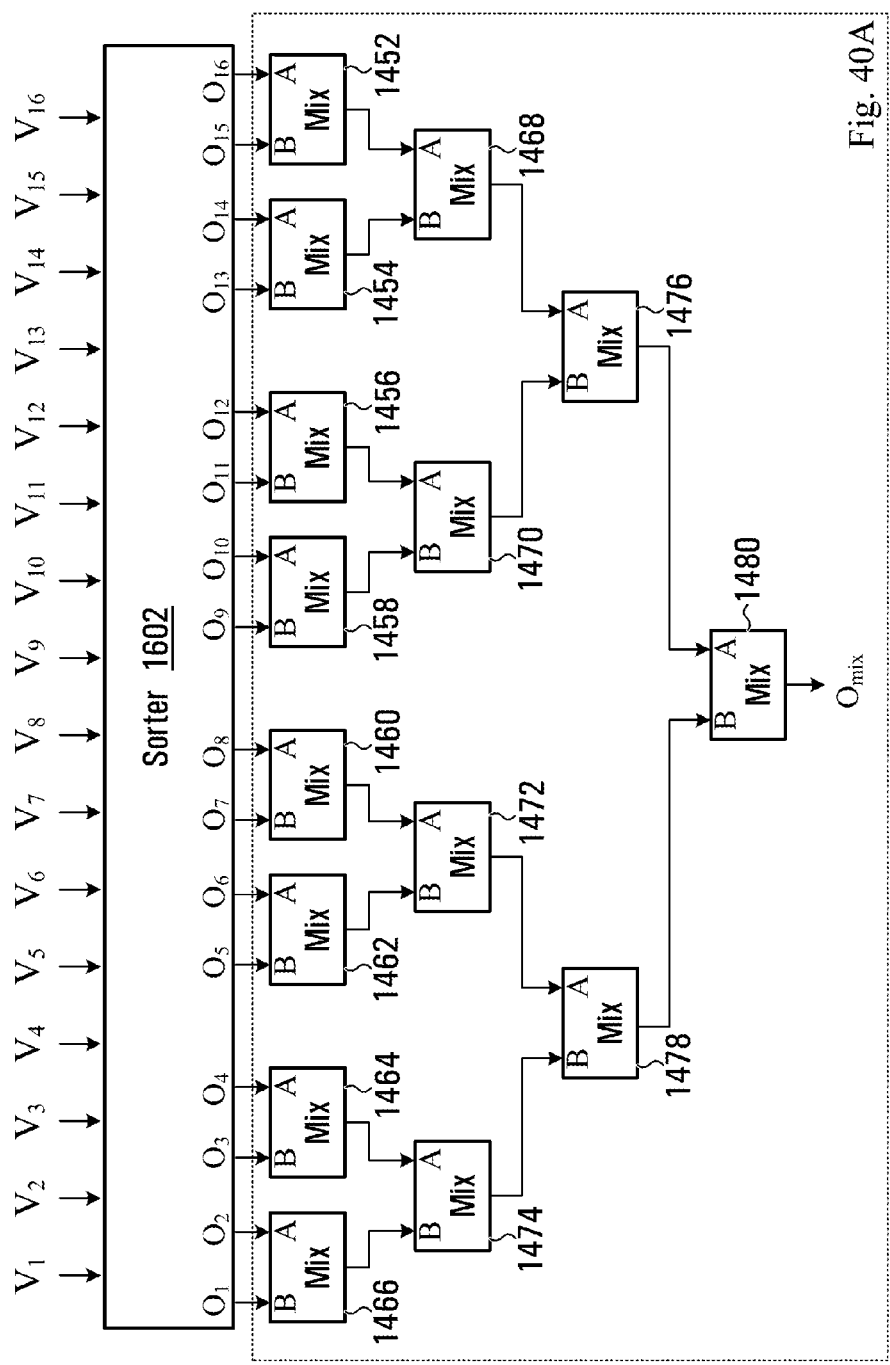
Figure 43:
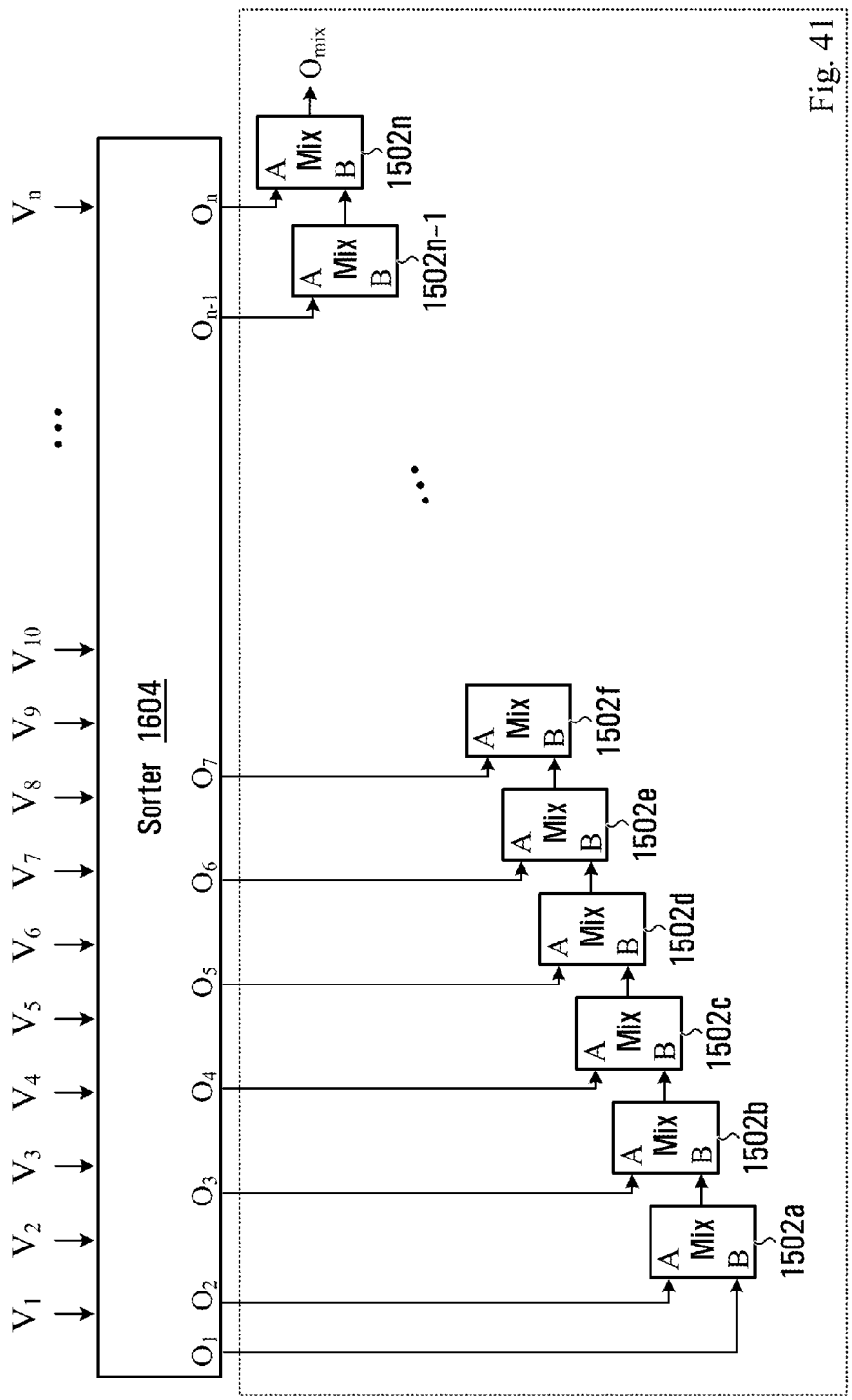
Figure 44:
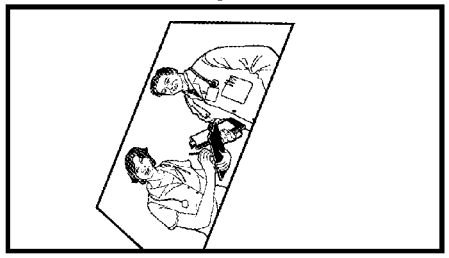
Figure 44:
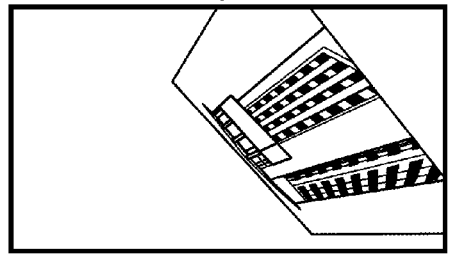
Figure 44:
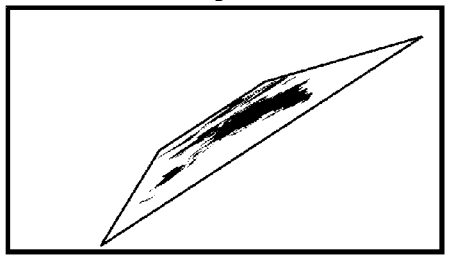
Figure 44:
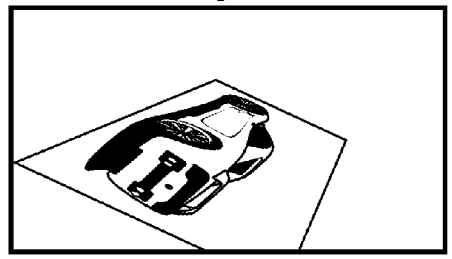
Figure 45:
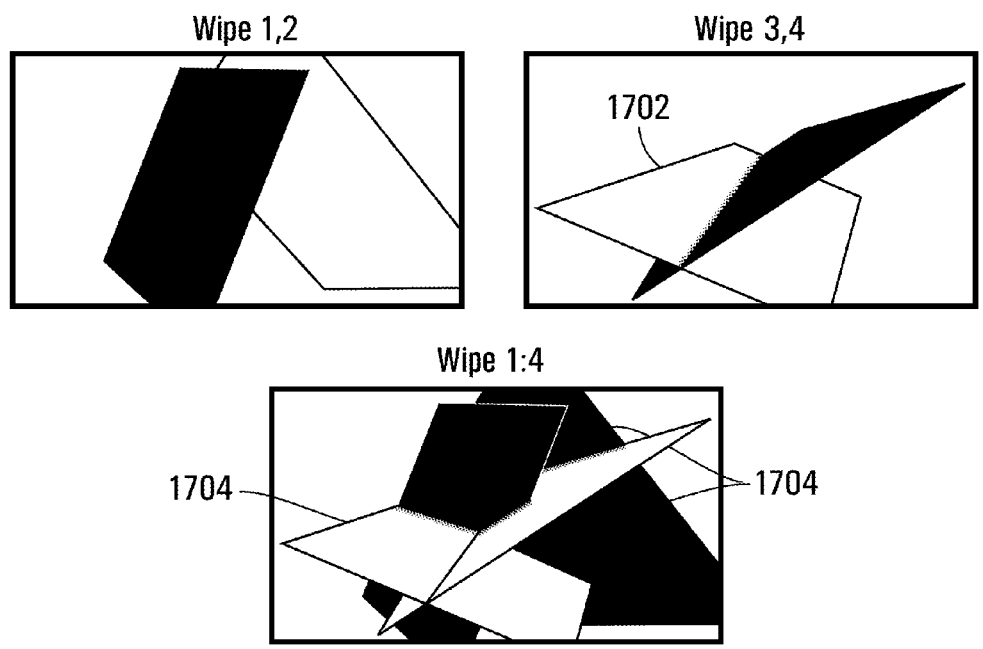
Figure 46:
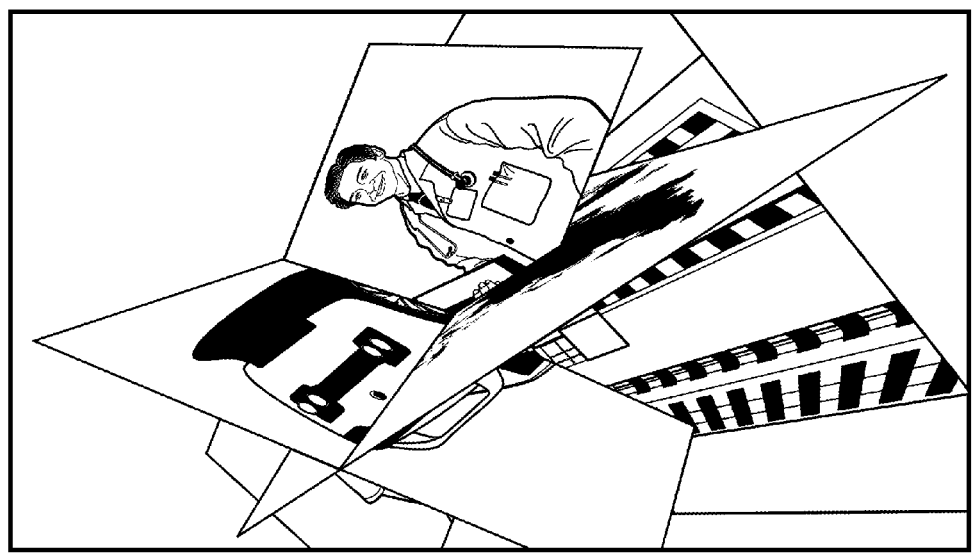
Figure 47:
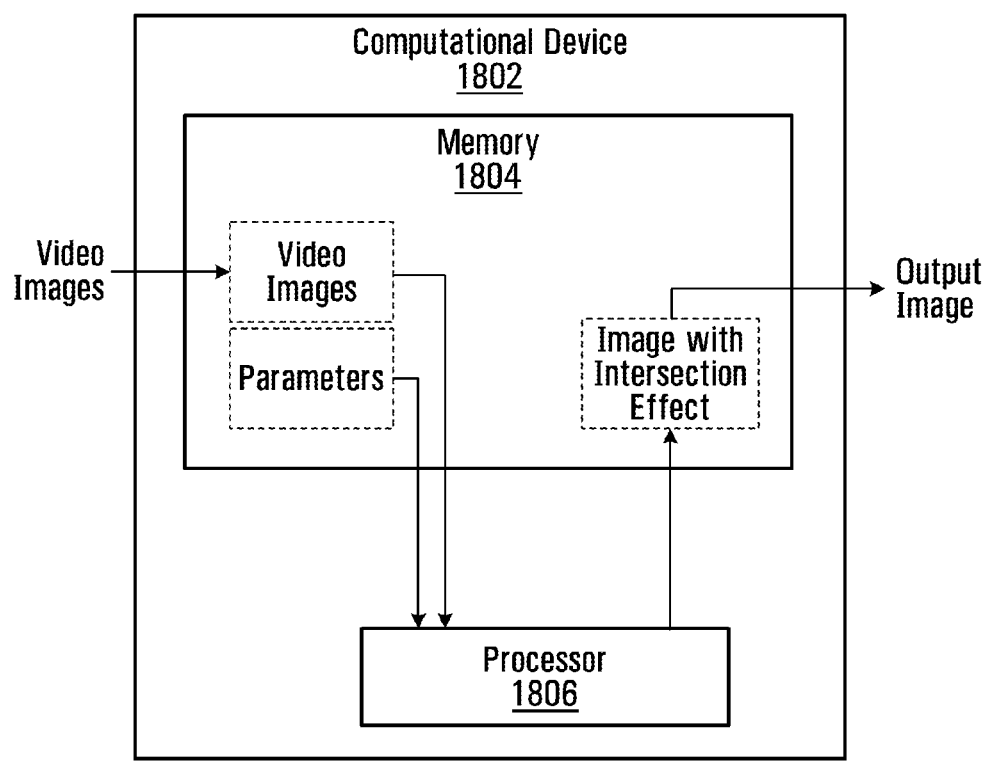

FIG. 20, which includes FIGS. 20A and 20B, illustrates an example of how two images may be intersected using a wipe based mix when there is a third background image;

FIG. 21 illustrates the intersection of four images;

FIG. 22 illustrates the intersection of example video images $\hat{F}_1$ and $\hat{F}_2$;

FIG. 23 illustrates the intersection of example video images $\hat{F}_3$ and $\hat{F}_4$;

FIG. 24 illustrates the intersection of the two composite images respectively shown in FIGS. 22 and 23;

FIG. 25 illustrates the result of a correct intersection;

FIG. 26 illustrates an example structure for performing a merge sort;

FIG. 27 illustrates a depth difference at a point closer to a viewer and at a point farther from a viewer;

FIG. 28 illustrates two images intersected using a wipe pattern with a constant softness range $\Delta_f$ and therefore non-uniform softness;

FIG. 29 illustrates two images intersected using a wipe pattern with a uniform softness;

FIG. 30 illustrates two intersected video images with a desired uniform softness around the intersection;

FIG. 31 illustrates a high-level view of an example device for performing an intersection effect;

FIG. 32 illustrates an example implementation of a perspective transform processing system in FIG. 31;

FIG. 33 illustrates an example implementation of the perspective transform engine of FIG. 32;

FIG. 34 illustrates an example implementation of the shaping alpha generator of FIG. 32;

FIG. 35 illustrates one example way to implement fuzzy logic operations;

FIG. 36 illustrates another example way to implement fuzzy logic operations;

FIG. 37 illustrates an example implementation of the pre-shaper of FIG. 32;

FIG. 38 illustrates an example implementation of a video mixer;

FIG. 39 illustrates an example implementation of a wipe pattern generator;

FIG. 40, which includes FIGS. 40A and 40B, illustrates an example of a parallel structure to implement multiple wipe-based mixers to perform an intersection of multiple video images;

FIG. 41 illustrates an example of a cascade structure to implement multiple wipe-based mixers to perform an intersection of multiple video images;

FIG. 42 illustrates the parallel implementation of FIG. 40 modified to have a sorter sort the order of the images in terms of depth on a pixel-by-pixel basis;

FIG. 43 illustrates the cascade implementation of FIG. 41 modified to have a sorter sort the order of the images in terms of depth on a pixel-by-pixel basis;

FIG. 44 illustrates four images prior to intersection;

FIG. 45 illustrates three different wipe patterns generated for the images of FIG. 44;

FIG. 46 illustrates the four images of FIG. 44 intersected using a wipe based mix;

FIG. 47 illustrates an example of a computational device; and

Figure 48:
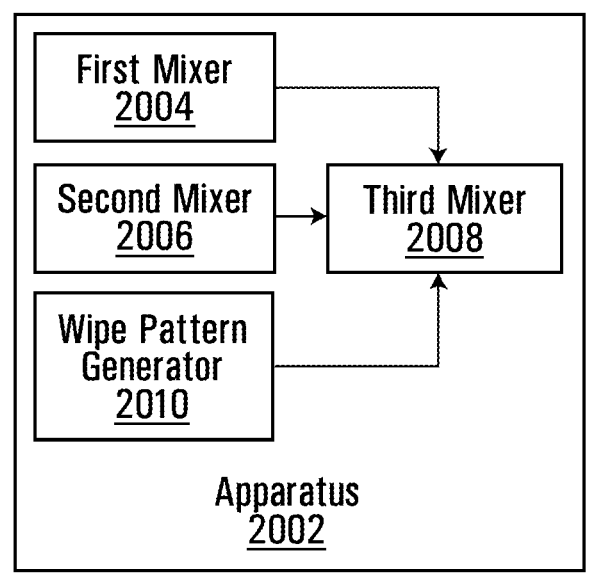

FIG. 48 illustrates an apparatus to intersect a first digital image and a second digital image.

Like reference numerals are used in different figures to denote similar elements.

DETAILED DESCRIPTION

For illustrative purposes, specific example embodiments will now be explained in greater detail below in conjunction with the figures.

The embodiments set forth herein represent information sufficient to practice the claimed subject matter and illustrate the best way of practicing such subject matter. Upon reading the following description in light of the accompanying figures, those of sufficient skill will understand the concepts of the claimed subject matter and will recognize applications of these concepts not particularly addressed herein. It should be understood that these concepts and applications fall within the scope of the disclosure and the accompanying claims.

Moreover, it will be appreciated that any module, component, or device exemplified herein that executes instructions may include or otherwise have access to a non-transitory computer/processor readable storage medium or media for storage of information, such as computer/processor readable instructions, data structures, program modules, and/or other data. A non-exhaustive list of examples of non-transitory computer/processor readable storage media includes magnetic cassettes, magnetic tape, magnetic disk storage or other magnetic storage devices, optical disks such as compact disc read-only memory (CD-ROM), digital video discs or digital versatile disc (i.e. DVDs), Blu-ray Disc™, or other optical storage, volatile and non-volatile, removable and non-removable media implemented in any method or technology, random-access memory (RAM), read-only memory (ROM), electrically erasable programmable read-only memory (EEPROM), flash memory or other memory technology. Any such non-transitory computer/processor storage media may be part of a device or accessible or connectable thereto. Any application or module herein described may be implemented using computer/processor readable/executable instructions that may be stored or otherwise held by such non-transitory computer/processor readable storage media.

Turning now to the figures, some specific example embodiments will be described.

Figure 1:
FIG. 1 illustrates a picture portion of a digital image of a digital video.

Digital video comprises a series of digital images displayed in rapid succession. Each digital image includes a picture portion, which is what is displayed, and typically some ancillary information (e.g. audio, metadata, etc.). FIG. 1 illustrates the picture portion 102 of a digital image of a digital video. The picture portion 102 comprises an (m+1)×(n+1) grid of pixels, where each pixel has a location coordinate (x,y) on the picture 102 and a corresponding pixel value Y(x,y). The pixel value Y(x,y) is the visual information of the pixel at coordinate (x,y). For example, pixel value Y(x,y) may be the information designating what colour is to be displayed by that pixel and/or the luminance of the pixel. It will be appreciated that the pixel value Y(x,y) may include multiple components, for example, the following 3 components: either a set of three numbers respectively representing red, blue, and green (RBG), or a set of three numbers respectively representing luminance, colour difference of blue, and colour difference of red. For example, Y(x,y) may comprise three separate numbers: one representing the luminance of the pixel, and two representing colour differences. When an operation is performed on a pixel value Y(x,y) (e.g. Y(x,y) is multiplied by another value, such as an alpha value), the operation may be performed on each component of the pixel value (e.g. the luminance component and each colour difference value component).

The "Y" in "Y(x,y)" in general may be (and is) in some portions of the description below replaced with the letter designating the image being discussed. For example, an image F has a pixel value F(x,y) at pixel location (coordinate) (x,y).

Also, FIG. 1 is somewhat simplified for ease of explanation. For example, it could be the case in some implementations that the coordinates (x,y) may not start at (0,0). Also, although the word "pixel" is used herein, what is meant more generally is an addressable element of a display device. The display device may be, for example, a television or monitor.

Digital Video Effects and Video Mixing

A digital video may be manipulated to produce a digital video effect such as resizing, rotation, translation, and/or distortion of the video. Such manipulation may be performed by a digital video effects (DVE) device. A "DVE device" is sometimes also referred to as a "DVE system" or just a "DVE".

Figure 2:
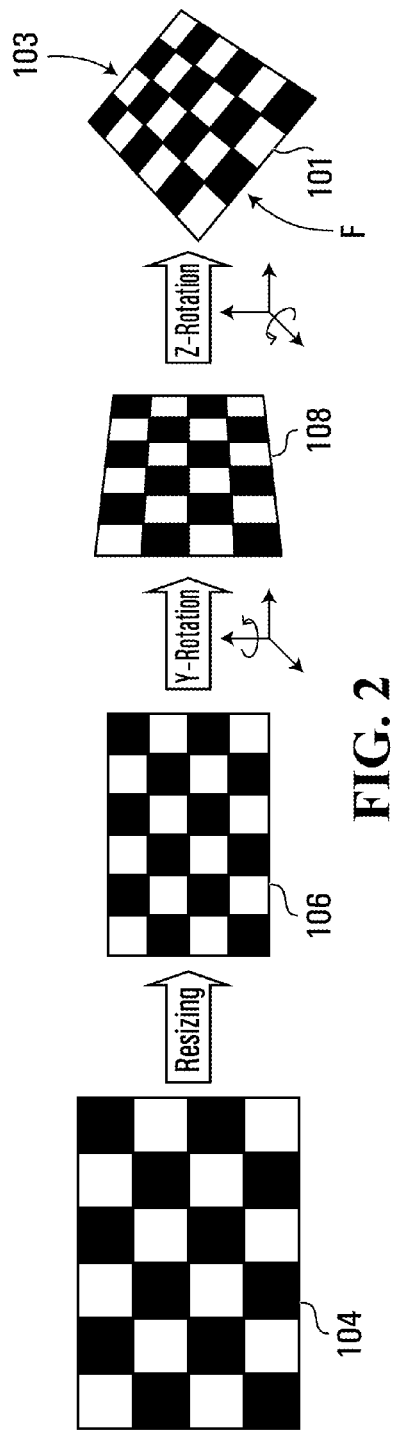
FIG. 2 illustrates an example process of a video image undergoing a sequence of 3-D manipulations.

A digital video effect is a visual effect which provides comprehensive video image manipulations in 3-D space, primarily dealing with resizing, rotation, translation or distortion of a source visual image. For example, FIG. 2 illustrates an example process of a video image undergoing a sequence of 3-D manipulations, specifically, resizing, followed by y-rotation, followed by z-rotation. As shown in the FIG. 2 example, a source video image 104 is resized to result in a shrunken image 106, which is then rotated around the y-axis to result in a rotated image 108, which is then rotated around the z-axis to result in the target image 110. By "3-D space", it is not meant that the resulting image is literally 3-D, but that it has a 3-D look, such as target image 110 in FIG. 2, which has a front portion 101 that appears closer to the viewer and a back portion 103 that appears farther from the viewer. The target image 110 is still made up of a 2-D grid of target pixels.

Figure 3:
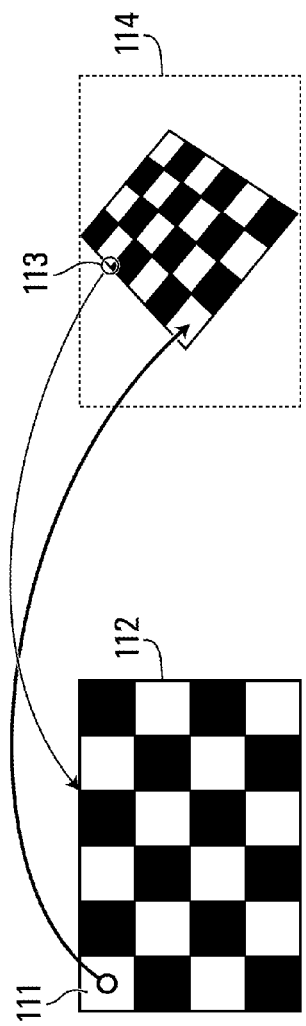
FIG. 3 illustrates forward mapping and inverse mapping.

One way to perform a digital video effect is to apply a geometric transformation (or mapping) of each digital image of the digital video. Such geometric transformations are also referred to as geometrical coordinates mapping. A geometrical mapping is called forward mapping if coordinates of a source video image are transformed into coordinates of a target video image. Conversely, a geometrical mapping is called an inverse mapping if a transform starts from a target video image and generates a source video image. FIG. 3 illustrates forward mapping and inverse mapping. As shown in FIG. 3, the center of the first block 111 in the source image 112 is mapped to a place between blocks in a target image 114. This is forward mapping. Conversely, the top boundary edge of the fourth target block 113 in the target image 114 is mapped onto a top boundary edge in the source image 112. This is inverse mapping. In the embodiments described with reference to the figures below, inverse mapping is used. Specifically, each coordinate of a transformed video image is mapped to a corresponding coordinate in the source video image. For example, the transformed video image may be built on a pixel-by-pixel basis by having a counter start at one pixel coordinate (e.g. (x,y)=(0,0)) and count up to another pixel coordinate ((e.g. (x,y)=(m,n)), and for each pixel coordinate compute, based on the transformation, the corresponding pixel coordinate in the source video image, which is used to derive a pixel value for the pixel coordinate.

A video source undergoing digital video effects in a DVE device may be further layered over one or more other video images using video mixing.

Video layering is a process that combines a sequence of separate video sources into a single video. One or more of these separate source videos may have been previously manipulated via a digital video effect, although this is not necessary. Video layering may provide a visual effect separate from (outside of that) provided by a DVE device, and/or video layering may be performed by a DVE device as part of the digital video effect.

Video layering is a type of video mixing, and may also be referred to as video compositing or video keying in production switchers.

Figure 4:
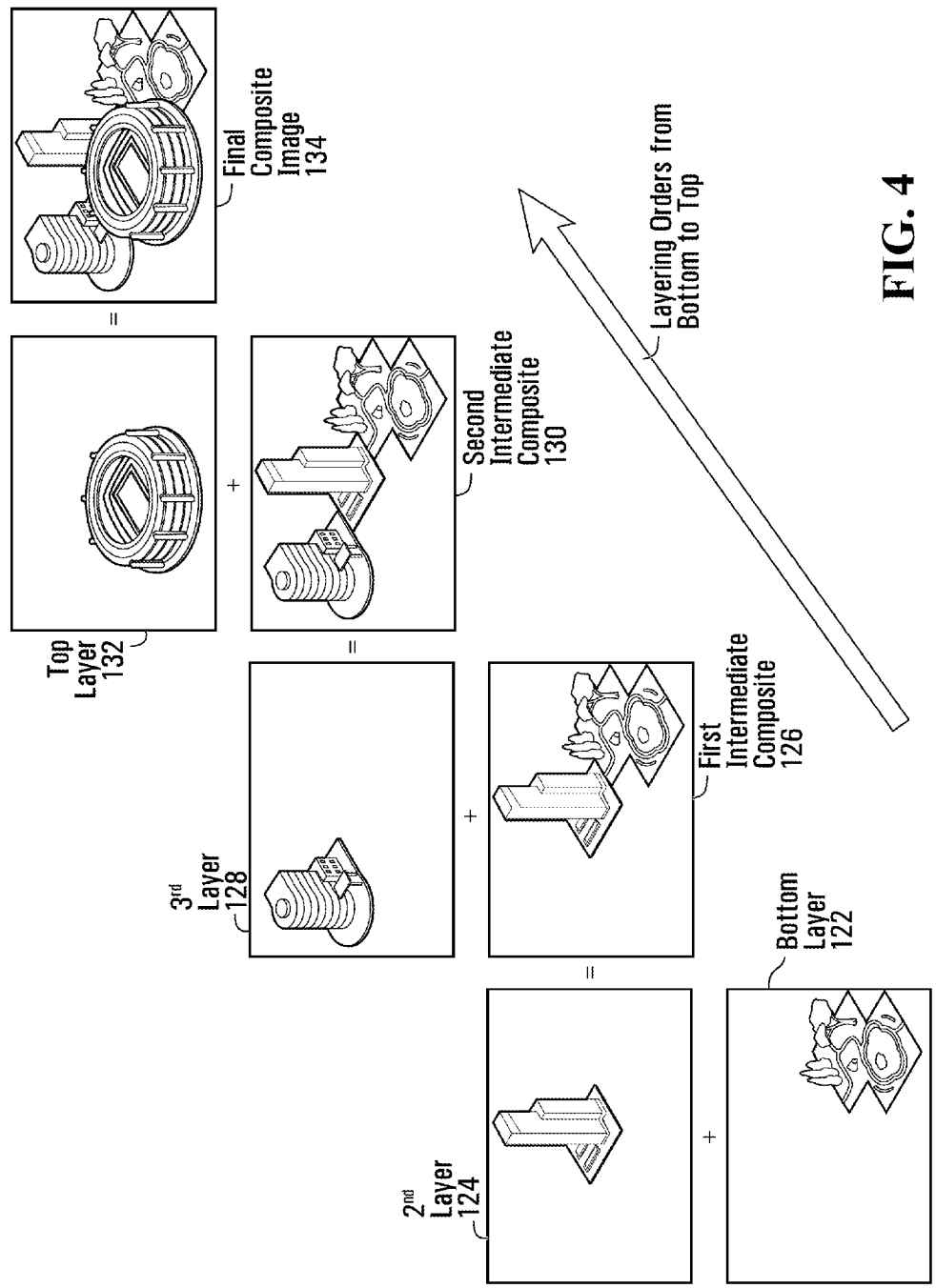
FIG. 4 illustrates an example process of layering four video images from bottom to top.

For example, FIG. 4 illustrates an example process of layering four video images from bottom to top. Specifically, in the example shown in FIG. 4, a second layer 124 is layered over a bottom layer 122 to generate a first intermediate composite layer 126. A third layer 128 is then layered over the first intermediate composite layer 126 to generate a second intermediate composite layer 130. A top layer 132 is then layered over the second intermediate composite layer 130 to generate the final composite video image 134.

Video layering may be performed by a mixer that mixes the video images together to generate the layered image. Such a mixer may use a method that is sometimes referred to as "A/B mix effect". Such a video mixing method implements the following function:

$$O_{mix} = \alpha A + (1-\alpha)B, \text{ where } \alpha \in [0,1]. \qquad \text{Equation (1)}$$

In Equation (1), the parameters "A" and "B" each represent a video image. The video image "A" is layered on top of the video image "B". The parameter $O_{mix}$ is the layered video image. The parameter "a" represents a keying alpha. The keying alpha may be independent of the videos A and B. Alternatively, the keying alpha may be associated with video image A. The keying alpha "α", and its role in Equation (1), is explained in detail below.

Some digital video images have an alpha associated with them, the purpose of which is to "blank out" (i.e. make transparent) the entire video image, except for an area or item of interest. Since a digital video comprises a series of digital video images, there may be an alpha associated with each video image in the video. These associated alpha values may be transmitted in an "alpha channel" associated with the video, which is a series of associated alphas, one for each video image. Sometimes such an alpha channel is referred to as an "alpha channel against normal RGB or YC components". However, in the remainder of this document, such an alpha channel will be referred to as an "associated alpha channel" that is associated with a particular video. Also, in the explanation below, often a digital video image is discussed (since the processing occurs on an image-by-image basis), and so "alpha channel" may not be used, but instead "associated alpha" may be used, it being understood that the associated alpha is associated with the particular digital video image, and the associated alpha may be part of an associated alpha channel.

Figure 5:
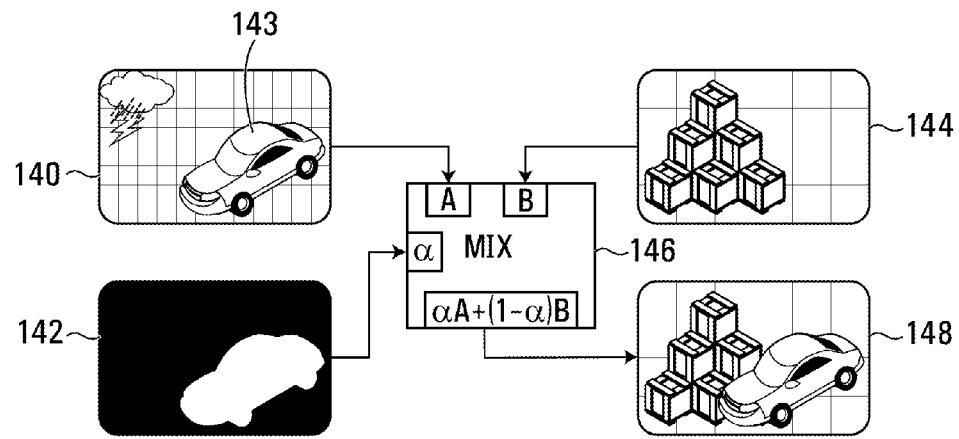
FIG. 5 illustrates an example of mixing two video images.

FIG. 5 illustrates an example of mixing two video images (a first video image 140 and a second video image 144), where the first video image 140 has an associated alpha α 142. A mixer 146 layers the first video image 140 on top of the second video image 144 to result in a composite video image 148. The mixer 146 may be implemented, for example, using dedicated circuitry for performing adding, subtracting, and multiplying operations (to compute Equation (1) above), or a general processor (general circuitry) that can perform such operations. For completeness, one example implementation of the mixer 146 is described later with reference to FIG. 6.

The alpha α 142 associated with the first video image 140 comprises a set of alpha values α(x,y), one for each pixel coordinate (x,y) in the first video image 140. The associated alpha α 142 is for making the entire first video image 140 transparent, except for around an object of interest, which in this example is the car 143. In one embodiment, this is achieved as follows: for a given pixel coordinate (x,y) in the first video image 140, the associated alpha value α(x,y) is set to 1 if the pixel coordinate falls within the area of interest (i.e. within the car); otherwise the associated alpha value α(x,y) is set to 0. This is illustrated in FIG. 5, as follows: the black area of associated alpha α 142 represents an alpha value of zero, and the white area of associated alpha α 142 represents an alpha value of one.

One way to apply the associated alpha α 142 to the first video image 140 is to multiply each pixel value Y(x,y) in the first video image 140 with its corresponding associated alpha value α(x,y). The examples illustrated herein use this method, which is one reason why α(x,y)=0 is used to denote full transparency of the first video image pixel and α(x,y)=1 is used to denote full opaqueness of the first image pixel. Specifically, when α(x,y)=0, then Y(x,y)×α(x,y)=Y(x,y)×0=0, which means that the image pixel displays no value and hence is fully transparent, and when α(x,y)=1, then Y(x,y)× α(x,y)=Y(x,y)×1=Y(x,y), which means the image pixel displays its full value. In some embodiments, the pixel coordinates on the border of the object of interest (i.e. on the edge of the car 143) may have an associated alpha value α(x,y) equal to a number between zero and one for semi-transparency to try to achieve a smoother transition between the object of interest (the car 143) and any background image over which the object of interest will be layered.

In the illustrated example, it is assumed that video image 144 has no associated alpha, or that it has already been applied to video image 144 (i.e. video image 144 has been "pre-shaped" by its associated alpha), such that video image 144 as illustrated is the area of interest for this image.

The mixer 146 implements equation (1), i.e.: $O_{mix}=\alpha A+(1-\alpha)B$.

Figure 6:
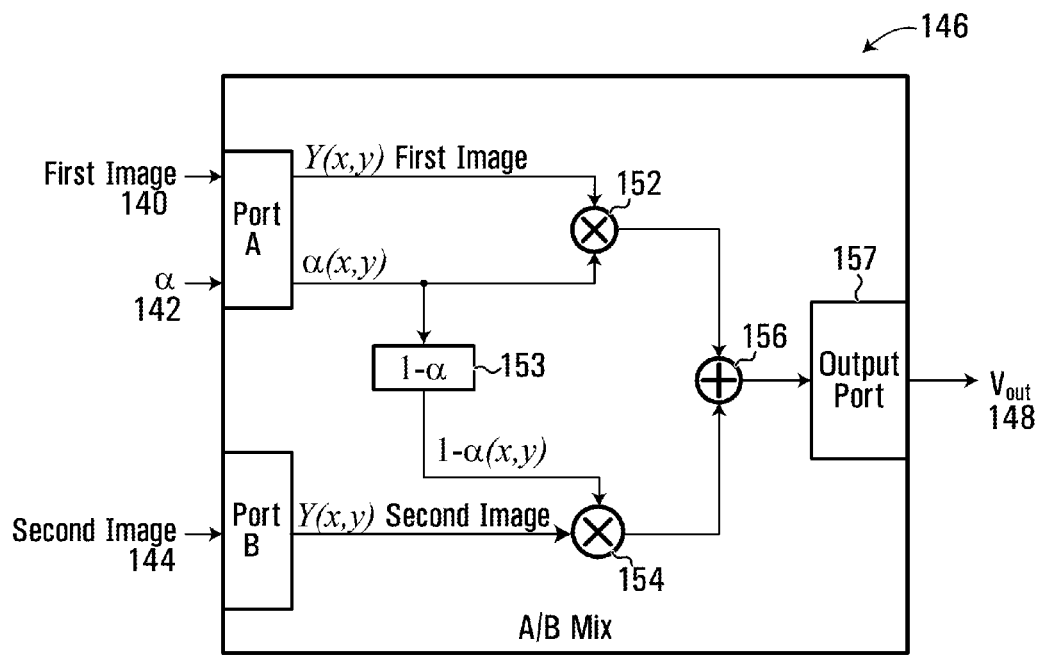
FIG. 6 illustrates an example implementation of a mixer.

FIG. 6 illustrates one example implementation of mixer 146. With reference to FIG. 6, the mixer 146 includes two input ports labelled Port A and Port B, multipliers 152 and 154, adder 156, and an output port 157. The input and output ports may be implemented, for example, by addressable memory (e.g. the first image 140 and alpha α 142 may be sent to Port A by respectively writing the first image 140 and the alpha α 142 to a designated memory location, and the second image 144 may be sent to Port B by writing the second image 144 to another designated memory location). The multipliers and adders may be implemented, for example, using digital logic multiplying and adding circuits (e.g. in the case of a multiplier a digital logic circuit that receives two input signals and multiplies them together, and in the case of an adder a digital logic circuit that receives two input signals and adds them together). The mixer 146 also includes a computational block 153 for computing a complementary associated alpha value 1−α. This may be implemented, for example, by a digital logic circuit that subtracts the input value α(x,y) from the value "1" for each associated alpha value α(x,y).

The mixer 146 multiplies each pixel value Y(x,y) in the first image 140 with its corresponding associated alpha value α(x,y). The complementary shaping alpha value, that is 1−α, is applied to the second image 144 in a similar manner, so that the pixels of the second image 144 are completely transparent when the corresponding pixels of the first image 140 are completely opaque, and vice versa, and so that a complementary amount of semi-transparency is applied to each second image pixel corresponding to a semi-transparent first image pixel.

More specifically, in operation, the "Port A" receives two inputs: the first image 140 and the associated alpha value α 142, and the "Port B" receives a single input: the second image 144. The associated alpha value α 142 is applied to the first image 140 by multiplying the first image 140 with the associated alpha value, as at multiplier 152. More specifically, each pixel value Y(x,y) in the first image 140 is multiplied with its corresponding associated alpha value α(x,y). The complementary associated alpha value 1−α is applied to the second image 144 in the same manner, as at multiplier 154. Then the two images are added, at adder 156, to form the layered output image 148. Thus, in this way, the mixer 146 in this example embodiment implements the function $O_{mix}=A\alpha+B*(1-\alpha)$ (i.e. Equation (1)), where A is the first video image 140 and B is the second video image 144.

In the embodiment described above with reference to FIGS. 5 and 6, the alpha value α is associated with the first video image 140. However, an A/B mix can also be used to produce a transition between the first video image 140 and the second video image 144, in which case the alpha value α may be independent of the video images 140 and 144, and instead defines the transition pattern. Such an alpha is sometimes called a wipe alpha. To avoid possible confusion, the wipe alpha will instead be represented using the symbol w. Therefore, a wipe alpha w is used by an A/B mixer to implement transition:

$$O_{mix}=wA+(1-w)B, \text{ where } w \in [0,1].$$  Equation (2)

Note that this is the same as Equation (1), except that the notation w is used instead of α to clarify that the alpha w is a wipe alpha defining the transition effect and is independent of the video images A and B.

Figure 7:
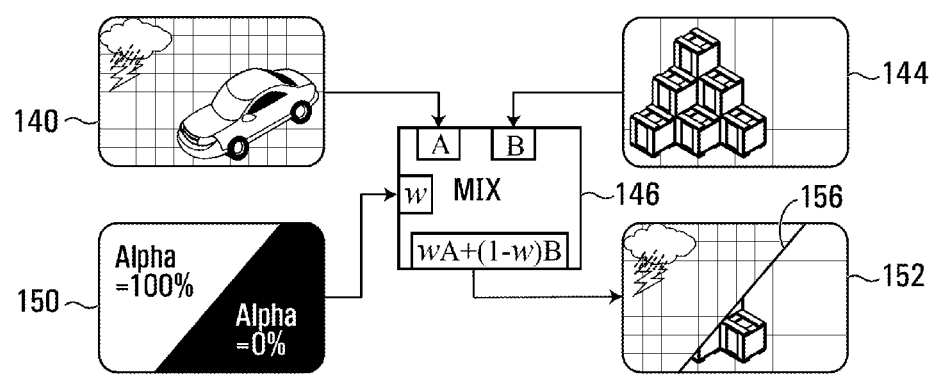
FIG. 7 illustrates one example of transitioning between two images using a wipe pattern.

For example, FIG. 7 illustrates one example of transitioning between the second image 144 and the first image 140 using a wipe defined by the wipe alpha w, which will be referred to as the "wipe pattern" w.

With reference to FIG. 7, there is illustrated the first video image 140. However, in this example it is assumed that the first video image 140 has no associated alpha α, or that it has been pre-applied (i.e. the first video image 140 has been pre-shaped by its associated alpha). There is also illustrated the second video image 144. In this example, it is also assumed that the second video image 144 does not have an associated alpha, or that it has also been pre-applied (i.e. the second video image 144 has been pre-shaped by its associated alpha). The mixer 146 is the same as that described above, except that it has a wipe pattern w 150 is associated with it, which provides a wipe between the first video image 140 and the second video image 144. Specifically, the black area of the wipe pattern w 150 represents an alpha value of zero (w=0), and the white area of the wipe pattern w 150 represents an alpha value of one (w=1). Therefore, when the mixer 146 performs the A/B mixing described above, the portion of the first video image 140 corresponding to wipe pattern values of 1 will show (completely opaque), and the portion of the first video image 140 corresponding to wipe pattern values of 0 will not show at all (completely transparent). Since the complementary wipe pattern (1−w) will be applied by the mixer 146 to the second image 144, the portion of the second image 144 corresponding to wipe pattern values of 1 will not show at all (completely transparent), and the portion of the second video image 144 corresponding to wipe pattern values of 0 will show (completely opaque). This generates composite video image 152.

In some embodiments, it may be the case that the value of the wipe pattern w around the transition between w=0 and w=1 (i.e. at the seam 156 between the first and second video images) is instead between zero and one in order to provide some "fuzziness" or "softness" around the seam 156 with the goal of improving the look of the seam 156 compared to a hard switch. This "softness" is produced by the mixing of semi-transparent pixels from both layers.

To wipe from the first video image 140 to the second video image 144, the wipe pattern w changes over time (e.g. every frame or field or under the control of a user in some embodiments), to reveal more of the second image 144 and show less of the first video image 140 until the wipe from the first video image 140 to the second image 144 is complete. Such a wipe may be performed, for example, in a production switcher.

Figure 8:
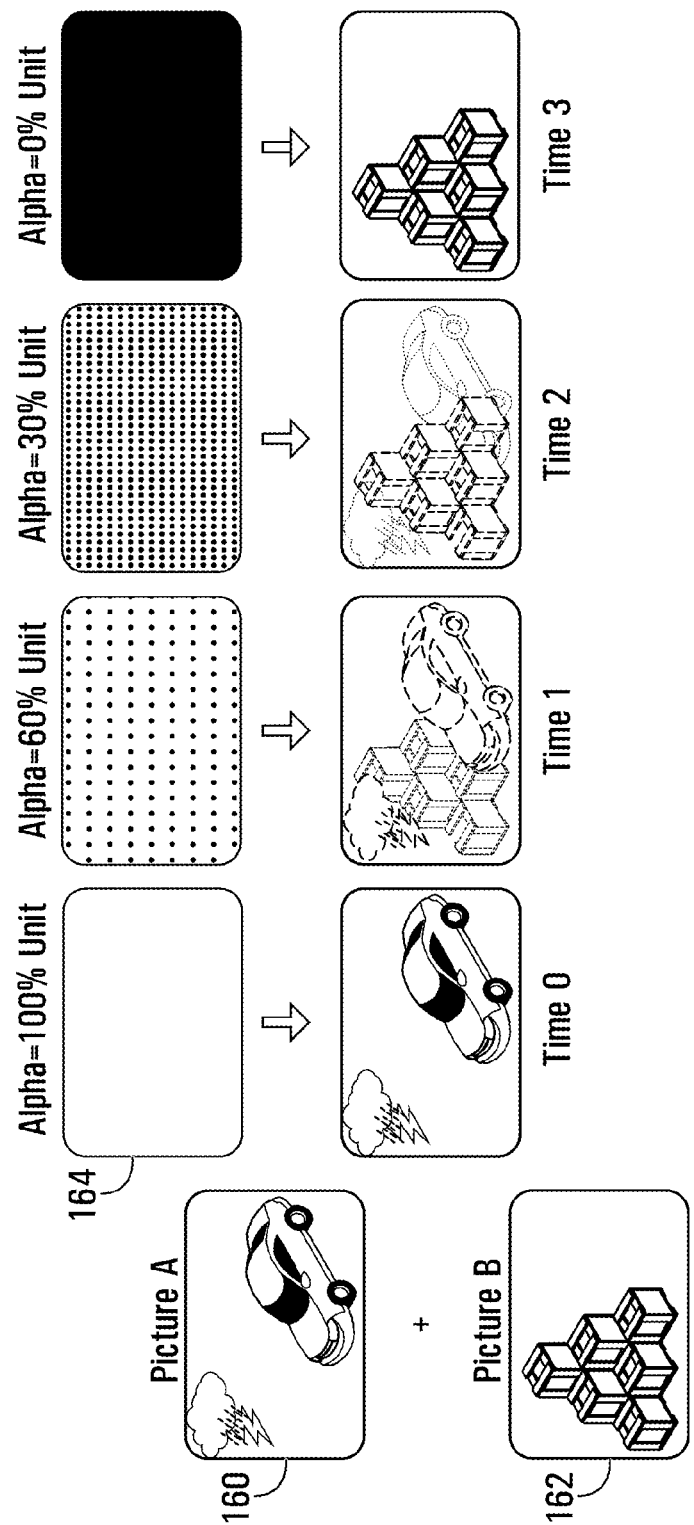
FIG. 8 illustrates an example dissolve transition.

A wipe transition is a spatial-variant pattern in that for a given wipe pattern w applied to a pair of images, the specific value of w for each coordinate, i.e., w(x,y), will vary. For example, in the wipe pattern w 150 shown in FIG. 7, the value of w changes from w=1 (in top left of the wipe pattern) to w=0 (in the bottom right of the wipe pattern). This differs from a dissolve transition, in which the keying alpha is not spatially variant (i.e. it takes on the same value everywhere), but does change over time in order to dissolve from one image into another. An example dissolve transition is illustrated in FIG. 8. As shown in FIG. 8, the dissolve transition is an effect that causes a first image 160 to dissolve into a second image 162. Specifically, at Time 0, the keying alpha 164 is equal to one ("100% unit") so that when the first image 160 is mixed with the second image 162 using the A/B mixer described above, the first image 160 will only show. At Time 1, the keying alpha is 0.6 ("60% unit") so that when the first image 160 is mixed with the second image 162 using the A/B mixer described above, the first image 160 will be 60% opaque and the second image will be 40% opaque. At Time 2, the keying alpha is 0.3 ("30% unit") so that when the first image 160 is mixed with the second image 162 using the A/B mixer described above, the first image 160 will be 30% opaque and the second image will be 70% opaque. Finally, at Time 3, the keying alpha is 0 ("0% unit") so that when the first image 160 is mixed with the second image 162 using the A/B mixer described above, only the second image 162 will show (the first image 160 will be completely transparent). It will be appreciated that "Time 0", "Time 1", "Time 2", and "Time 3" are meant to represent sequential snap-shots in time. The actual dissolve process may occur more gradually over a longer or shorter period of time that may be pre-configured and/or controlled by a user.

Wipe transitions are discussed in more detail and used herein, and therefore they deserve some additional attention.

As discussed above, a wipe transition may be defined by Equation (2): $O_{mix}=wA+(1-w)B$, where $w\epsilon[0,1]$ is the wipe pattern. Such a wipe transition may be used in television broadcast industries, for example, in production switchers.

In some embodiments it may be desirable that a wipe transition have what is referred to as a "strong rule of seamless switching". What this means is that if a wipe transition occurs between two videos A and B, and if it turns out that A and B are identical videos, then the mix output $O_{mix}=wA+(1-w)B$ should be identical to A and B, regardless of what type of wipe pattern w is being applied. That is, if videos A and B are identical, then a viewer should not even know there is a wipe between the two videos and should not see the seam between the two videos, regardless of the specific type of wipe pattern w being applied. This is:

If $A=B$, $O_{mix}=wA+(1-w)B=A=B$.    Equation (3)

This "strong rule of seamless switching" may be used as a test or check to see if equipment, such as a production switcher and/or a DVE device, implements wipe transitions of acceptable quality. If the "strong rule of seamless switching" is met, then the implementation of the wipe transitions may be considered of acceptable quality.

Such a "strong rule of seamless switching" may be achieved if using a mixer to implement the wipe using an A/B mix $O_{mix}=wA+(1-w)B$. Problems may occur in meeting the "strong rule of seamless switching", for example, if a mixer such as A/B mix $O_{mix}=wA+(1-w)B$ is not used for a particular transition effect, but instead an "ad hoc" approach is used to try to deal with a more complicated wipe transition (e.g. between three or more video sources when some of the video sources have transparent or semi-transparent areas and some or all of the video sources are intersected).

Wipe Patterns and Associated Alphas

In a production switcher, a wipe pattern w may be used to implement a wipe transition to seamlessly overlay a video image A over another video image B via an A/B mix. Generally, video image B is the background in the A/B mix effect. It may be assumed to be solid without any transparent or translucent areas. In other words, video image B is assumed not to be associated with any alpha (or at least if video image B had an associated alpha, it has already been applied so that video image B represents the area of interest). Video image A is assumed to have an associated alpha α that defines transparency or semi-transparency in video image A.

As an example, the video image B may be what is currently shown on air, and it may be desired to show on air video image A layered over video image B. For example, video image A may be a network logo to be layered over the image B on air. In such a situation, the current output on air is $O_{pgm}=B$, where $O_{pgm}$ stands for program output, and the desired end product is the preview:

$O_{pvw}=\alpha A+(1-a)B$.

Using the example above, $O_{pgm}=B$ may be what is currently shown on air, video image A may be a network logo to be displayed having an associated alpha α that makes all of image A transparent except for the logo, and $O_{pvw}=\alpha A+(1-\alpha)B$ is what is to be transitioned to (i.e. the network logo on top of what is currently shown on air). A transition is applied to switch from $O_{pgm}$ (i.e. what is currently on air) to $O_{pvw}$ (i.e. the desired end result in which the logo is on top of what is currently on air). Using the A/B mix effect to apply a wipe transition from $O_{pgm}$ to $O_{pvw}$:

$$O_{mix} = wO_{pvw} + (1-w)O_{pgm} \quad \text{Equation (4)}$$
$$= w[\alpha A + (1-\alpha)B] + (1-w)B$$
$$= w\alpha A + (1-w\alpha)B.$$

As can be seen from Equation (4), the wipe transition can be applied by using an A/B mix in which the alpha input is wα (i.e. the alpha α associated with image A modified by the wipe pattern w).

Shaping Alpha

In the description thus far, two types of alphas have been discussed:

(1) an alpha α associated with a video image, which defines transparency or semi-transparency in the video image and is used, for example, to highlight an object of interest in the video image and suppress or "blank out" (i.e. make transparent) the other areas of the image;

(2) a wipe alpha used for defining a transition effect between two video images, such as a wipe pattern w, which may be independent of the content of the video images themselves.

When a video image is subject to a digital video effect (e.g. 3-D manipulations such as resizing, rotation, and/or distortion), for example in a DVE device in a production switcher, another type of alpha may be generated that is associated with that transformed video image. This is referred to as a "shaping alpha" $\alpha_{shp}$. Specifically, the shaping alpha $\alpha_{shp}$ defines the resultant boundaries of a target video (i.e. the transformed source video) and helps layering the target video image on the top of other video images, after a source video undergoes a series of geometrical transformations. Values of the shaping alpha $\alpha_{shp}$ may also range from zero to one, where for a given pixel coordinate a zero indicates that the target image (transformed source image) is out of source bounds, and where one indicates that the target image is within the source bounds.

Figure 9:
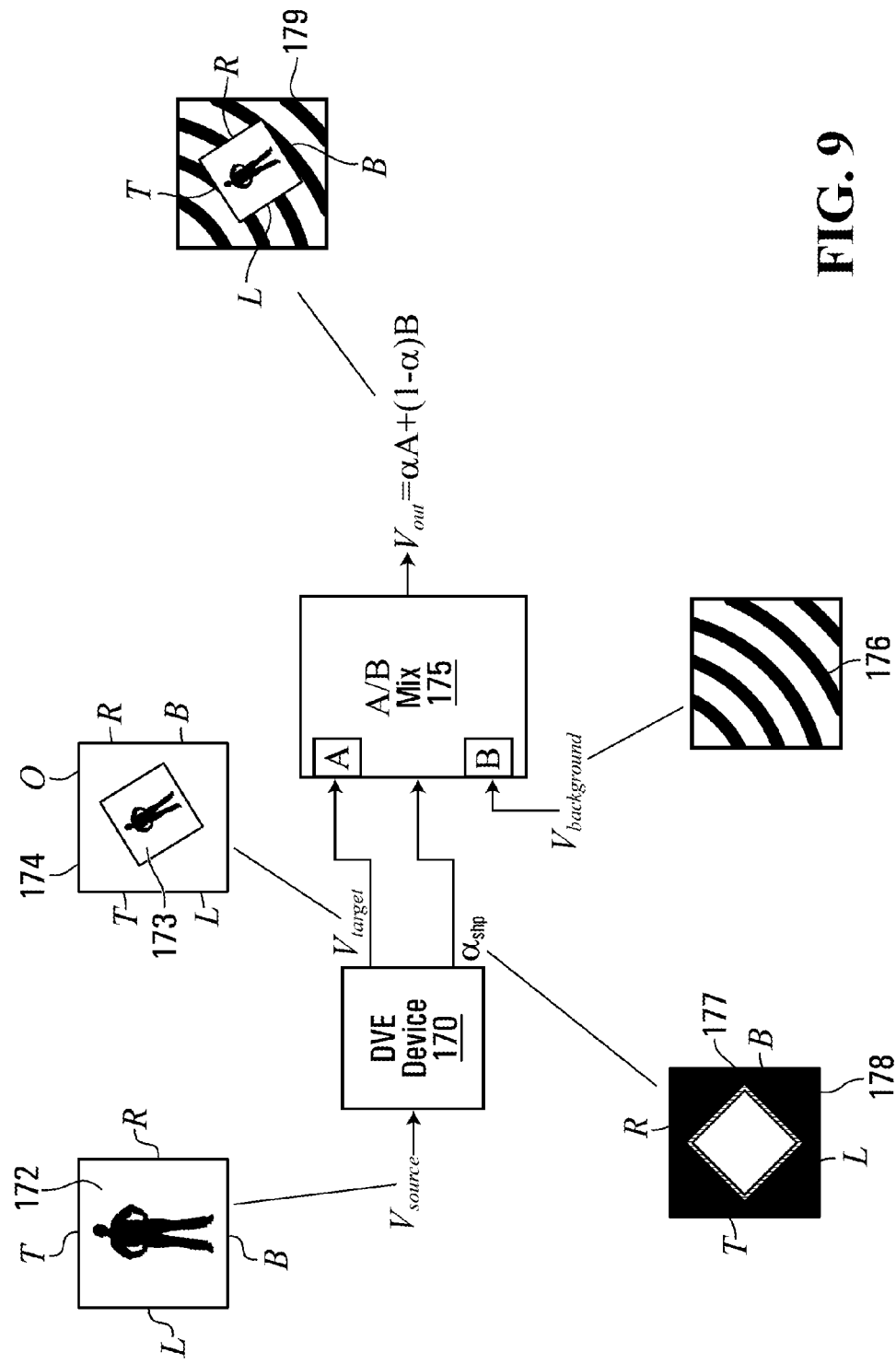
FIG. 9 illustrates an example digital video effects (DVE) device and A/B mixer.

For example, with reference to FIG. 9, there is illustrated an example DVE device 170 for transforming a source video image 172 to result in a target video image 174, as well as an A/B mixer 175 for layering the target video image 174 on top of a background image 176 to result in a composite output video image 179. As discussed herein, the DVE device 170 and/or the mixer 175 may be implemented, for example, by one or more field programmable gate arrays (FPGAs) and/or one or more application specific integrated circuits (ASICs) and/or one or more processors in a computational device (e.g. a central processing unit, a graphics processing unit, and/or a general-purpose computing on graphics processing units). FIG. 6 illustrates an example implementation of a mixer that may be used as the mixer 175, and FIG. 32 illustrates an example of circuitry that may comprise (or be part of) the DVE device 170.

In operation, the DVE device 170 receives as an input the source video image 172, and the DVE device 170 outputs the manipulated source video image 173 in a target video image 174. The mixer 175 layers the target video image 174 on top of the background image 176 to produce the output video image 179.

When the source video image 172 undergoes manipulation in the DVE device 170, a shaping alpha $\alpha_{shp}$ is also created, which defines the resultant boundaries of the transformed source image in the target image. The shaping alpha $\alpha_{shp}$ is particularly useful for situations like that illustrated in FIG. 9, in which the target image 174 is layered on top of the background image 176. Specifically, the shaping alpha $\alpha_{shp}$ may allow for a smooth transition between the boundaries of the transformed source image and the background image 176.

As shown in FIG. 9, the source video image 172 has left, right, top, and bottom boundaries, respectively denoted as L, R, T, and B. In the illustrated embodiment, the source video image 172 undergoes a manipulation by the DVE device 170 to generate the target video image 174. The manipulation illustrated involves moving the source video image 172 farther away from viewers and rotation around the z-axis in the x-y plane. There is an area O in the target image 174 that is outside the original source image 172. The DVE device 170 may set each target image pixel value Y (x,y) in area O to have a value equal to the value of the closest boundary pixel (i.e. the closest pixel on a boundary L, R, T, or B), although this is implementation specific.

Therefore, for a source image 172, the DVE device 170 creates a corresponding target image 174 that includes an object 173 representing the transformed source image 172. In general, some of the pixels of the target image 174 will be within source bounds (i.e. within object 173) and others will be outside source bounds (i.e. in area O). This scenario is illustrated in FIG. 9, it being understood that this is a generality. It could be the case, for example, that the object 173 encompasses all of target image 174.

The shaping alpha $\alpha_{shp}$ created by the DVE device 170 comprises a plurality of values, each one of the values of the shaping alpha $\alpha_{shp}$ corresponding to a respective pixel in the target image 174. Each one of the shaping alpha values of the shaping alpha $\alpha_{shp}$ will therefore be denoted as $\alpha_{shp}(x_t, y_t)$. As mentioned above, each value $\alpha_{shp}(x_t,y_t)$ in the shaping alpha may range from zero to one (i.e. $0 \leq \alpha_{shp}(x_t, y_t) \leq 1$). A value of zero indicates that the corresponding target image pixel is out of bounds of the source image (i.e. the pixel of the target image 174 is in area O), and therefore when the target image 174 is layered on top of the background image 176, that pixel of the target image will be completely transparent, such that only the background 176 is seen. On the other hand, a shaping alpha value $\alpha_{shp}(x_t,y_t)$ of one indicates that the corresponding target image pixel is within the bounds of the source image (i.e. the pixel of the target image 174 is within the area defined by L, R, T, and B), and therefore when the target image 174 is layered on top of the background 176, that pixel of the target image will be completely opaque in the sense that it will not show any of the background image and only show the target image. A shaping alpha value $\alpha_{shp}(x_t,y_t)$ between zero and one indicates a boundary condition (a border area of the object 173) in which partial transparency (semi-transparency) is present to allow for a smooth transition between the edge of the object 173 and the background image 176. The closer the shaping alpha value $\alpha_{shp}(x_t,y_t)$ is to one, the more the object 173 will show, and the closer the shaping alpha value is to zero, the more the background image 176 will show. By using the shaping alpha $\alpha_{shp}$, the transformed source image (i.e. the object 173) may be made to fade out gradually into the background image 176 at edge boundaries L, R, T, and B, which is typically more aesthetically pleasing to a human eye.

The shaping alpha $\alpha_{shp}$ corresponding to the target image 174 is shown as 178 in FIG. 9. The black area of the shaping alpha 178 represents shaping alpha values of zero (outside the source bounds), the white area of the shaping alpha 178 represents shaping alpha values of one (inside the source bounds), and the cross-hatched area 177 of the shaping alpha 178 represents shaping alpha values between zero and one (defining semi-transparency of the boundaries of the transformed source image).

Figure 10:
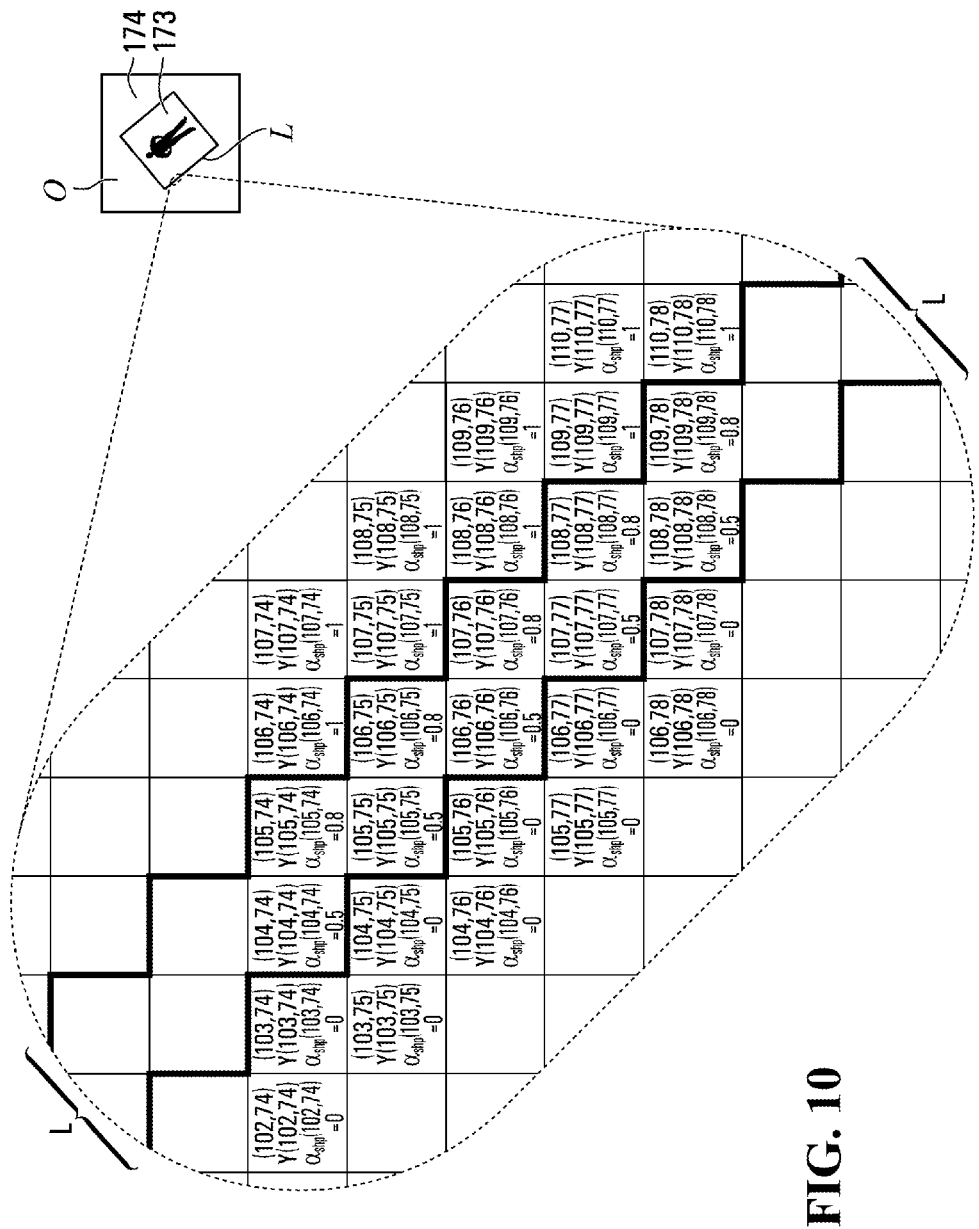
FIG. 10 illustrates a magnified portion of a boundary of a target image.

As a simple example to further help illustrate the principle of the shaping alpha $\alpha_{shp}$, consider FIG. 10, which illustrates a magnified portion of target image 174 around left boundary L, and which shows each pixel in the magnified portion. Each pixel has a coordinate (x,y) (e.g. (102,74)) and a corresponding pixel value $Y(x_t,y_t)$ (e.g. Y(102,74)). Also shown for each pixel is the corresponding shaping alpha value $\alpha_{shp}(x,y)$. The bold lines represent the boundary L. In this example, the boundary L is two pixels in width, and the shaping alpha values on the boundary L are between zero and one. This will cause the pixels on the boundary L to be semi-transparent, so that some of the background image 176 at the boundary L will be seen, when the background image 176 is layered underneath the target image 174. This two-pixel area/range in which the shaping alpha $\alpha_{shp}$ values are between zero and one is referred to as the "softness" range (or softness zone or softness margin). The pixels that are not on the boundary L (i.e. not in the softness range), will either be completely transparent and therefore show only the background image 176, or completely opaque so that only the target image 174 is seen and not the background image 176.

For example, target image pixel (103,74) is outside the boundary L and specifically in area O of the target image 174. Therefore, this pixel has a corresponding shaping alpha value of zero ($\alpha_{shp}$ (103,74)=0). This means that this pixel will be completely transparent in that it will only show the background image 176 at this pixel location when the background image 176 is layered underneath the target image 174. That is, no matter what the target image pixel value Y(103,74) is, it will not be displayed. Instead, only the pixel value of the background image 176 layered underneath the target image 174 will be displayed. On the other hand, target image pixel (106,74) is within the boundaries of the source image and has a corresponding shaping alpha value of one ($\alpha_{shp}$ (106,74)=1). This means that this pixel will be completely opaque in that it will only show the target image 174 at this pixel location when the background image 176 is layered underneath the target image 174. That is, Y(106,74) will be displayed with no corresponding background image pixel being shown. Target image pixel (105,74) is on the boundary L (specifically in the softness range) and therefore has a corresponding shaping alpha value that is between zero and one and specifically 0.8 in this example ($\alpha_{shp}$(105,74) =0.8). This means that this pixel of the target image 174 will have semi-transparency in that it will show some of the background image 176 at this pixel location when the background image 176 is layered underneath the target image 174. That is, no matter what the target image pixel value Y(105,74), the pixel value of the background image 176 layered underneath the target image 174 at this point will still also be partially displayed. Similarly, target image pixel (104,74) is also on the boundary L and therefore has a corresponding shaping alpha value that is between zero and one and specifically 0.5 in this example ($\alpha_{shp}$(104,74)=0.5).

This means that this pixel of the target image 174 will also have semi-transparency in that it will show some of the background image 176 at this pixel location when the background image 176 is layered underneath the target image 174. Since 0.5 is closer to 0 than 0.8, the pixel value Y(104,74) will be more transparent than the pixel value Y(105,74). As mentioned above, a primary purpose of the shaping alpha is to cause the transformed source image (i.e. the object 173 in the target image 174) to fade out gradually into the background image 176 at edge boundaries of the object 173 (e.g. at boundary L), which is typically more aesthetically pleasing to a human eye.

Returning now to FIG. 9, the mixer 175 layers the target image 177 on top of the background image 176 to result in the composite image 179. The mixer 175 is an A/B mixer described above that uses equation (1): $O_{mix}=\alpha A+(1-\alpha)B$, where A is the target image 174, $\alpha=\alpha_{shp}$ that is associated with the target image, B is the background image 176, and $O_{mix}$ is the composite video image 179.

Note that if there is also an associated alpha $\alpha$ that is associated with the source video image 172, then this associated alpha $\alpha$ is also manipulated by the DVE 170 in the same way the source video image 172 is manipulated, and it becomes the alpha associated with the target image 174. It may be applied to the target image 174 by, for example, multiplying it by the shaping alpha prior to the mixer 175, i.e. $\alpha=\alpha\times\alpha_{shp}$.

Perspective Transformation and Image Depth

As discussed above, a DVE device may manipulate a video image to provide an effect such as resizing, rotation, translation, or distortion. This is shown, for example, in FIG. 2. The manipulation may be performed in a perspective transform engine in the DVE device. One way to perform the manipulation is as follows.

Assume a source image comprising a grid of 2-D pixels (like that illustrated in FIG. 1) is input into a DVE device to produce an output image, which is a manipulated version of the source image, such as a resized and rotated version of the source image. This output image will be referred to as a "target image", and it also comprises a 2-D grid of pixels. For example, with reference to FIG. 2, the source image may be image 104, and the target image may be image 110. The perspective transform engine in the DVE device performs the manipulation of the source image 104 to obtain target image 110 as follows. For each target pixel coordinate $(x_t,y_t)$, the target coordinate values $x_t$ and $y_t$ are input into the perspective transform engine, which computes the corresponding source pixel coordinate $(x_s,y_s)$ of the source image. The source pixel coordinate $(x_s,y_s)$ corresponding to the target pixel coordinate $(x_t,y_t)$ is a function of the manipulation being applied (i.e. the specific effect), and is controlled by transformation parameters. For example, in one embodiment, to obtain the corresponding x-coordinate of the source pixel (i.e. $x_s$) for a given target pixel coordinate $(x_t,y_t)$, the following computation is performed by the perspective transform engine:

$$x_s = T_d + \frac{(T_a x_t + T_b y_t + T_c f)P_d}{P_a x_t + P_b y_t + P_c f}.$$

Equation (5)

To obtain the corresponding y-coordinate of the source pixel (i.e. $y_s$) for a given target pixel $(x_t,y_t)$, the following computation is performed by the perspective transform engine:

$$y_s = T_h + \frac{(T_e x_t + T_f y_t + T_g f)P_d}{P_a x_t + P_b y_t + P_c f}. \qquad \text{Equation (6)}$$

Equations (5) and (6) are based on mapping of a target pixel coordinate to a corresponding source pixel coordinate using the following inverse mapping function (geometric transformation):

$$M^{-1} = \begin{bmatrix} T_a & T_b & T_c & T_d \\ T_e & T_f & T_g & T_h \\ P_a & P_b & P_c & -P_d \\ 0 & 0 & 0 & 1 \end{bmatrix}, \qquad \text{Equation (7)}$$

where $M^{-1}$ is a homogeneous matrix, inverse to a forward mapping M, where a 4×4 homogeneous matrix represents a geometrical transformation. The value f represents a focus distance between the viewer and the target screen.

In this example, $T_a$, $T_b$, $T_c$, $T_d$, $T_e$, $T_f$, $T_g$, $T_h$, $P_a$, $P_b$, $P_c$, $P_d$, and f are parameters set based on the specific effect being applied to the source image. For example, if it was desired to rotate the source image by 15 degrees and shrink the image to half its size, then the corresponding values of the parameters $T_a$, $T_b$, $T_c$ $T_d$, $T_e$, $T_f$, $T_g$, $T_h$, $P_a$, $P_b$, $P_c$, $P_d$, and f would be computed.

One way to compute the parameters is as follows. A matrix $M = M_t \times M_y \times M_z$ is computed, where $$M_t = \begin{bmatrix} 1 & 0 & 0 & x \\ 0 & 1 & 0 & y \\ 0 & 0 & 1 & z \\ 0 & 0 & 0 & 1 \end{bmatrix}$$

and represents the translation or shift in 3-n space by (x,y,z), where $$M_y = \begin{bmatrix} \cos\beta & 0 & -\sin\beta & 0 \\ 0 & 1 & 0 & 0 \\ \sin\beta & 0 & \cos\beta & 0 \\ 0 & 0 & 0 & 1 \end{bmatrix}$$

and represents the rotation at angle β around the y-axis, and where $$M_z = \begin{bmatrix} \cos\phi & -\sin\phi & 0 & 0 \\ \sin\phi & \cos\phi & 0 & 0 \\ 0 & 0 & 1 & 0 \\ 0 & 0 & 0 & 1 \end{bmatrix}$$

and represents a rotation at angle φ around the z-axis. $M^{-1}$ is then the inverse of M. Therefore, for a given effect, the translation and rotation angles around the y and z axis are determined. Then, $M = M_t \times M_y \times M_z$ is computed, which gives the effect of rotation around the z-axis first, then rotation around the y-axis, and then translation. Either in parallel to computing M (or from M), the inverse matrix $M^{-1}$ is computed to determine parameters $T_a$, $T_b$, $T_c$, $T_d$, $T_e$, $T_f$, $T_g$, $T_h$, $P_a$, $P_b$, $P_c$, $P_d$. Also, the focus f is determined based on the effect. Then, Equations (5) and (6) above may be computed for each target pixel coordinate $(x_t, y_t)$.

Equations (5) and (6) relate to the parameters from matrix $M^{-1}$ as follows. Subjected to perspective projection, the depth of a point in 3-D space may be expressed in terms of a target pixel coordinate $(x_t, y_t)$ such that $$\bar{z} = \left(\frac{z}{f}\right) = \frac{P_d}{P_a x_t + P_b y_t + P_c f},$$

where $\bar{z}$ is unified depth in terms of focus. The inverse mapped x-coordinate in a source image space is then expressed in terms of target coordinates such that $x_s = \bar{z}(T_a x_t + T_b y_t + T_c f) + T_d$, which is equal to Equation (5). The inverse mapped y-coordinate in a source image space is expressed in terms of target coordinates such that $y_s = \bar{z}(T_e x_t + T_f y_t + T_g f) + T_h$, which is equal to Equation (6).

Equations (5) and (6) may also be rearranged to instead be in terms of unified source coordinates $\bar{x}_s$ and $\bar{y}_s$:

$$\begin{cases} \bar{x}_s = \dfrac{x_s - T_d}{P_d} = \dfrac{T_a x_t + T_b y_t + T_c f}{P_a x_t + P_b y_t + P_c f} \\ \bar{y}_s = \dfrac{y_s - T_h}{P_d} = \dfrac{T_e x_t + T_f y_t + T_g f}{P_a x_t + P_b y_t + P_c f} \end{cases}.$$

For a given source video, the parameters above (i.e. the parameters in matrix $M^{-1}$, and the value of f) are computed on an image-by-image basis, although this need not be the case (particularly if the effect does not change between video images).

In the matrix $M^{-1}$, the parameters in the first two rows ($T_a$, $T_b$, $T_c$, $T_d$, $T_e$, $T_f$, $T_g$, $T_h$) generally relate to providing the transform, whereas the parameters in the third row ($P_a$, $P_b$, $P_c$, $P_d$) generally relate to providing the perspective.

The effect applied to the source image is 3-D in the sense that the target image can appear in 3-D space even though the screen is 2-D. For example, with reference to FIG. 2, the transformed target image 110 appears 3-D in that it has a front portion F that appears closer to the viewer than a back portion B. This means that each pixel coordinate $(x_t, y_t)$ in the target image (i.e. the transformed source image) has an associated depth value representative of how far the image pixel appears from the viewer. Specifically, as referenced above, the associated depth value for a target pixel coordinate $(x_t, y_t)$ is:

$$\bar{z} = \left(\frac{z}{f}\right) = \frac{P_d}{P_a x_t + P_b y_t + P_c f}, \qquad \text{Equation (8)}$$

where $\bar{z}$ is unified depth in terms of focus.

As also referenced above, the pixel coordinate in the source image $(x_s, y_s)$ corresponding to the target pixel coordinate $(x_t, y_t)$ is:

$$x_s = \bar{z}(T_a x_t + T_b y_t + T_c f) + T_d, \qquad \text{Equation (9)}$$

and $$y_s = \bar{z}(T_e x_t + T_f y_t + T_g f) + T_h. \qquad \text{Equation (10)}$$

Intersection Effect

Figure 11:
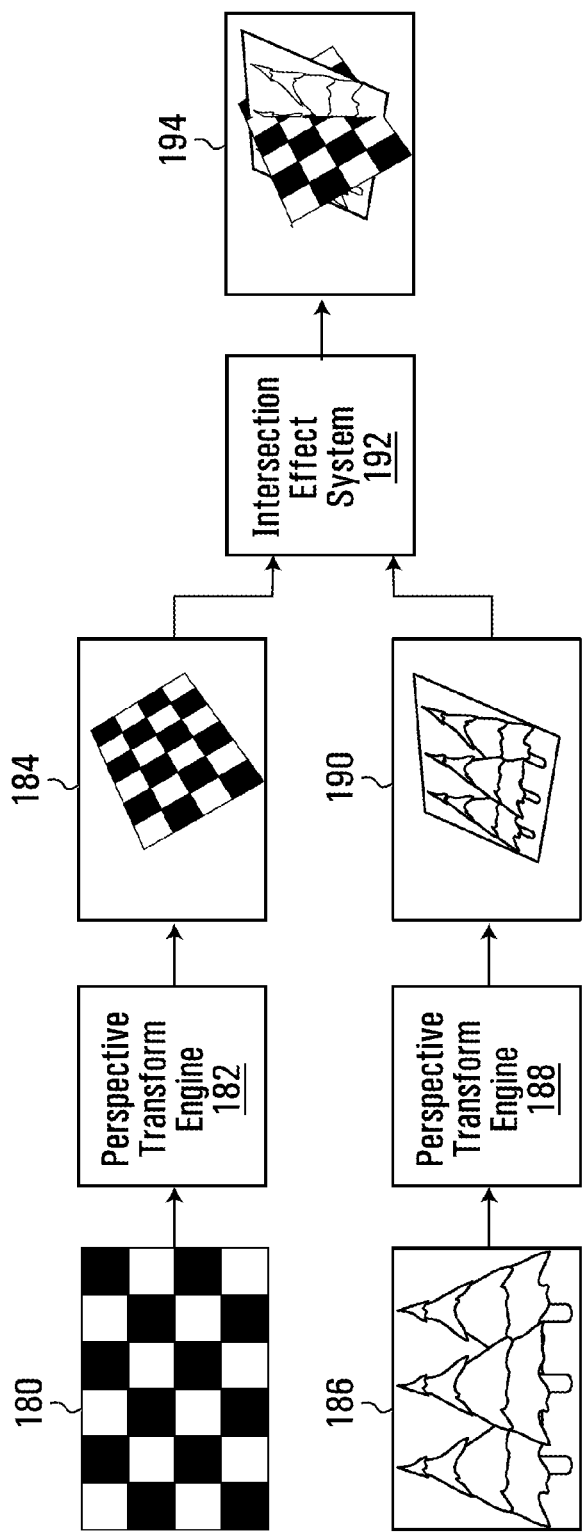
FIG. 11 illustrates an example system for performing an intersection effect.

As discussed above, a DVE device may manipulate a video image to provide an effect such as resizing, rotation, translation, or distortion. An intersection effect is another digital video effects feature that may be performed by a DVE device in which multiple of planar objects meet and cross each other in 3-D space. For example, FIG. 11 illustrates an example system for performing an intersection effect. Specifically, FIG. 11 illustrates a first perspective transform engine 182, a second perspective transform engine 188, and an intersection effect system 192 for performing intersection. The first and second perspective transform engines 182 and 188 are each for transforming respective input images 180 and 186. In FIG. 11, the first and second perspective transform engines are shown as separate blocks, but in some embodiments they may be the same. A perspective transform engine may be implemented, for example, by dedicated computational circuitry or by a general processor (general circuitry) that executes instructions stored in a memory to perform the perspective transform. An example implementation of a perspective transform engine is illustrated and discussed later in relation to FIG. 33. The intersection effect system 192 intersects two images to produce a composite image 194 that displays the intersection effect. The intersection effect system 192 may also be implemented, for example, by dedicated computational circuitry or by a general processor (general circuitry) that executes instructions stored in a memory to perform the intersection effect. Example circuitry for implementing an intersection effect system is illustrated and discussed later in relation to FIGS. 38 to 43.

In operation, the first perspective engine 182 receives first image 180 and subjects it to a transformation to produce a first transformed image 184, which is still a 2-D image, but because of the transformation has the look of being 3-D (i.e. having a depth). Similarly, the second perspective transform engine 188 receives second image 186 and subjects it to another transformation to produce a second transformed image 190, which is also still a 2-D image, but because of the transformation has the look of being 3-D (i.e. having a depth). The intersection effect system 192 receives as its input each transformed image 184 and 190 and intersects the two images to produce a composite image 194 that displays the intersection effect, i.e. the intersection of images 184 and 190 at their middle areas.

Specifically, to perform the intersection in this embodiment, the composite image 194 is generated as follows: for each pixel location, if the second transformed image 190 has an associated depth value that exceeds the associated depth value of the first transformed image 184 (i.e. the first transformed image 184 appears closer to the viewer), then the pixel value of the first transformed image 184 is displayed. On the other hand, if the first transformed image 184 has an associated depth value that exceeds the associated depth value of the second transformed image 190 (i.e. the second transformed image 190 appears closer to the viewer), then the pixel value of the second transformed image 190 is displayed. The pixel locations at which transformed images 184 and 190 have the same associated depth value (i.e. appear equal distance from the viewer) are the intersection line.

Therefore, the intersection effect performs swapping of two images across their intersection line. Such a swap depends on the difference in depth between the two images.

As is clear from the two paragraphs above, creating the intersection of two transformed images takes into account the associated depth value of each pixel of each transformed image. This associated depth value is a value representative of how far away the image appears to the viewer due to the 3-D projection perspective effect. The depth value can be computed, for example, using the parameters defining the perspective transformation, e.g. as per Equation (8) above.

Figure 12:
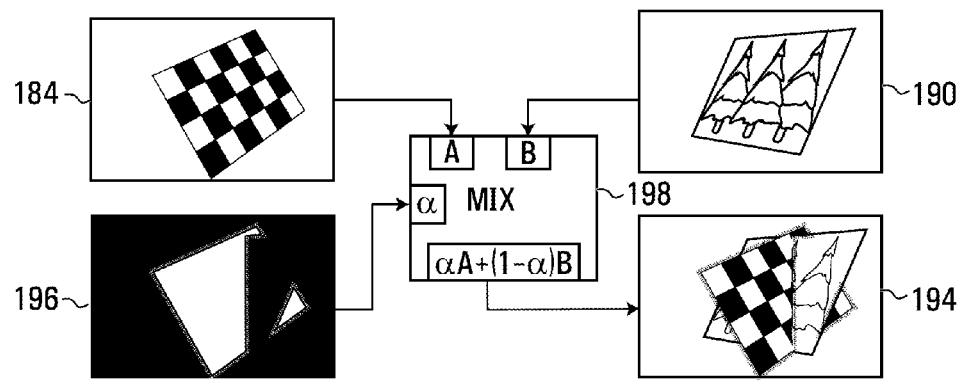
FIG. 12 illustrates a mixer for performing an intersection effect when one of the transformed images has an associated shaping alpha.

The description above with respect to FIG. 11 assumes that there is no associated shaping alpha $\alpha_{shp}$. If it is the case, for example, that one of the transformed images, say first transformed image 184, has a shaping alpha $\alpha_{shp}$ associated with it, then the intersection between the first and second transformed images 184 and 190 may be performed as follows: the shaping alpha $\alpha_{shp}$ associated with the first transformed image 184 may be modified so that the shaping alpha $\alpha_{shp}$ is set to zero at any pixel locations in which the first transformed image 184 has a depth that exceeds the depth of the second transformed image 190 (i.e. the first transformed image 184 appears to be farther away from the viewer than the second transformed image 190). Then, the first and second transformed images 184 and 190 may be combined using an A/B mixer, where the modified shaping alpha is used as the alpha applied by the mixer. This is illustrated in FIG. 12. Specifically, FIG. 12 illustrates the first transformed image 184 and an associated modified shaping alpha 196. A mixer 198 is also illustrated that performs A/B mixing in the manner described above (i.e. that implements Equation (1): $O_{mix}=\alpha A+(1-\alpha)B$). The mixer 198 may be implemented, for example, in the manner shown in FIG. 6. The second transformed image 190 is also input into the mixer 198, and the mixer 198 mixes the first transformed image 184 and the second transformed image 190 to produce composite image 194, which displays the intersection effect. Prior to the A/B mixing via mixer 198, the shaping alpha $\alpha_{shp}$ associated with first transformed image 184 is modified so that the shaping alpha $\alpha_{shp}$ is set to zero at any pixel locations in which the first transformed image 184 has a depth that exceeds the depth of the second transformed image 190 (i.e. the first transformed image 184 appears to be farther away from the viewer than the second transformed image 190). This is illustrated as modified shaping alpha 196 (where black is $\alpha_{shp}=0$, white is $\alpha_{shp}=1$, and cross-hatching is $0<\alpha_{shp}<1$). This is the alpha input into the mixer 198 (i.e. the $\alpha$ in $O_{mix}=\alpha A+(1-\alpha)B$).

As described above, one example way to produce an intersection effect is to use a depth difference to switch visibility between two video images. This depth-based method for visibility may be referred to as "Z-Buffer", particularly in computer graphics applications. The measurement of depth difference between two transformed images is explained below with reference to FIG. 13.

Figure 13:
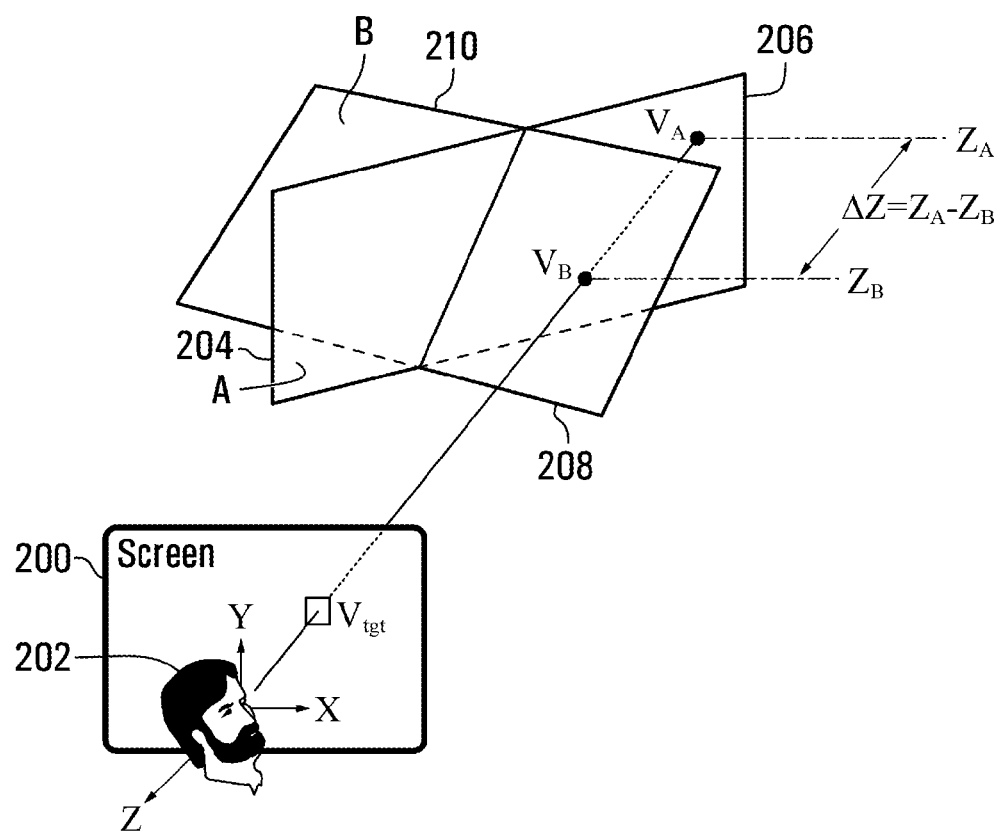
FIG. 13 illustrates a display screen on which a video image A intersected with another video image B could be displayed.

Turning to FIG. 13, there is illustrated a display screen 200 on which a video image A intersected with another video image B could be displayed. The display screen may be, for example, a television or a monitor. In FIG. 13, the screen 200 is offset from the intersected video images A and B to assist in illustrating the principle of perspective and image depth. In reality, the intersected images A and B would be displayed on the screen itself via a 2-D grid of pixels on the screen 200. For reference, FIG. 13 also includes a person 202 viewing the screen 200 (i.e. a viewer 202), as well as an x, y, and z axis of a geometrical coordinate system that originates at person 202.

In FIG. 13, video image A represents a source image that has been subject to a digital video effect (e.g. in a perspective transform engine in a DVE device) which, in FIG. 13 is rotation around the y-axis (with also some rotation around the x and/or z axes) to result in a 3-D look in which it appears that the left side 204 of image A is closer to the viewer 202 than the right side 206. Video image B represents another source image that has also been subject to a digital video effect which, in FIG. 13 is rotation around the x-axis (with also some rotation around the y and/or z axes) to result in a 3-D look in which it appears that the bottom 208 of image B is closer to the viewer 202 than the top 210.

The z-axis is representative of the perceived depth of each image A and B. Specifically, for a given target coordinate $V_{tgt}$ on the viewer's screen, there is a depth value $Z_A$ associated with that pixel coordinate on the video image A and another depth value $Z_B$ associated with that pixel coordinate on the video image B. These points on images A and B are respectively shown as $V_A$ and $V_B$ in FIG. 13. Depth value $Z_A$ at $V_A$ is a function of the perspective transformation applied to create image A, and depth value $Z_B$ at $V_B$ is a function of the perspective transformation applied to create image B. The difference between depth values $Z_A$ and $Z_B$, measured as $\Delta Z$, along the viewer's direction, and the visible image pixel $V_{tgt}$ at a target screen is expressed as $$V_{tgt} = \begin{cases} V_A & \Delta Z \geq 0 \\ V_B & \Delta Z < 0 \end{cases}, \text{ where } \Delta Z = Z_A - Z_B. \qquad \text{Equation (11)}$$

That is, the target pixel $V_{tgt}$ displayed on the screen is the corresponding pixel in image A (i.e. $V_A$) if the depth $Z_B$ of image B exceeds the depth $Z_A$ of image A (i.e. image A appears closer to the viewer), and the target pixel $V_{tgt}$ displayed on the screen is the corresponding pixel in image B (i.e. $V_B$) if the depth $Z_A$ of image A exceeds the depth $Z_B$ of image B (i.e. image B appears closer to the viewer).

In Equation (11), the difference in depth between image A and image B at target pixel coordinate $V_{tgt}$ is computed by subtracting the depth value $Z_B$ of image B from the depth value $Z_A$ of image A (i.e. $\Delta Z = Z_A - Z_B$). This is because a convention is being assumed in which the z-axis intersects the screen 200 at z=0, and that positive values of the z-axis are in front of the screen 200 between the screen 200 and the viewer 202, and that negative values of the z-axis are behind the screen 200, such that the farther away an image appears from the viewer, the larger the negative number of the associated depth. For example, in FIG. 13, $Z_A$ may be, for example, $Z_A=-5$, and $Z_B$ (which is appears closer to the viewer 202) may be, for example, $Z_B=-3$, in which case $\Delta Z = Z_A - Z_B = -2$, which is less than zero and therefore (as per Equation (11)) the pixel of image B is displayed. In this example, the depth of image A ($Z_A=-5$) exceeds the depth of image B ($Z_B=-3$), and so the pixel of image B is correctly displayed. It will be appreciated that if a different convention for labelling the axes were used (e.g. positive values of the z-axis were behind the screen 200 and negative values of the z-axis were in front of the screen 200), then Equation (11) may need to be appropriately modified. In any case, the principle in this embodiment would remain the same: for each target pixel $V_{tgt}$ displayed on the screen 200, display the corresponding pixel $Z_A$ in image A if image A appears closer to the viewer; otherwise display the corresponding pixel $Z_B$ in image B.

If it is the case that for a given target pixel coordinate $V_{tgt}$ on the screen 200, the associated depth value of each of images A and B is the same (i.e. $\Delta Z = 0$), then Equation (11) indicates that image A is displayed. The value $\Delta Z = 0$ represents a point at which images A and B intersect. Having image A displayed on the intersection line is implementation specific. It could be the case that instead image B is displayed, or that a combination of both are displayed.

Figure 14:
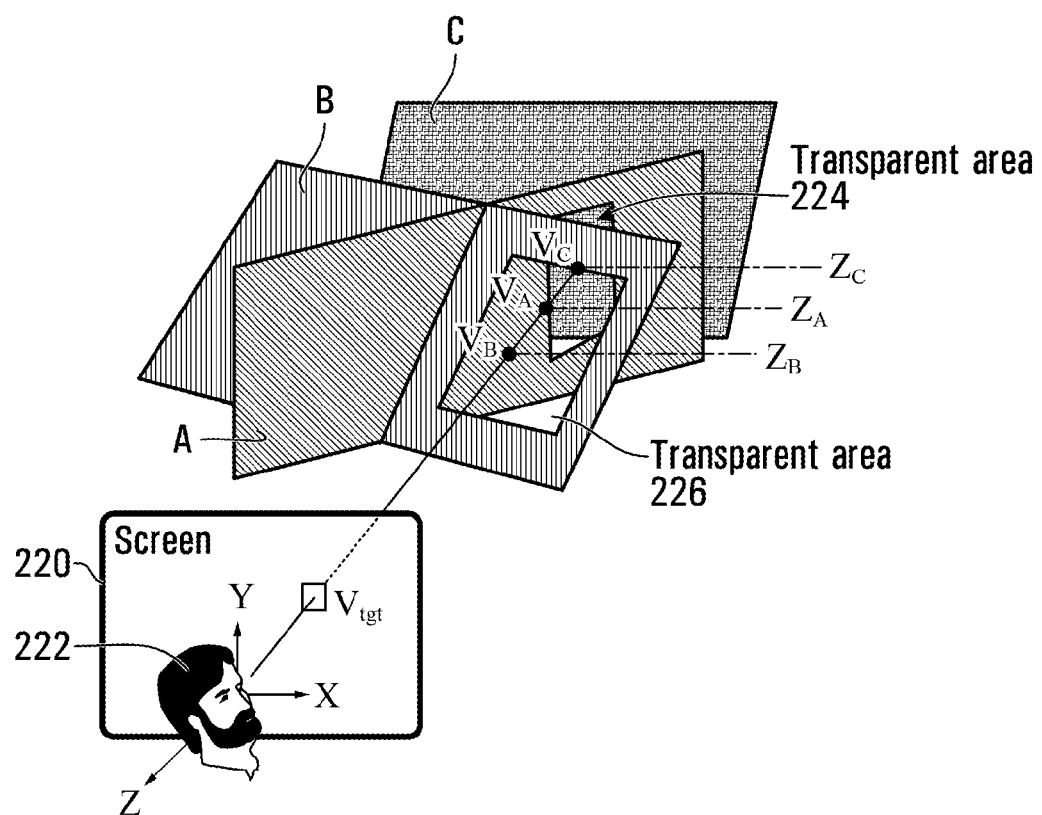
FIG. 14 illustrates a display screen on which a video image A intersected with another video image B, layered over a background C, with transparent areas in video images A and B, could be displayed.

When creating an intersection effect such as that described above, for example, in a DVE device in a production switcher, transparent areas in video images may require special consideration. For example, FIG. 14 illustrates a display screen 220 on which a video image A intersected with another video image B, and layered over a background C, could be displayed. Like in FIG. 13, the screen 220 in FIG. 14 is offset from the intersected video images A and B and background C to assist in illustrating the principle of perspective and image depth. In reality, the intersected images A and B layered over background C would be displayed on the screen 220 itself via a 2-D grid of pixels on the screen 220. For reference, FIG. 14 also includes a person 222 viewing the screen 220 (i.e. a viewer 222), as well as an x, y, and z axis of a geometrical coordinate system that originates at person 222.

In FIG. 14, video image A represents a source image that has been subject to a digital video effect (e.g. in a perspective transform engine in a DVE device) to result in a 3-D look. However, in this case video image A also has a transparent area 224. Similarly, video image B represents another source image that has been subject to another digital video effect to also result in a 3-D look, and video image B also has a transparent area 226. At target pixel $V_{tgt}$ on the screen 220, the depth value $Z_B$ associated with that pixel coordinate on the video image B (i.e. the depth value $Z_B$ at $V_B$) has a smaller absolute value compared to the absolute value of depth value $Z_A$ associated with that pixel coordinate on the video image A (i.e. the depth value $Z_A$ at $V_A$). That is, image B appears closer to the viewer than image A. However, as is shown in FIG. 14, image B is not to be displayed at target pixel coordinate $V_{tgt}$, rather background C should be displayed, as illustrated, due to the presence of transparent areas 224 and 226. If considering depth values only for creating an intersection effect in the manner described above, any transparency (or semi-transparency) is not automatically properly propagated through A and B into C, as illustrated in FIG. 14.

One way to address this is to not allow the intersection effect to be performed when the transformed images have transparent or semi-transparent areas. However, this limits the availability of the intersection effect. Another method is to develop an "ad hoc" or custom approach in which the transparent areas are identified and transformed video images A and B, as well as their associated alphas, are swapped at the transparent areas and layered, e.g. through Equation (1). However, such a method may not be able to be propagated into intersection effects in which more than 2 layers are intersected. Also, such an approach may not meet (or only barely meet) the "strong rule of seamless switching" described above in situations in which the intersection is occurring as part of a wipe transition from one video image to another.

One possible method to deal with multiple transparent or semi-transparent video images being intersected is to use a concept in computer graphics referred to as an A-buffer, which is described for example in the following references:

[1] Loren Carpenter, "The A-Buffer, an Anti-aliased Hidden Surface Method", SIGGRAPH '84, Computer Graphics, Vol. 18, No. 3, July 1984.

[2] Paul Haeberli and Kurt Akeley, "The Accumulation Buffer: Hardware Support for High-Quality Rendering", SIGGRAPH '90, Computer Graphics, Vol. 24, No. 4, August 1990.

Such a method applies super-sample or bit mask (multiple sub-pixels such as 4×8) to a pixel of interest, and accumulates all colors from its sub-pixel weighted by related sub-areas and opacities. The eventual summation yields color values to the pixel of interest for an anti-alias effect. However, in video applications, this method may be expensive (in terms of computational resources) and may not fit well in a video layering process in a production switcher.

Figure 15:
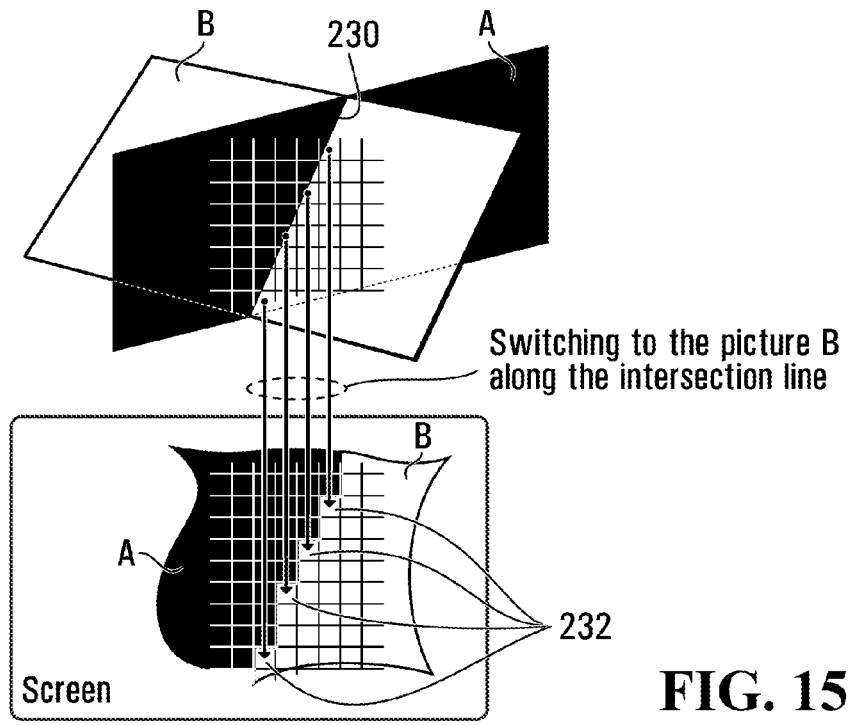
FIG. 15 illustrates a hard switch along an intersection line resulting in stepped edges.
Figure 16:
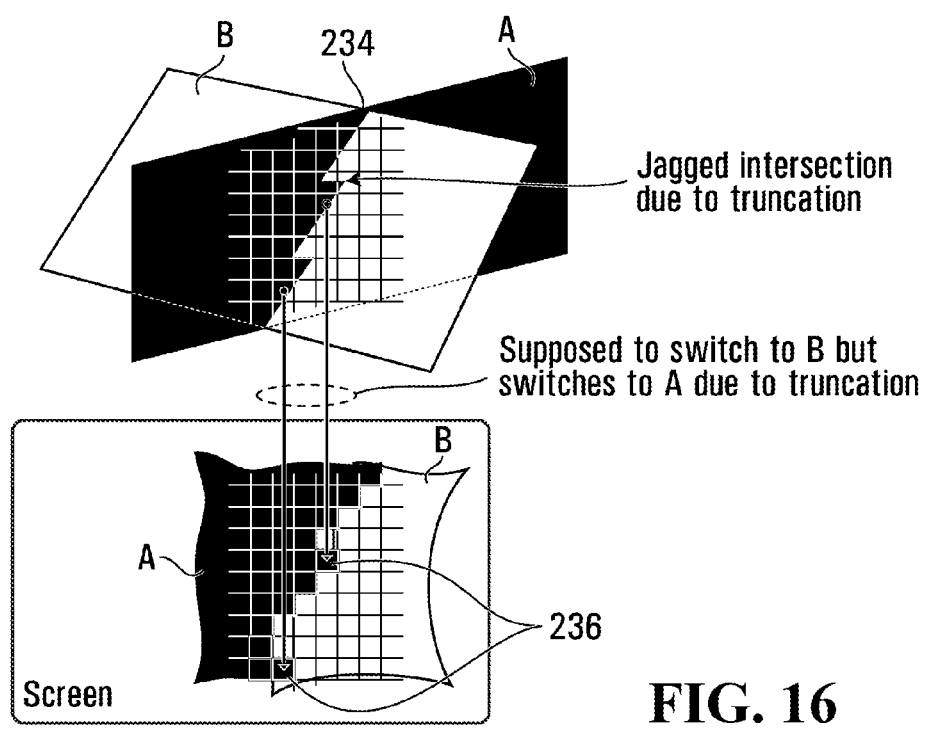
FIG. 16 illustrates the effect of depth accuracy errors on or adjacent to an intersection.

In addition to the issue of dealing with the intersection of video images having transparent (or semi-transparent) areas, the intersection method described above with reference to FIG. 13 and Equation (11) may also result in visible jagged or stepped edges along the intersection line. This may be caused due to a hard switch between significant sample areas, from one pixel to the other along the intersection line, and may be further exacerbated by depth accuracy errors due to calculation truncation or calculation rounding (sometimes called "z-fighting" in computer graphics), and by the perspective projection effect itself in which areas of the image that appear farther away from the viewer have larger stepstair edges, and areas of the image that appear nearer to the viewer have smaller step-stair edges. For example, FIG. 15 illustrates a hard switch along an intersection line 230 resulting in stepped edges 232. FIG. 16 illustrates the effect of depth accuracy errors on or adjacent to an intersection 234 resulting in a jagged intersection due to calculation truncation (or rounding) in which pixels 236 adjacent the intersection line should ideally be those of image B but are instead those of image A.

The following provides alternative systems and method for performing an intersection effect in which transparent and/or semi-transparent areas in one or more of the images may be accommodated, and/or in which a uniformly smooth intersection between images may be obtained. Specifically, in the description below, first methods and systems for performing an intersection effect using a wipe-based mix are discussed, and then methods and systems for aiming to provide a uniformly smooth transition across the intersection are discussed.

Using a Wipe to Perform the Intersection Effect

As is clear from the above, an intersection effect performs swapping of images across an intersection line. Such a swap depends on the difference in depth between the images.

In embodiments discussed below, a wipe pattern based on depth difference is applied to multiple video layers for a general wipe transition that provides an intersection effect.

First consider two images to be intersected: image $F_1$ having associated alpha $\alpha_1$, and image $F_2$ having associated alpha $\alpha_2$. More specifically, assume the images are pre-shaped by their associated alpha, as described below, prior to their intersection, so that the output is the intersection of the pre-shaped images. That is, $F_1$ is pre-shaped by its associated alpha $\alpha_1$ to result in $\hat{F}_1=\alpha_1 F_1$, and $F_2$ is pre-shaped by its associated alpha $\alpha_2$ to result in $\hat{F}_2=\alpha_2 F_2$, and the output of the intersection effect is an image displaying the intersection of $\hat{F}_1$ and $\hat{F}_2$.

Figure 17:
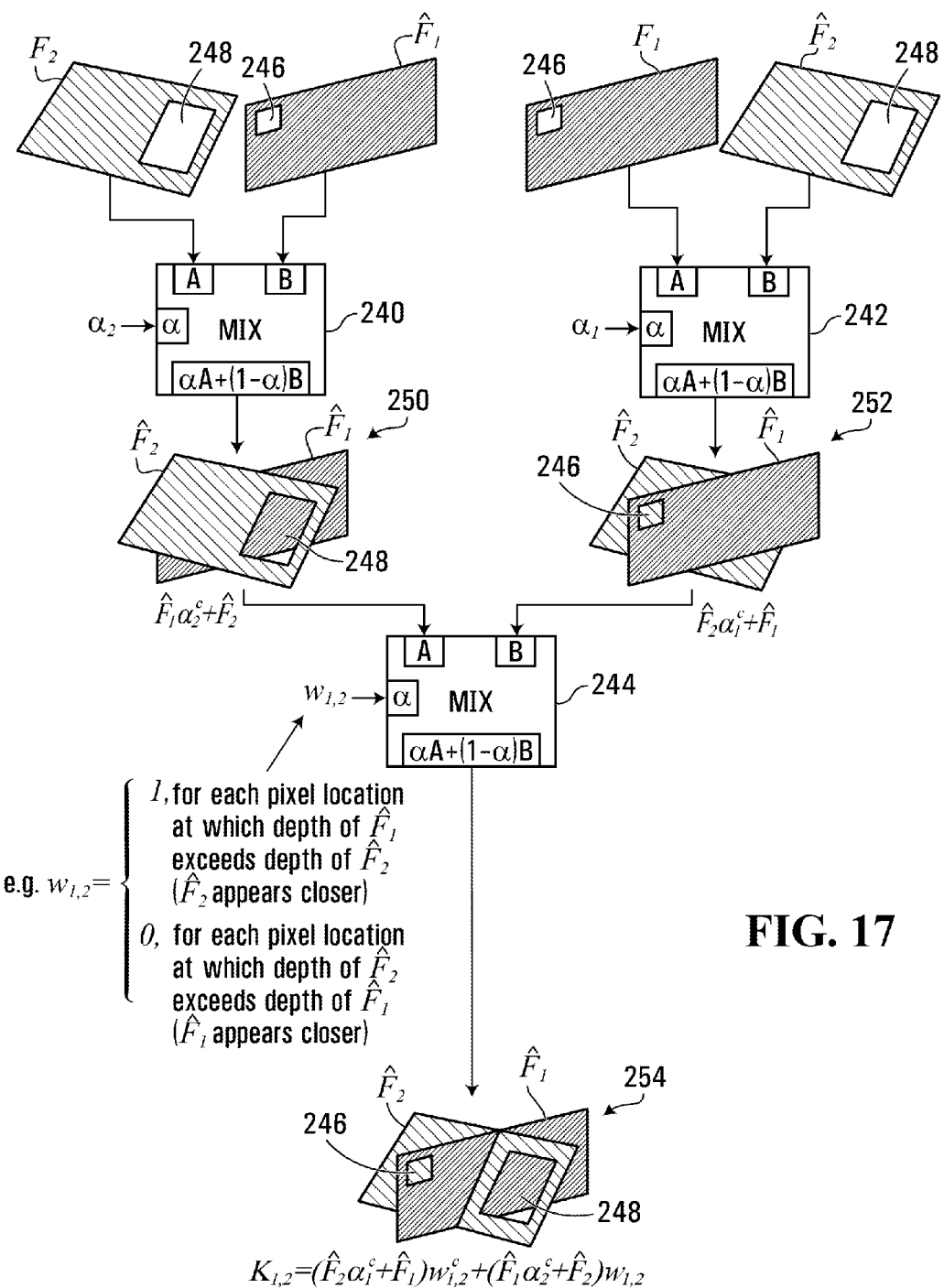
FIG. 17 illustrates an example of how two images may be intersected using a wipe-based mix.

FIG. 17 illustrates an example of how the two images may be intersected using a wipe-based mix. Specifically, as shown in FIG. 17, there are three A/B mixers 240, 242, and 244, each of which may be implemented as described above (e.g. as shown in FIG. 6, for example). Each A/B mixer implements Equation (1), which is the A/B mix: $\alpha A+(1-\alpha)B$. The input to each of these A/B mixers is different and is described as follows.

On the left hand side of FIG. 17 image $\hat{F}_1$ is illustrated. The pre-shaped version is used (i.e. $\hat{F}_1=\alpha_1 F_1$) since, as explained below, it acts as the background image in A/B mixer 240. In general, $\hat{F}_1$ is a transformed source image that may have a transparent or semi-transparent area. To show this generality, in FIG. 17, image $\hat{F}_1$ is provided with a transparent area 246, although the present disclosure is still applicable to images without transparent or semi-transparent areas. The associated alpha $\alpha_1$ defines the transparent area 246. In some embodiments, the associated alpha $\alpha_1$ may also incorporate a shaping alpha $\alpha_{shp}^1$ generated when the original source image was manipulated via a perspective transform to result in the transformed source image $F_1$. For example, the shaping alpha $\alpha_{shp}^1$ may be incorporated by multiplying it with the associated alpha $\alpha_1$ i.e. $\alpha_1=\alpha_1 \times \alpha_{shp}^1$.

Another image $F_2$ is also illustrated. The pre-shaped version is not used since, as is clear from the below, its associated alpha $\alpha_2$ is instead applied by A/B mixer 240. In general, $F_2$ is also a transformed source image that may have a transparent or semi-transparent area. To show this generality, in FIG. 17, image $F_2$ is provided with a transparent area 248, although the present disclosure is still applicable to images without transparent or semi-transparent areas. The associated alpha $\alpha_2$ is applied to define the transparent area 248. In some embodiments, the associated alpha value $\alpha_2$ may also incorporate a shaping alpha $\alpha_{shp}^2$ generated when the original source image was manipulated via a perspective transform to result in the transformed source image $F_2$.

Mixer 240 layers $F_2$ on top of $\hat{F}_1$ to produce composite image 250. That is, the output of mixer 240 is: $(1-\alpha_2)\hat{F}_1+\alpha_2 F_2=\hat{F}_1 \alpha_2^c+\hat{F}_2$, where $\alpha_2^c=(1-\alpha_2)$. Thus, the output of mixer 240 (i.e. composite image 250) is the resulting image when $\hat{F}_2$ is mixed with the background $\hat{F}_1$. The image $\hat{F}_2$ is on top, and the transparent area 248 in $\hat{F}_2$ correctly shows the image $\hat{F}_1$.

On the right hand side of FIG. 17, the order switches. That is, a mixer 242 layers $F_1$ on top of $\hat{F}_2$ to produce composite image 252. That is, the output of mixer 250 is: $(1-\alpha_1)\hat{F}_2+\alpha_1 F_1=\hat{F}_2 \alpha_1^c+\hat{F}_1$, where $\alpha_1^c=(1-\alpha_1)$. Complementary alphas such as $\alpha_1^c$ are also sometimes denoted $\alpha'_1$.

Thus, the output of mixer 242 (i.e. composite image 252) is the resulting image when $\hat{F}_1$ is mixed with background $\hat{F}_2$. The image $\hat{F}_1$ is on top, and the transparent area 246 in $\hat{F}_1$ correctly shows the image $\hat{F}_2$.

Composite images 250 and 252 are then input into further A/B mixer 244, which implements a wipe pattern $w_{1,2}$ to produce the intersection of images $\hat{F}_1$ and $\hat{F}_2$, as shown in composite image 254, which is the output of the mixer 244. Specifically, by using a wipe pattern $w_{1,2}$ based on a difference in depth between images $\hat{F}_1$ and $\hat{F}_2$ at each pixel location (i.e. pixel coordinate), the wipe pattern $w_{1,2}$ may be used to construct the composite image 254 showing the intersection. One way to achieve this is as follows. For each pixel location:

(1) if the depth of image $\hat{F}_2$ at the pixel location exceeds the depth of image $\hat{F}_1$ at the pixel location (i.e. if image $\hat{F}_1$ appears closer to the viewer), then the pixel value of the composite image 254 at the pixel location is set as the pixel value of the composite image 252 at the pixel location (i.e. the image where $\hat{F}_1$ is on top of $\hat{F}_2$);

(2) if the depth of image $\hat{F}_1$ at the pixel location exceeds the depth of image $F_2$ at the pixel location (i.e. if image $\hat{F}_2$ appears closer to the viewer), then the pixel value of the composite image 254 at the pixel location is set as the pixel value of the composite image 250 at the pixel location (i.e. the image where $\hat{F}_2$ is on top of $\hat{F}_1$).

By this method the intersection effect is created, and the transparent areas 246 and 248 are correct, as each possible layering of the transparent areas are first created in composite images 250 and 252, and then the correct one chosen depending on whether $\hat{F}_1$ appears closer to the viewer or $\hat{F}_2$ appears closer to the viewer.

The output of mixer 244 is:

$$O_{mix}=K_{1,2}(\hat{F}_2\alpha_1^c+\hat{F}_1)w_{1,2}^c+(\hat{F}_1\alpha_2^c+\hat{F}_2)w_{1,2}.\qquad\text{Equation (12)}$$

The intersection occurs when $\hat{F}_1$ and $\hat{F}_2$ appear equally close to the viewer (i.e. the depth difference between images $\hat{F}_1$ and $\hat{F}_2$ is equal to zero). On the intersection line (i.e. when the depth difference is zero), the wipe pattern $w_{1,2}$ may be implemented, for example, to display either composite image 250 or composite image 252. Alternatively, in other embodiments, to try to allow for a smoother transition across the intersection line, the wipe pattern $w_{1,2}$ may be implemented to apply some "fuzziness" or "softness" in a softness range around the intersection line through the mixing of pixel values from each of composite image 250 and 252 on and around the intersection line. One example of such a wipe pattern may be as follows. For each pixel location:
(1) if the depth of image $\hat{F}_2$ at the pixel location exceeds the depth of image $\hat{F}_1$ at the pixel location (i.e. if image $\hat{F}_1$ appears closer to the viewer) by a first threshold amount, then the pixel value of the composite image 254 at the pixel location is set as the pixel value of the composite image 252 at the pixel location (i.e. the image where $\hat{F}_1$ is on top of $\hat{F}_2$)
(2) if the depth of image $\hat{F}_1$ at the pixel location exceeds the depth of image $\hat{F}_2$ at the pixel location (i.e. if image $\hat{F}_2$ appears closer to the viewer) by a second threshold amount, then the pixel value of the composite image 254 at the pixel location is set as the pixel value of the composite image 250 at the pixel location (i.e. the image where $\hat{F}_2$ is on top of $\hat{F}_1$).
(3) otherwise, the pixel value of the composite image 254 at the pixel location is set as combination of the pixel value of the composite image 252 at the pixel location and the pixel value of the composite image 250 at the pixel location.
The first threshold amount and the second threshold amount may be equal to each other or different from each other.
One example way to implement the wipe pattern above is as follows:

$$w_{1,2} = \begin{cases} \dfrac{\Delta Z/\Delta_f + 1}{2} & |\Delta Z| < \Delta_f \\ 1 & \Delta Z \geq +\Delta_f \\ 0 & \Delta Z \leq -\Delta_f \end{cases} \quad \text{Equation (13)}$$

where $\Delta_f$ is a number representing the softness range, which in some embodiments may be controlled by a user (e.g. through a user interface), and $\Delta Z$ is the depth difference between images $\hat{F}_1$ and $\hat{F}_2$. The "first threshold" mentioned in the paragraph above may be $+\Delta_f$ and the "second threshold" mentioned in the paragraph above may be $-\Delta_f$ (or vice versa).

In this wipe pattern, when $\Delta Z=0$ (i.e. on the intersection line), then $w_{1,2}=0.5$, which means that both the pixel value from composite image 252 and the pixel value from composite image 250 contribute equally to the pixel value on the intersection line in composite image 254. More generally, in Equation (13), when the absolute value of the depth difference between the images $\hat{F}_1$ and $F_2$ is less than $\Delta_f$ (i.e. on or around the intersection line), then both the pixel value from composite image 252 and the pixel value from composite image 250 contribute to the pixel value in the composite image 254. This and other wipe patterns will be discussed in more detail later.

Figure 18:
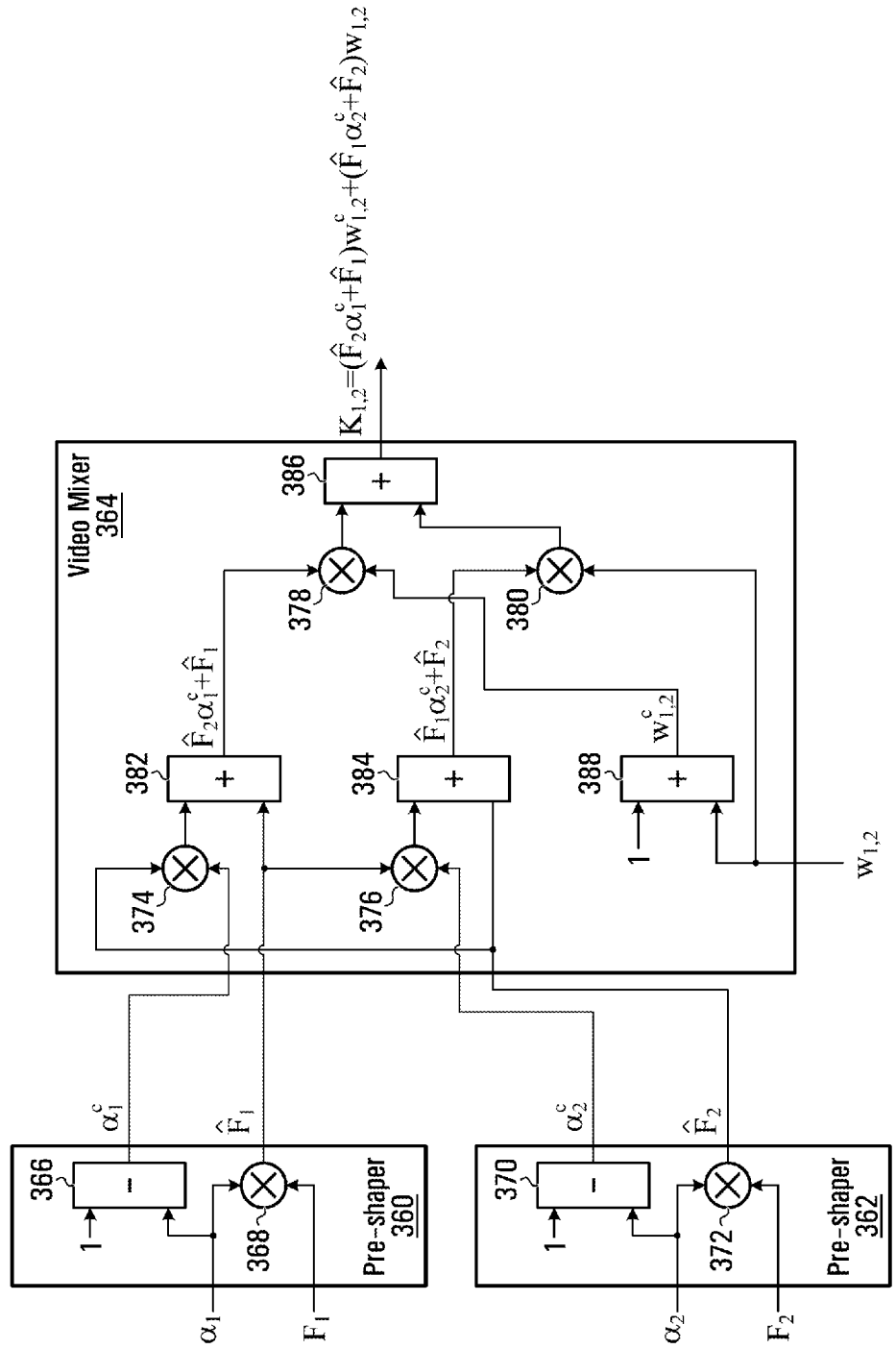
FIG. 18 illustrates two pre-shapers and a video mixer for performing an intersection of two images.

The embodiments described above with reference to FIG. 17 disclose how two images $\hat{F}_1$ and $\hat{F}_2$ may be intersected using three A/B mixers. A more compact implementation using a single video mixer is illustrated in FIG. 18. Specifically, FIG. 18 illustrates two pre-shapers 360, 362 and a video mixer 364 for performing an intersection of two images. Pre-shaper 360 comprises a subtractor 366 and a multiplier 368. Pre-shaper 362 also comprises a subtractor 370 and a multiplier 372. The video mixer 364 comprises four multipliers 374, 376, 378, and 380, as well as three adders 382, 384, and 386, and a subtractor 388. The multipliers, adders, and subtractors of FIG. 18 may be implemented, for example, using digital logic for subtracting two input signals (in the case of the subtractors) or digital logic for adding two input signals (in the case of the adders) or digital logic for multiplying two inputs signals (in the case of the multipliers). As will be seen from FIG. 18, mixing still occurs even though A/B mixers per se (of the type described with respect to FIG. 6) are not used. Instead, pre-shapers and a single video mixer (that performs multiple mixes) are used.

In operation, the pre-shaper 360 multiplies input image $F_1$ with its associated alpha $\alpha_1$ at multiplier 368 to obtain pre-shaped image $\hat{F}_1 = \alpha_1 F_1$. The pre-shaper 360 also computes the complementary of associated alpha $\alpha_1$, i.e. $\alpha_1^c = 1 - \alpha_1$, by subtracting $\alpha_1$ from one at subtractor 366. The pre-shaper 362 operates in the same way as pre-shaper 360, except that the input is image $F_2$ and associated alpha $\alpha_2$. Specifically, the pre-shaper 362 multiplies input image $F_2$ with its associated alpha $\alpha_2$ at multiplier 372 to obtain pre-shaped image $\hat{F}_2 = \alpha_2 F_2$. The pre-shaper 362 also computes the complementary of associated alpha $\alpha_2$, i.e. $\alpha_2^c = 1 - \alpha_2$, by subtracting $\alpha_2$ from one at subtractor 370.

The video-mixer 364 creates composite images 250 and 252 and mixes them using a wipe pattern $w_{1,2}$. Specifically, composite image 252 is created as follows: $\hat{F}_1$ and $\hat{F}_2$ are mixed to produce composite image 252 in which $\hat{F}_1$ is layered on top of $\hat{F}_2$ by multiplying $\alpha_1^c$ with $\hat{F}_2$ at multiplier 374, and then adding this to $\hat{F}_1$ at adder 382 to obtain $\hat{F}_2\alpha_1^c + \hat{F}_1$. Composite image 250 is created as follows: $\hat{F}_1$ and $\hat{F}_2$ are mixed to produce composite image 250 in which $\hat{F}_2$ is layered on top of $\hat{F}_1$ by multiplying $\alpha_2^c$ with $\hat{F}_1$ at multiplier 376, and then adding this to $\hat{F}_2$ at adder 384 to obtain $\hat{F}_1\alpha_2^c + \hat{F}_2$. The composite images $\hat{F}_2\alpha_1^c + \hat{F}_1$ and $\hat{F}_1\alpha_2^c + \hat{F}_2$ are then mixed using wipe pattern $w_{1,2}$ to produce the intersection of $\hat{F}_1$ and $\hat{F}_2$ as follows: $w_{1,2}$ is subtracted from one at subtractor 388 to obtain $w_{1,2}^c = 1 - w_{1,2}^c$, and then $w_{1,2}^c$ is multiplied by $\hat{F}_2\alpha_1^c + \hat{F}_1$ at multiplier 378 to obtain $(\hat{F}_2\alpha_1^c + \hat{F}_1)w_{1,2}^c$ and $w_{1,2}$ is multiplied by $\hat{F}_1\alpha_2^c + \hat{F}_2$ at multiplier 380 to obtain $(\hat{F}_1\alpha_2^c + \hat{F}_2)w_{1,2}$, and then $(\hat{F}_2\alpha_1^c + \hat{F}_1)w_{1,2}^c$ is added to $(\hat{F}_1\alpha_2^c + \hat{F}_2)w_{1,2}$ at adder 386 to obtain Equation (12):

$$K_{1,2} = (\hat{F}_2\alpha_1^c + \hat{F}_1)w_{1,2} + (\hat{F}_1\alpha_2^c + \hat{F}_2)w_{1,2}.$$

Figure 19:
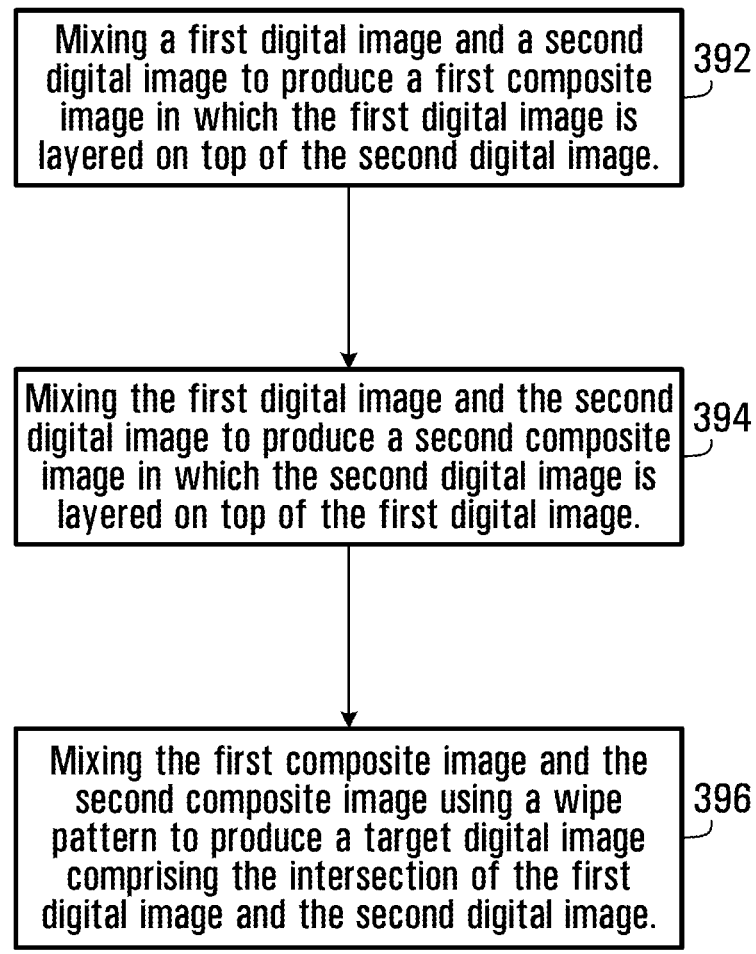
FIG. 19 illustrates a method for intersecting a first digital image and a second digital image.

In view of the description above in relation to FIGS. 17 and 18, there is disclosed more generally the following method for intersecting a first digital image (e.g. $\hat{F}_1$) and a second digital image (e.g. $\hat{F}_2$). Specifically, FIG. 19 illustrates such a method.

In step 392, the first digital image (e.g. $\hat{F}_1$) and the second digital image (e.g. $\hat{F}_2$) are mixed to produce a first composite image (e.g. $\hat{F}_2\alpha_1^c + \hat{F}_1$) in which the first digital image (e.g. $\hat{F}_1$) is layered on top of the second digital image (e.g. $\hat{F}_2$).

In step 394, the first digital image (e.g. $\hat{F}_1$) and the second digital image (e.g. $\hat{F}_2$) are mixed to produce a second composite image (e.g. $\hat{F}_1\alpha_2^c + \hat{F}_2$) in which the second digital image is layered on top of the first digital image.

In step 396, the first composite image (e.g. $\hat{F}_1\alpha_2^c + \hat{F}_1$) and the second composite image (e.g. $\hat{F}_1\alpha_2^c + \hat{F}_2$) are mixed using a wipe pattern (e.g. $w_{1,2}$) to produce a target digital image (e.g. $K_{1,2}$ defined in Equation (12)) comprising the intersection of the first digital image (e.g. $\hat{F}_1$) and the second digital image (e.g. $\hat{F}_2$).

Because the intersection effect described above uses a wipe-based mix for performing the intersection of two images, it may be possible to achieve the "strong rule of seamless switching" mentioned earlier.

By way of further example, FIG. 20, which includes FIGS. 20A and 20B, illustrates an example of how the two images above may be intersected using a wipe based mix when there is a third background image B. Specifically, as shown in FIG. 20, there are three A/B mixers 352, 354, and 356, each of which may be implemented as described above (e.g. as shown in FIG. 6, for example). Each A/B mixer implements Equation (1), which is the A/B mix: $\alpha A+(1-\alpha)B$. The input to each of these A/B mixers is different and is described as follows.

On the left hand side of FIG. 20, mixer 352 layers the second image $\hat{F}_2$ on top of the first image $\hat{F}_1$ to produce a composite image 314. That is, the output of mixer 352 is: $\hat{F}_1\alpha_2^c+\hat{F}_2$.

On the right hand side of FIG. 20, mixer 354 layers the first image $\hat{F}_1$ on top of the second image $\hat{F}_2$ to produce composite image 316. That is, the output of mixer 354 is: $\hat{F}_2\alpha_1^c+\hat{F}_1$.

Composite images 314 and 316 are then input into a further mixer 356, which implements a wipe pattern $w_{1,2}$ to produce the intersection of $\hat{F}_1$ and $\hat{F}_2$, as shown in composite image 322, which is the output of the mixer 356. Specifically, by using a wipe pattern $w_{1,2}$ based on a difference in depth between $\hat{F}_1$ and $\hat{F}_2$ at each pixel location (i.e. pixel coordinate), the wipe pattern $w_{1,2}$ may be used to construct the composite image 322 showing the intersection. Specific examples of wipe patterns to achieve this are described above and also later.

The output of the mixer 356 is Equation (12):

$$K_{1,2}=(\hat{F}_2\alpha_1^c+\hat{F}_1)w_{1,2}^c+(\hat{F}_1\alpha_2^c+\hat{F}_2)w_{1,2}.$$

This is then mixed with background image B via multiplier 358 and adder 359 as follows: the background image B is multiplied by $\alpha_{1,2}^c=\alpha_1^c\times\alpha_2^c$ at multiplier 358, and then that intermediary value is added to $K_{1,2}$ at adder 359. The output of adder 359 is:

$$O_{mix}=B\alpha_{1,2}^c+K_{1,2}. \qquad \text{Equation (14)}$$

where $\alpha_{1,2}^c=\alpha_1^c\times\alpha_2^c$, and $K_{1,2}=(\hat{F}_2\alpha_1^c+\hat{F}_1)w_{1,2}^c+(\hat{F}_1\alpha_2^c+\hat{F}_2)w_{1,2}$ (i.e. Equation (12)), and where $\alpha_1^c=1-\alpha_1$, $\alpha_2^c=1-\alpha_2$, $w_{1,2}^c=1-w_{1,2}$, $\hat{F}_1=\alpha_1 F_1$, and $\hat{F}_2=\alpha_2 F_2$.

Just like the embodiment in FIG. 17 may be implemented using a single video mixer, as shown in FIG. 18, the embodiment in FIG. 20 may also be implemented using video mixers of a similar structure. In example implementations described later, a plurality of video mixers of identical structure are illustrated for intersecting multiple images, which may be applied to implement the embodiment described with reference to FIG. 20.

By way of further example, embodiments will now be described in which four different transformed source video images are intersected over a background B. That is, with reference to FIG. 21, four images $F_1$, $F_2$, $F_3$, and $F_4$ are intersected to result in composite image 400. Composite image 400 produces an intersection effect in which the four images are intersected over a background B. More specifically, in the example below it will be assumed that each transformed source image F has an associated alpha $\alpha_i$, and it is the pre-shaped images $\hat{F}_i=\alpha_i F_i$ that are intersected to show the intersection effect. This is why in FIG. 21 the pre-shaped images $\hat{F}_1$, $\hat{F}_2$, $\hat{F}_3$, and $\hat{F}_4$ are illustrated. Also, four video images is just an example. More or fewer are possible.

In the example embodiments described below, different variations of how to provide the intersection effect are also discussed (e.g. parallel or cascade implementation). The specific variation used may be chosen based on the particular design resources and environment available.

Also, by way of summary, in the example embodiments below, the following notation will also be used, most of which has already been introduced earlier:

(1) $\alpha_i^c = 1 - \alpha_i$ and $w_i^c = 1 - w_i$ (2) $\alpha_{i,j}^c = \alpha_i^c \times \alpha_j^c = (1-\alpha_i) \times (1-\alpha_j);$ (3) $\alpha_{k:n}^c = \prod_{i=k}^{n} \alpha_i^c =$ $\alpha_k^c \alpha_{k+1}^c \ldots \alpha_{n-1}^c \alpha_n^c = (1-\alpha_k) \times (1-\alpha_{k+1}) \ldots (1-\alpha_{n-1}) \times (1-\alpha_n);$ and (4) $\hat{F}_i = F_i \alpha_i.$ The example embodiments below assume a general process of video layering known as a mix tree. In a mix tree, there may be a current output on air, which is called the program branch and is denoted as $O_{pgm}$. For example, if it were the case that the current output on air (the $O_{pgm}$) was the composite image 316 in FIG. 20 (i.e. image $\hat{F}_1$ layered on top of a background and then image $\hat{F}_2$ layered on top of that), then $O_{pgm}=(B\alpha_1^c+\hat{F}_1)\alpha_2^c+\hat{F}_2$.

In a mix tree, there may also be a branch that prepares the next output ready-to-be-used, which is called a preview branch and is denoted as $O_{pvw}$. A wipe is then used to transition between $O_{pgm}$ and $O_{pvw}$.

Using the mix tree notation of $O_{pgm}$ and $O_{pvw}$, and assuming it is desired to intersect video images $\hat{F}_1$ and $\hat{F}_2$, then let $O_{pgm}=(B\alpha_1^c+\hat{F}_1)\alpha_2^c+\hat{F}_2$ (i.e. $\hat{F}_2$ layered on top of $\hat{F}_1$), and $O_{pvw}=(B\alpha_2^c+\hat{F}_2)\alpha_1^c+\hat{F}_1$ (i.e. $\hat{F}_1$ and $\hat{F}_2$ swapped so that $\hat{F}_1$ is layered on top of $\hat{F}_2$), and then the intersection of the two is:

$$O_{mix} = w_{1,2}^c O_{pvw} + w_{1,2} O_{pgm} \qquad \text{Equation (15)}$$

$$= w_{1,2}^c \left[(B\alpha_2^c + \hat{F}_2)\alpha_1^c + \hat{F}_1\right] + w_{1,2}\left[(B\alpha_1^c + \hat{F}_1)\alpha_2^c + \hat{F}_2\right]$$

$$= B\alpha_{1,2}^c + K_{1,2}$$

(i.e. the same as Equation (14), where $K_{1,2}=(\hat{F}_2\alpha_1^c+\hat{F}_1)w_{1,2}^c+(\hat{F}_1\alpha_2^c+\hat{F}_2)w_{1,2}$).

Assume though that two more video layers $\hat{F}_3$, and then $\hat{F}_4$, are being layered on top of the intersection of $\hat{F}_1$ and $\hat{F}_2$ in the mix tree. Then:

$$O_{pgm} = (((B\alpha_1^c + F_1\alpha_1)\alpha_2^c + F_2\alpha_2)\alpha_3^c + F_3\alpha_3)\alpha_4^c + F_4\alpha_4 \qquad \text{Equation (16)}$$

$$= (((B\alpha_1^c + \hat{F}_1)\alpha_2^c + \hat{F}_2)\alpha_3^c + \hat{F}_3)\alpha_4^c + \hat{F}_4,$$

and $$O_{pvw} = (((B\alpha_2^c + F_2\alpha_2)\alpha_1^c + F_1\alpha_1)\alpha_3^c + F_3\alpha_3)\alpha_4^c + F_4\alpha_4 \qquad \text{Equation (17)}$$

$$= (((B\alpha_2^c + \hat{F}_2)\alpha_1^c + \hat{F}_1)\alpha_3^c + \hat{F}_3)\alpha_4^c + \hat{F}_4.$$

That is, the two video layers $\hat{F}_1$ and $\hat{F}_2$ in Equation (16) are assumed to be swapped to form Equation (17). The program branch defines $\hat{F}_2$ on the top of $\hat{F}_1$, while the preview branch swaps the order of $\hat{F}_1$ and $\hat{F}_2$. A wipe pattern $w_{1,2}$ is used to mix $O_{pgm}$ and $O_{pvw}$, or to swap the order of $\hat{F}_1$ and $\hat{F}_2$, and therefore define the intersection effect, i.e.:

$$O_{mix} = (1 - w_{1,2})O_{pvw} + w_{1,2}O_{pgm} \quad \text{Equation (18)}$$

$$= \left((B\alpha_2^c\alpha_1^c + \hat{F}_2\alpha_1^c + \hat{F}_1)\alpha_3^c\alpha_4^c w_{1,2}^c + (\hat{F}_3\alpha_4^c + \hat{F}_4)w_{1,2}^c\right) +$$

$$\left((B\alpha_2^c\alpha_1^c + \hat{F}_1\alpha_2^c + \hat{F}_2)\alpha_3^c\alpha_4^c w_{1,2} + (\hat{F}_3\alpha_4^c + \hat{F}_4)w_{1,2}\right)$$

$$= \left((B\alpha_1^c\alpha_2^c + (\hat{F}_2\alpha_1' + \hat{F}_1)w_{1,2}^c + (\hat{F}_1\alpha_2^c + \hat{F}_2)w_{1,2})\alpha_3^c + \hat{F}_3\right)\alpha_4^c + \hat{F}_4$$

$$= \left((B\alpha_{1,2}^c + K_{1,2})\alpha_3^c + \hat{F}_3\right)\alpha_4^c + \hat{F}_4$$

Equation (18) defines a pair of video layers ($\hat{F}_1$ and $\hat{F}_2$) swapped through a wipe pattern $w_{1,2}$ to produce intersected image $K_{1,2}$ (i.e. an intersection of images $\hat{F}_1$ and $\hat{F}_2$), with image $\hat{F}_3$ layered over $K_{1,2}$, and then image $\hat{F}_4$ layered on top of that.

The follow observations will be made.

First, the notation $\hat{F}_i = F_i\alpha_i$, represents video image $F_i$ in its shaped form (i.e. the associated alpha already applied). Some video sources already provide their video in shaped form (i.e. with the associated alpha already applied). If the video layer $F_i$ is not pre-shaped by its associated alpha, then this may be done by computing $\hat{F}_i = F_i\alpha_i$ (i.e. for each pixel in video layer $F_i$ multiplying the pixel value with the corresponding associated alpha value).

Also, $K_{1,2}$ represents a basic swap operation on a pair of video layers with the property that:

$$K_{1,2} = \begin{cases} \hat{F}_1\alpha_2^c + \hat{F}_2, & w_{1,2} = 1 \\ \hat{F}_2\alpha_1^c + \hat{F}_1, & w_{1,2} = 0 \end{cases} \quad \text{Equation (19)}$$

The letter "K" is used in $K_{1,2}$ because $K_{1,2}$ can be thought to represent a mix (i.e. video keying). The "K" is for "keying". The value $\alpha_{1,2}^c$ can be thought of as a complementary composite alpha associated with $K_{1,2}$, which makes $K_{1,2}$ behave as a new video source layer in a mix tree. The value $w_{1,2}$ is the complementary expression to the wipe pattern $w_{1,2}$.

Intersecting with Images $F_3$ and $F_4$: A Parallel Implementation

Assume video images $\hat{F}_3$ and $\hat{F}_4$ are also being intersected with images $\hat{F}_1$ and $\hat{F}_2$ to result in the intersection of four images as shown in FIG. 21. In one embodiment, the images $\hat{F}_3$ and $\hat{F}_4$ may first be intersected with each other, and then intersected with already intersected images $\hat{F}_1$ and $\hat{F}_2$. Specifically, first the swap between video images $\hat{F}_3$ and $\hat{F}_4$ may occur as follows.

Define the $O_{pgm}$, as:

$$O_{pgm} = ((B\alpha_{1,2}^c + K_{1,2})\alpha_3^c + \hat{F}_3)\alpha_4^c + \hat{F}_4 \quad \text{Equation (20)}$$

(i.e. image $\hat{F}_3$ on top of intersected images $\hat{F}_1$ and $\hat{F}_2$ and then image $\hat{F}_4$ layered on top of that).

Define the $O_{pvw}$ as:

$$O_{pvw} = ((B\alpha_{1,2}^c + K_{1,2})\alpha_4^c + \hat{F}_4)\alpha_3^c + \hat{F}_3 \quad \text{Equation (21)}$$

(i.e. images $\hat{F}_3$ and $\hat{F}_4$ swapped: that is, image $\hat{F}_4$ on top of intersected images $\hat{F}_1$ and $\hat{F}_2$, and then image $\hat{F}_3$ layered on top of that).

To obtain images $\hat{F}_3$ and $\hat{F}_4$ intersected and layered on top of intersected images $\hat{F}_1$ and $\hat{F}_2$, a mix through a wipe pattern $w_{3,4}$ is applied such that $$O_{mix} = w_{3,4}^c O_{pvw} + w_{3,4} O_{pgm} \quad \text{Equation (22)}$$

$$= (B\alpha_{1,2}^c + K_{1,2})\alpha_{3,4}^c + K_{3,4}$$

where $K_{3,4} = (\hat{F}_3\alpha_4^c + \hat{F}_4)w_{3,4}^c + (\hat{F}_4\alpha_3^c + \hat{F}_3)w_{3,4}$.

Equation (22) defines a parallel structure for two pairs of wipe-based swap: $\{K_{1,2}, K_{3,4}\}$. Similar to $\alpha_{1,2}^c$, the value $\alpha_{3,4}^c$ can be thought of as a complementary alpha associated with $K_{3,4}$, which makes the second pair behave as a layer in a mix tree.

To now intersect the intersected video images $\hat{F}_1$ and $\hat{F}_2$ with the intersected video images $F_3$ and $\hat{F}_4$, a further swap between $K_{1,2}$ and $K_{3,4}$ may be performed as follows. Define the $O_{pgm}$ as:

$$O_{pgm} = (B\alpha_{1,2}^c + K_{1,2})\alpha_{3,4}^c + K_{3,4}, \quad \text{Equation (23)}$$

(i.e. intersected images $\hat{F}_3$ and $F_4$ layered over top of intersected images $\hat{F}_1$ and $\hat{F}_2$), and define $O_{pvw}$ as:

$$O_{pvw} = ((B\alpha_{3,4}^c + K_{3,4})\alpha_{1,2}^c + K_{1,2} \quad \text{Equation (24)}$$

(i.e. a swap such that intersected images $\hat{F}_1$ and $\hat{F}_2$ are layered over top of intersected images $\hat{F}_3$ and $\hat{F}_4$).

To obtain images $\hat{F}_3$ and $\hat{F}_4$ intersected with intersected images $\hat{F}_1$ and $\hat{F}_2$, a mix through a wipe pattern $w_{1:4}$ is applied such that $$O_{mix} = w_{1:4}^c O_{pvw} + w_{1:4} O_{pgm} \quad \text{Equation (25)}$$

$$= B\alpha_{1:4}^c + K_{1:4}$$

where $K_{1:4} = (K_{3,4}\alpha_{1,2}^c + K_{1,2})w_{1:4}^c + (K_{1,2}\alpha_{3,4}^c + K_{3,4})w_{1:4}$. Note that $\alpha_{1:4}^c = \alpha_{1,2}^c \alpha_{3,4}^c = \alpha_1^c \alpha_2^c \alpha_3^c \alpha_4^c$. However, the notation $w_{1:4}$ does not indicate any sort of multiplication. This notation is just to designate the wipe pattern is one that intersects layers 1 to 4 together.

The value $\alpha_{1:4}^c$ may also be thought of as a complementary composite alpha that is associated with $K_{1:4}$.

Generating the intersection effect between the four video images in the manner explained above may be considered a parallel implementation in that images $\hat{F}_1$ and $\hat{F}_2$ are intersected, images $\hat{F}_3$ and $\hat{F}_4$ are intersected (which may be done in parallel), and then the two intersected images are intersected. Specific example hardware for such an implementation is described later.

Intersecting Using a Cascade Implementation

Equation (15) above generates the intersection of video images 1 and 2: $O_{mix} = B\alpha_{1,2}^c + K_{1,2}$. Assume video images $\hat{F}_3$ and $\hat{F}_4$ are also being intersected with images $\hat{F}_1$ and $\hat{F}_2$ to result in the intersection of four images as shown in FIG. 21. In one embodiment, the image $\hat{F}_3$ is first intersected with images $\hat{F}_1$ and $\hat{F}_2$ and then the image $\hat{F}_4$ is intersected with the intersection of $\hat{F}_1$, $\hat{F}_2$, and $\hat{F}_3$. This can be considered a cascade implementation.

Specifically, to first intersect image $\hat{F}_3$ with intersected images $\hat{F}_1$ and $\hat{F}_2$, define the $O_{pgm}$ as:

$$O_{pgm} = ((B\alpha_{1,2}^c + K_{1,2})\alpha_3^c + \hat{F}_3)\alpha_4^c + \hat{F}_4 \quad \text{Equation (26)}$$

(i.e. image $\hat{F}_3$ on top of intersected images $\hat{F}_1$ and $\hat{F}_2$, and then image $\hat{F}_4$ layered on top of that).

Define the $O_{pvw}$ as:

$$O_{pvw} = ((B\alpha_3^c + \hat{F}_3)\alpha_{1,2}^c + K_{1,2})\alpha'_4 + \hat{F}_4 \quad \text{Equation (27)}$$

(i.e. a swap such that intersected images $\hat{F}_1$ and $\hat{F}_2$ are layered over top of image $F_3$).

To obtain image $\hat{F}_3$ intersected with intersected images $\hat{F}_1$ and $\hat{F}_2$, a mix through a wipe pattern $w_{1:3}$ is applied such that $$O_{mix} = w_{1:3}^c O_{pvw} + w_{1:3} O_{pgm} \quad \text{Equation (28)}$$

$$= (B\alpha_{1:3}^c + K_{1:3})\alpha_4^c + \hat{F}_4$$

where, $K_{1:3} = (\hat{F}_3 \alpha_{1,2}^c + K_{1,2}) w_{1:3}^c + (K_{1,2} \alpha_3^c + \hat{F}_3) w_{1:3}$, and $\alpha_{1:3}^c = \alpha_{1,2}^c \alpha_3^c = \alpha_1^c \alpha_2^c \alpha_3^c$.

The value $K_{1:3}$ can be thought of as representing a composite video image produced by combining an early or previous composite video image $K_{1,2}$ with image $\hat{F}_3$.

To now intersect the image $\hat{F}_4$ with intersected video images $\hat{F}_1$, $\hat{F}_2$, and $\hat{F}_3$, a further swap between $\hat{F}_4$ and $K_{1:3}$ may be performed as follows.

Define the $O_{pgm}$ as:

$$O_{pgm} = (B\alpha_{1:3}^c + K_{1:3})\alpha_4^c + \hat{F}_4 \quad \text{Equation (29)}$$

(i.e. image $\hat{F}_4$ layered on top of intersected images $\hat{F}_1$, $\hat{F}_2$, and $\hat{F}_3$).

Define the $O_{prv}$ as:

$$O_{pvw} = (B\alpha_4^c + \hat{F}_4)\alpha_{1:3}^c + K_{1:3} \quad \text{Equation (30)}$$

(i.e. a swap such that intersected images $\hat{F}_1$, $\hat{F}_2$, and $\hat{F}_3$ are layered on top of $\hat{F}_4$).

To obtain image $\hat{F}_4$ intersected with intersected images $\hat{F}_1$, $\hat{F}_2$, and $\hat{F}_3$, a mix through a wipe pattern $w_{1:4}$ is applied such that $$O_{mix} = w_{1:4}^c O_{pvw} + w_{1:4} O_{pgm} \quad \text{Equation (31)}$$

$$= B\alpha_{1:4}^c + K_{1:4}$$

where $K_{1:4} = (\hat{F}_4 \alpha_{1:3}^c + K_{1:3}) w_{1:4}^c + (K_{1:3} \alpha_4^c + \hat{F}_4) w_{1:4}$, and $\alpha_{1:4}^c = \alpha_{1:3}^c \alpha_4^c = \alpha_1^c \alpha_2^c \alpha_3^c \alpha_4^c$.

Producing the intersection effect between video images $\hat{F}_1$ to $\hat{F}_4$ in the manner explained above may be considered a cascade implementation in that images $\hat{F}_1$ and $\hat{F}_2$ are intersected, then image $\hat{F}_3$ is added (i.e. intersected with already intersected images $\hat{F}_1$ and $\hat{F}_2$), and then image $\hat{F}_4$ is added (i.e. intersected with already intersected images $\hat{F}_1$, $\hat{F}_2$, and $\hat{F}_3$). Specific example hardware for such an implementation is described later.

It will be appreciated that whether using the parallel implementation described above (i.e. with the final intersection effect produced via Equation (25)) or whether using the cascade implementation described above (i.e. with the final intersection effect produced via Equation (31)), the end result should be the same: images $\hat{F}_1$, $\hat{F}_2$, $\hat{F}_3$, and $\hat{F}_4$ intersected over a background B, e.g., as shown in FIG. 21.

Dynamic Pairing to have Images of Adjacent Depths Intersect

In the examples described above in which images $\hat{F}_1$, $\hat{F}_2$, $\hat{F}_3$, and $\hat{F}_4$ are intersected, it may be the case that visual mistakes might occur depending upon the order in which the different layers are intersected. To help understand this, consider FIGS. 22 to 25.

FIG. 22 illustrates the intersection of example video images $\hat{F}_1$ and $\hat{F}_2$. Specifically, the video image $\hat{F}_1$ is shown in black in FIG. 22, but the video image $\hat{F}_1$ has a semi-transparent area 402, which shown using black dots in FIG. 22. Video image $\hat{F}_2$ in FIG. 22 is illustrated using cross-hatching. In this example, video image $\hat{F}_2$ does not have a transparent or semi-transparent area. When these two images are intersected to form the composite image 404 (i.e. $K_{1,2}$) shown on the screen, there will be an area 406 on the screen, corresponding to semi-transparent area 402 of image $\hat{F}_1$, in which pixel values from image $\hat{F}_1$ and image $F_2$ are blended due to the area 402 in image $\hat{F}_1$ being semi-transparent.

FIG. 23 illustrates the intersection of example video images $\hat{F}_3$ and $\hat{F}_4$. In this example, neither image $\hat{F}_3$ nor image $\hat{F}_4$ has a transparent or semi-transparent area. As shown in FIG. 23, when image $\hat{F}_3$ is intersected with image $\hat{F}_4$ to form composite image 408 (i.e. $K_{3,4}$) shown on the screen, only image $\hat{F}_3$ is shown in the screen as in this portion of the screen the depth of image $\hat{F}_4$ exceeds the depth of image $\hat{F}_3$ (i.e. image $\hat{F}_3$ appears closer to the viewer).

Now, if composite image 404 in FIG. 22 (i.e. $K_{1,2}$) was intersected with composite image 408 in FIG. 23 (i.e. $K_{3,4}$), to form composite image 410 (i.e. $K_{1:4}$), as shown in FIG. 24, a visual error in the blended area 406 occurs. Specifically, image $\hat{F}_3$ appears closer to the viewer than image $\hat{F}_2$, and so to be visually correct the blended area 406 should only show a blend between image $\hat{F}_1$ and image $\hat{F}_3$. However, because image $\hat{F}_1$ was first intersected with image $\hat{F}_2$, the blended area 406 incorrectly shows some of image $\hat{F}_2$. The correct intersection layering is shown in FIG. 25 in which blended area 406 only includes a blend of image $\hat{F}_1$ and image $\hat{F}_3$. This would occur if $\hat{F}_1$ was intersected with $\hat{F}_3$ first.

The possible visual error discussed above with reference to FIGS. 22 to 24 may be addressed in some embodiments by changing the image layer orders on a pixel-by-pixel basis, that is, dynamic reassignment of swap pairs as necessary on a pixel-by-pixel basis. This means sorting the images on a pixel-by-pixel basis in terms of depth. Any method that sorts a set of values may be used to perform such sorting. One example is a merge sort, which uses a parallel structure and therefore may help speed up the sorting. For completeness, FIG. 26 illustrates a sorter 502 comprising an example structure for performing a merge sort.

With reference to FIG. 26, it is assumed that there are eight images $F_1$ to $F_8$, each having, at a given target pixel location, a respective depth value $Z_1$ to $Z_8$. The sorter 502 in FIG. 26 sorts the depth values in order from largest depth to smallest, where output $O_1$ represents the largest depth value and output $O_8$ represents the smallest depth value. Note that the convention is being assumed that a "larger" depth value means a negative number having a greater magnitude (since the screen is considered to be z=0 with the negative side of the z-axis projecting into the screen and the positive side of the z-axis projecting out of the screen towards the viewer). Therefore, when A<B, this means that A has a depth value that exceeds the depth value of B (i.e. A appears farther away from the viewer).

The sorter 502 comprises three levels (which may also be called stages or layers): level 0 (which is indicated by reference character 504), level 1 (which is indicated by reference character 506), and level 2 (which is indicated by reference character 508). Level 0 comprises comparators 510, 512, 514, and 516, and multiplexers 518, 520, 522, and 524. Level 1 comprises shift register banks 532, 534, 536, and 538, inverters 542 and 544, comparators 550 and 552, and multiplexers 554 and 556. Level 2 comprises shift register banks 560 and 562, inverter 570, comparator 572, and multiplexer 574. Shift register bank 580 receives and holds the output of level 2.

As can be seen in FIG. 26, shift register bank 532 includes shift registers $L_11$ and $L_12$, shift register bank 534 includes shift registers $L_13$ and $L_14$, shift register bank 536 includes shift registers $L_15$ and $L_16$, shift register bank 538 includes shift registers $L_17$ and $L_18$, shift register bank 560 includes shift registers $L_21$, $L_22$, $L_23$, and $L_24$, shift register bank 562 includes shift registers $L_25$, $L_26$, $L_27$, and $L_28$, and shift register bank 580 includes shift registers $L_31$, $L_32$, $L_33$, $L_34$, $L_35$, $L_36$, $L_37$, and $L_38$.

Each comparator receives two inputs (generally designated "A" and "B" in FIG. 26), and compares the two. If "A" is less than "B", then the comparator outputs one value (e.g. the number "1" is output from the comparator). Otherwise, the comparator outputs another value (e.g. the number "0" is output from the comparator). Each comparator may be implemented, for example, by a digital logic circuit that compares two input values and returns an output value indicative of the smallest input value.

Each multiplexer receives two inputs (generally designated as "T" and "F" in FIG. 26) and selects one of the inputs to output based on the output of an associated comparator. Specifically, in FIG. 26, each multiplexer outputs the "T" signal if the comparator indicates that "A<B" is true. Each multiplexer may be implemented, for example, using digital logic circuitry to perform a multiplexer function (i.e. digital logic circuitry to select one of two input signals based on the value of a selection signal). Also, it will be appreciated that, more generally, the multiplexers may be replaced with any other specific type of data selection circuitry that performs an equivalent function (i.e. selects between inputs).

Each inverter is a logical inverter (e.g. a NOT Gate), which inverts the output signal of a comparator to indicate the opposite (e.g. if the comparator output is "T" (truth, which may be represented by the number "1" for example) it is inverted by the inverter to "F" (false—e.g. "0"), and vice versa). The logical inverters are used so that in the merging process only one of two banks of shift registers are shifted, the one shifted being chosen by the output of the comparator.

Each bank of shift registers can shift data to the left each time a shift enable ("en" in FIG. 26) is triggered by truth. The bank of shift registers may be implemented, for example, using a cascade of flip flops.

In operation, the incoming eight video images are (perhaps arbitrarily) paired in index orders: $\{F_1, F_2\}$, $\{F_3, F_4\}$, $\{F_5, F_6\}$, and $\{F_7, F_8\}$, with respective depth orders $\{Z_1, Z_2\}$, $\{Z_3, Z_4\}$, $\{Z_5, Z_6\}$, and $\{Z_7, Z_8\}$. At level zero, each pair is sorted within itself and output into shift register pairs in level 1: $\{L_11, L_12\}$, $\{L_13, L_14\}$, $\{L_15, L_16\}$, and $\{L_17, L_18\}$, in order such that for each bank of shift registers 532, 534, 536, and 538, the larger magnitude depth value is in the front (i.e. on the left most side of the shift register bank). As an example to help visualize this, let us say, for example, that $Z_1=-5$, $Z_2=-3$, $Z_3=-4$, and $Z_4=-6$. Then comparator 510 would indicate that $Z_1$ is a larger magnitude depth than $Z_2$ (i.e. $Z_1$ is a larger negative number than $Z_2$), and $Z_1$ would be chosen by multiplexer 518 to be shifted into $L_12$ of the shift register bank 532. Subsequently, the value $Z_1=-5$ would be shifted into $L_11$ of the shift register bank 532 and the depth value $Z_2=-3$ shifted into $L_12$. Similarly, comparator 512 would indicate that $Z_4=-6$ has a larger magnitude depth than $Z_3=-4$ (that is, $Z_4$ is a larger negative number), and $Z_4$ would be chosen by multiplexer 520 to be shifted into $L_14$ of the shift register bank 534. Subsequently, the value $Z_4$ would be shifted into $L_13$ of the shift register bank 534 and the depth value $Z_3=-4$ shifted into $L_14$. A similar process would occur for $Z_5$, $Z_6$, $Z_7$, and $Z_8$.

At level 1, two neighboring pairs are grouped together for comparison. The larger magnitude depth value of a pair (i.e. the greatest negative number) is output into the shift registers of level 2 and shifted to the left so that the bank of shift registers 560 and the bank of shift registers 562 each hold depth values from largest magnitude to smallest magnitude, with the largest magnitude depth value on the left and the smallest magnitude depth value on the right. The shifting process is continued until all data in the registers of level 1 are shifted into level 2. In this way, in level 1, two pairs of data are sorted and merged into one quad of data. The inverters 542 and 544 ensure that the correct depth values are compared for the merge. To help visualize this, let us return to the example in the paragraph above in which $Z_1=-5$, $Z_2=-3$, $Z_3=-4$, and $Z_4=-6$. At level 1, register $L_11=Z_1=-5$, register $L_12=Z_2=-3$, register $L_13=Z_4=-6$ and register $L_14=Z_3=-4$. The comparator 550 would first select the largest magnitude of the two depth values in registers $L_11$ and $L_13$, which is $Z_4=-6$, and this would be shifted into register $L_24$ in the bank 560 of shift registers. Subsequently, since the larger magnitude depth value was from the bank 534 of shift registers, this bank would shift to the left and not the bank 532 of shift registers (due to the inverter 542). This would then cause $Z_3=-4$ to be compared to $Z_1=-5$, and $Z_1=-5$ would be chosen by the multiplexer 554 since it has the largest magnitude depth value. Subsequently, since the larger magnitude depth value was from the bank 532 of shift registers, this bank would shift to the left and not the bank 534 of shift registers (due to the inverter 542). The value $Z_2=-3$ would therefore be compared to $Z_3=-4$. The comparison and shifting would continue until the four values shifted into bank 560 of shift registers were: $L_21=Z_4=-6$, $L_22=Z_1=-5$, $L_23=Z_3=-4$, and $L_24=Z_2=-3$.

At level 2, the values in the two banks of shift registers 560 and 562 are further grouped together for comparison and merged in the same manner described above with respect to level 1 to result in the eight depth values in bank 580 of shift registers in order from greatest magnitude depth (the left most register) to smallest magnitude depth (the right most register).

Note that as each value is shifted to the left in the register banks 532, 534, 536, 538, 560, and 562, if there is no subsequent value to replace the value shifted out of a right-hand register, a predetermined large magnitude number may be placed in that right-hand register. For example, using the example above, once $Z_1=-5$ is shifted into layer 2 and $Z_2=-3$ shifted into $L_11$, a predetermined large magnitude number (out of the depth range) may be placed in register $L_12$ to ensure continued correct sorting.

The sorting described above occurs on a pixel-by-pixel basis (since each pixel location has (in general) new associated depth values).

FIG. 26 is an example showing the sorting of eight video images. It will be appreciated that the sorter 502 could be modified for more than eight images by adding more levels, and for less than eight images using fewer levels. It will also be appreciated that positive unified depth values may be used instead (i.e. Z values greater than zero), rather than the negative depth values used in the example above.

Since each level of the sorter 502 merges two subbranches to form an input for the following level, the calculation speed may be improved (e.g. doubled) compared to a more straight-forward sorting method (e.g. using brute force).

As mentioned above, merge sort is only one example sort method that may be used. Other sorting method may be used instead. Examples include quick sort, insertion sort, bubble sort, and selection sort.

The image depth sorting discussed above may address a visual error problem (e.g. described above with reference to FIGS. 22 to 24), which may occur when intersecting several images via the wipe method described herein. However, when performing the image depth sorting, there is a potential drawback in that increased computational resources are used in order to implement the sorting process. Therefore, in some embodiments, the sorting may be omitted, even though there may potentially be some visual errors due to the omission of the sorting.

Aiming to Provide Uniform Softness Around an Intersection Line

A method is presented above for providing an intersection effect using a wipe-based mix. For example, using the mix tree notation of $O_{pgm}$ and $O_{pvw}$ described above, if it is desired to intersect video images $\hat{F}_1$ and $\hat{F}_2$, then let $O_{pgm} = (B\alpha_1^c + \hat{F}_1)\alpha_2^c + \hat{F}_2$ (i.e. $\hat{F}_2$ layered on top of $\hat{F}_1$), and $O_{pvw} = (B\alpha_2^c + \hat{F}_2)\alpha_1^c + \hat{F}_1$ (i.e. $\hat{F}_1$ and $\hat{F}_2$ swapped so that $\hat{F}_1$ is layered is on top of $\hat{F}_2$), and then the intersection of the two is Equation (14) above:

$$\begin{aligned} O_{mix} &= (1 - w_{1,2})O_{pvw} + w_{1,2}O_{pgm} \\ &= w_{1,2}^c O_{pvw} + w_{1,2} O_{pgm} \\ &= w_{1,2}^c[(B\alpha_2^c + \hat{F}_2)\alpha_1^c + \hat{F}_1] + w_{1,2}[(B\alpha_1^c + \hat{F}_1)\alpha_2^c + \hat{F}_2] \\ &= B\alpha_{1,2}^c + K_{1,2}, \end{aligned}$$

where $w_{1,2}$ is the wipe pattern, and where $O_{mix}$ will be referred to as the "target image".

More generally, for a wipe pattern w to produce an intersection between images $O_{pgm}$ and $O_{pvw}$ via an A/B mix $O_{mix}=(1-w)O_{pvw}+wO_{pgm}$ in the manner described above, the wipe pattern may, for each pixel location (i.e. each pixel coordinate) in the target image ($O_{mix}$):
(i) choose the pixel value of image $O_{pgm}$ at the pixel location when the depth value $Z_{pvw}$ of $O_{pvw}$ at the pixel location exceeds the depth value $Z_{pgm}$ of $O_{pgm}$ (i.e. when $O_{pgm}$ appears closer to the viewer at that pixel location); and
(ii) choose the pixel value of image $O_{pvw}$ at the pixel location when the depth value $Z_{pgm}$ of $O_{pgm}$ at the pixel location exceeds the depth value $Z_{pvw}$ of $O_{pvw}$ (i.e. when appears closer to the viewer at that pixel location).
An example of a wipe pattern to implement this is:

$$w = \begin{cases} 1, & \Delta Z = Z_{pgm} - Z_{prv} \geq 0 \\ 0, & \Delta Z = Z_{pgm} - Z_{prv} < 0 \end{cases}. \quad \text{Equation (32)}$$

However, with such a wipe pattern there is a hard switch (or "swap") on the intersection line ($\Delta Z = Z_{pgm} - Z_{prv} = 0$). This may result in visible jagged or stepped edges along the intersection line, which may be further exacerbated by depth accuracy errors due to calculation truncation or calculation rounding. This was discussed earlier with reference to FIGS. 15 and 16.

One method to try to smooth a jagged or stepped intersection line is to apply "fuzziness" or "softness" around the intersection line, for example, by implementing the following wipe pattern:

$$w = \begin{cases} \dfrac{\Delta Z/\Delta_f + 1}{2} & |\Delta Z| < \Delta_f \\ 1 & \Delta Z \geq +\Delta_f \\ 0 & \Delta Z \leq -\Delta_f \end{cases}, \quad \text{Equation (33)}$$

where $\Delta Z = Z_{pgm} - Z_{prv}$ and where $\Delta_f$ is a number representing the softness range. In this wipe pattern, when the absolute value of the depth difference between the images is less than $\Delta_f$ (i.e. when $|\Delta Z| < \Delta_f$), which occurs on and around the intersection line), then the pixel value from both images contribute to the displayed pixel value. For example:
(1) At pixel locations at which both images are equally far away from the viewer, then $|\Delta Z|=0$ and thus w=0.5, such that both video images contribute to the displayed pixel value equally.
(2) At pixel locations at which $O_{pgm}$ is slightly closer to the viewer than $O_{pvw}$, then $0<\Delta Z<\Delta_f$ and thus $0.5<w<1$. This means that both video images still contribute the displayed pixel value, but $O_{pgm}$ contributes more than $O_{pvw}$.
(3) At pixel locations at which $O_{pgm}$ is slightly farther from the viewer than $O_{pvw}$, then $-\Delta_f<\Delta Z<0$, and thus $0<w<0.5$. This means that both video images still contribute the displayed pixel value, but $O_{pvw}$ contributes more than $O_{pgm}$.
(4) At pixel locations at which $O_{pgm}$ is significantly closer to the viewer than $O_{pvw}$ (e.g. not immediately adjacent to the intersection line), then $\Delta Z \geq \Delta_f$, and thus w=1 such that only $O_{pgm}$ is displayed.
(5) At pixel locations at which $O_{pgm}$ is significantly farther away from the viewer than $O_{pvw}$ (e.g. not immediately adjacent to the intersection line), then $\Delta Z \leq -\Delta_f$, and thus w=0 such that only $O_{pvw}$ is displayed.

It will be appreciated that the larger the value of $\Delta_f$ chosen, the greater the "softness" range around the intersection line. In some embodiments, the value of $\Delta_f$ may be chosen to be a constant number (i.e. does not change spatially along the intersection line). However, this may cause non-uniform softness along the intersection line when there is a perspective projection effect in which the perspective transform emphasizes the difference between the two ends of the intersection line. To help understand this, please consider FIG. 27, which illustrates a depth difference at a point closer to a viewer and at a point farther from a viewer. Specifically, FIG. 27 illustrates a screen 600 on which a video image A intersected with another video image B could be displayed. In FIG. 27, the screen 600 is offset from the intersected video images A and B to assist in illustrating the differences in image depth. In reality, the intersected images A and B would be displayed on the screen itself via a 2-D grid of pixels on the screen 600. On the screen 600 is a first small area of interest $V_1$, which is at a bottom end of the screen and appears nearer to a viewer. Also on the screen 600 is a second small area of interest $V_0$, which is at the top end of the screen and appears farther away from the viewer. Due to the perspective projection effect, the depth difference $\Delta Z_0$ between images A and B at the top end is larger than the depth difference $\Delta Z_1$ at the bottom end. If a constant softness range $\Delta_f$ were applied, the bottom end may have much more softness, such that if the bottom end were made to look natural (an appropriate amount of softness), the top end may have hard switches (e.g. jagged edges) between A and B, and such that if the top end were made to look natural (an appropriate amount of softness), the bottom end may be too soft. Such a non-uniform softness around the intersection line may be undesirable. For example, FIG. 28 illustrates two images 620 and 622 intersected using a wipe pattern 621 with a constant softness range $\Delta_f$ (i.e. does not spatially change along the intersection line). In FIG. 28, the wipe pattern 621 results in an appropriate amount of softness closer to the viewer, as shown at 624, but farther away from the viewer the result is jagged edges, as shown at 626. As mentioned above, this is due to the perspective effect in which depth differences between intersected images are greater at points that appear farther away from the user. However, it is often more aesthetically pleasing to expect a uniform softness along the intersection line, as shown, for example, in FIG. 29 in which the top end 626 and the bottom end 624 have uniform softness.

Embodiments are described below in which a wipe pattern is constructed that may provide uniform softness spatially along the intersection line.

With reference to FIG. 30, there is again illustrated a screen 700 on which a video image A intersected with another video image B could be displayed. The screen 700 may be considered as being comprised as a 2-D grid of target image pixels $(x_t, y_t)$, to display intersected video images A and B. In FIG. 30, the screen 700 is again illustrated as offset from the intersected video images A and B to assist in illustrating the differences in image depth.

In this embodiment, it is desired to have a uniform softness around the intersection line 702, as shown at 704, to improve the aesthetic quality of the intersection. In this embodiment it will be assumed that the wipe pattern to produce the intersection pattern is Equation (33), i.e.:

$$w = \begin{cases} \frac{\Delta Z/\Delta_f + 1}{2} & |\Delta Z| < \Delta_f \\ 1 & \Delta Z \geq +\Delta_f \\ 0 & \Delta Z \leq -\Delta_f \end{cases},$$

but the softness range $\Delta_f$ is spatially varied (i.e. a function of the target pixel coordinate $(x_t, y_t)$) with the aim of producing a uniform softness for the pixels neighbouring the intersection line 702 (in the softness range 704).

Consider a small square pixel area X on the screen having dimensions $dx_t = dy_t$. Each corner of the square pixel area X is projected into 3-D space on either image A or image B as shown in FIG. 30, with a depth difference $\Delta Z$. The depth difference $\Delta Z$ between the two corners of square pixel area X may be considered as reflecting depth differences among neighbouring pixels along the intersection line 702, and a mathematical differential may be applied to depth in terms of target pixel coordinates $(x_t, y_t)$ on the screen 700 to derive a dynamic softness range along the intersection line 702. The depth used for the mathematical differential may be either from image A or from image B. This is because the small pixel area X is at the intersection line, which is shared by image A and image B, and so the two depths (i.e. the depth value of image A at the small pixel area X and the depth value of image B at the small pixel area X) will be close in value. The embodiments below choose the image having the smallest depth value associated with small pixel area X.

A small change in depth Z, i.e. dz, may be expressed in terms of the total differential:

$$dz = \frac{dz}{dx_t} dx_t + \frac{dz}{dy_t} dy_t, \qquad \text{Equation (34)}$$

where $dx_t$ is the small change in the x direction in the image 700, and where $dy_t$ is the small change in the y direction of the image 700.

Assume depth Z in the image on the screen 700 is computed on a pixel-by-pixel basis as described earlier via Equation (8):

$$\bar{z} = \left(\frac{z}{f}\right) = \frac{P_d}{P_a x_t + P_b y_t + P_c f},$$

then applying Equation (34) to the Equation above (Equation (8)) produces $$d\bar{z} = \frac{d\bar{z}}{dx_t} dx_t + \frac{d\bar{z}}{dy_t} dy_t \qquad \text{Equation (35)}$$

$$= \frac{d}{dx_t}\left(\frac{P_d}{P_a x_t + P_a x_t + P_c f}\right) dx_t +$$

$$\frac{d}{dy_t}\left(\frac{P_d}{P_a x_t + P_a x_t + P_c f}\right) dy_t$$

$$= \frac{-P_d P_a}{(P_a x_t + P_b y_t + P_c f)^2} dx_t + \frac{-P_d P_b}{(P_a x_t + P_b y_t + P_c f)^2} dy_t$$

$$= \frac{-P_d (P_a dx_t + P_b dy_t)}{(P_a x_t + P_b y_t + P_c f)^2}$$

$$= -P_d (P_a dx_t + P_b dy_t)/(\Sigma P)^2$$

where $\Sigma P = P_a x_t + P_b y_t + P_c f$. Note that $\Sigma P$ is an intermediate calculation for computing unified depth $\bar{z}$ and can be considered as reflecting a physical behavior of perspective projection. The value $\Sigma P$ is sometimes called "perspective data" or "the perspective parameter". Generally, there is no extra computational cost for computing $\Sigma P$ in evaluating Equation (35) above, as $\Sigma P$ is computed as part of performing the perspective transform (e.g. in the perspective transform engine), assuming that the perspective transform is implemented prior to the intersection effect.

The softness range $\Delta_f$ may be considered the absolute value of the small change in depth z, i.e., $$\Delta_f = |d\bar{z}| = |-P_d(P_a dx_t + P_b dy_t)/(\Sigma P)^2| = |P_d(P_a dx_t + P_b dy_t)|/(\Sigma P)^2 \qquad \text{Equation (36)}$$

By setting the small change in the x direction $dx_t$ to be one pixel, i.e. $dx_t = 1$, and by setting the small change in the y direction $dy_t$ to be one pixel, i.e. $dy_t = 1$, then the small pixel area X in the target image is one pixel and Equation (36) reduces to $$\Delta_f = |P_d(P_a + P_b)|/(\Sigma P)^2 \qquad \text{Equation (37)}$$

More generally, assuming a small change in the x direction equal to $\tau$ and also assuming a small change in the y direction equal to $\tau$ (i.e. $dx_t = dy_t = \tau$), then Equation (35) reduces to $$\Delta_f = |P_d(P_a \tau + P_b \tau)|/(\Sigma P)^2 = \frac{|P_d(P_a + P_b)|\tau}{(\Sigma P)^2}. \qquad \text{Equation (38)}$$

Note that $\tau$ is a positive number, which is why it may be factored out of the absolute value brackets in Equation (38). In some embodiments, $\tau$ may be a user-controllable parameter, e.g. controlled through a user interface, to allow the user to control how much softness is around the intersection line 702 (i.e. how big softness area 704 is, which provides a visual effect).

Therefore, considering the softness around the intersection line to be $$\frac{\Delta \bar{Z}/\Delta_f + 1}{2},$$

from Equation (33), then substitute in $$\Delta f = \frac{|P_d(P_a + P_b)|\tau}{(\Sigma P)^2}$$

(from Equation (38)) to obtain $$w_f = \frac{\Delta \overline{Z}/\Delta_f + 1}{2} = \frac{\frac{\Delta \overline{Z}(\Sigma P)^2}{|P_d(P_a + P_b)|\tau} + 1}{2} = (G(\Sigma P)^2 \Delta \overline{Z} + 1)/2 \quad \text{Equation (39)}$$

where $$G = \frac{1}{\tau|P_d(P_a + P_b)|}.$$

The value G may be considered a gain value. It is dependent upon the parameters defining the transformation (and specifically in this embodiment $P_d$, $P_a$, and $P_b$) and the (possibly user-controllable) parameter $\tau$.

The wipe pattern to use for the intersection effect is therefore (in this embodiment):

$$w = \begin{cases} w_f & 0 < w_f < 1 \\ 1 & w_f \geq 1 \\ 0 & w_f \leq 0 \end{cases} \quad \text{Equation (40)}$$

where $w_f = (G(\Sigma P)^2 \Delta \overline{Z} + 1)/2$.

When computing $w_f$ in implementation, note that:
(1) the term $|P_d(P_a+P_b)|$ is constant for a given transformation and is therefore only modified when the transformation applied to the source image is modified, which in general may happen every video field or frame. These parameters $P_d$, $P_a$, and $P_b$ are calculated as part of the transformation and so are generally pre-calculated prior to the intersection effect.
(2) As mentioned above, the term $\tau$ may be user-controllable to achieve more visual effects (specifically, to control the amount of softness around the intersection). Mathematically and physically, $\tau=1$ may cover two cases: $w=0\sim0.5$ if $\Delta Z$ is negative and $w=0.5\sim1$ if $\Delta Z$ is positive. Therefore, when $\tau=1$, the edges from one image to the other (i.e. the softness range) is two pixels wide, where one pixel produces a positive $\Delta Z$ and the other pixel produces a negative $\Delta Z$. More generally, when a user sets a specific value for $\tau$, the softness area around the intersection will be $2\tau$ pixels wide.

More generally, from the discussion above in relation to Equations (39) and (40), it will be appreciated that a depth difference value $\Delta Z$ may be modified to obtain a wipe pattern value $w_f$, where the depth difference value $\Delta Z$ is modified based on at least the pixel location $(x_t,y_t)$ and at least some parameters defining the perspective transformation. A pixel value of the target digital image may be set as the pixel value of the first image at the pixel location when $w_f$ is greater than a first threshold (e.g. $w_f \geq 1$), or the pixel value may be set as the pixel value of the second image at the pixel location when $w_f$ is less than a second threshold (e.g. $w_f \leq 10$), or otherwise the pixel value may be set as the combination of the pixel value of the first image at the pixel location and the pixel value of the second image at the pixel location (e.g. the specific combination determined by the value of $w_f$ between 0 and 1). Modifying the depth difference value to obtain the wipe pattern value $w_f$ may involve multiplying the depth difference value by a gain value G dependent upon at least some parameters defining the perspective transformation, and another value $(\Sigma P)^2$ dependent upon at least the target image coordinate values $x_t$ and $y_t$ of the pixel location and at least some parameters defining the perspective transformation. The gain value G may depend upon or include a user-controllable parameter.

Implementation Examples

Some specific hardware implementations will now be described. These are meant by way of illustration only.

Turning first to FIG. 31, there is illustrated a high-level view of an example device 1000 for performing the intersection effect. The device 1000 may be, for example, a standalone device or embedded in one or more production switchers.

The device 1000 comprises perspective transform processing systems 1002a to 1002n and an intersection effect system 1004. The letter "n" is used in this figure (and the other figures) to represent an arbitrary number. It will be appreciated that FIG. 31 represents a high-level view showing inputs and outputs. The specific operations performed by systems 1002a to 1002n and 1004, as well specific example circuitry and other hardware (i.e. example implementations), are described in detail below.

The device 1000 receives as input n sources video images $V_1$ to $V_n$, each having a respective associated alpha $\alpha_{V1}$ to $\alpha_{Vn}$. Each source video image and respective associated alpha undergoes respective perspective transform processing. In particular, as illustrated in FIG. 31, source video image $V_1$ and its associated alpha $\alpha_{V1}$ undergo perspective transform processing in perspective transform processing system 1002a to produce a pre-shaped transformed video image $\hat{F}_1$, which represents a transformed image that was subject to perspective projection to have a 3-D look. The pre-shaped transformed video image $\hat{F}_1$ will be referred to as the "pre-shaped target video image $\hat{F}_1$". The following is also produced by the transform processing system: an associated complementary alpha $\alpha_1^c$, depth values $\hat{Z}_1$, and associated perspective parameters values $\Sigma P_1$.

More specifically, the source video image $V_1$ comprises a 2-D grid of source image pixels, each source pixel having a source pixel coordinate $(x_s,y_s)$ and associated source pixel value $V_1(x_s,y_s)$. The associated alpha $\alpha_{V1}$ also comprises a plurality of values, one associated alpha value $\alpha_{V1}(x_s,y_s)$ for each source pixel coordinate $(x_s,y_s)$. The pre-shaped target video image $\hat{F}_1$ is also 2-D grid of image pixels, which will be referred to as target image pixels. Each target pixel in $\hat{F}_1$ has a target pixel coordinate $(x_t,y_t)$ and associated target pixel value $\hat{F}_1(x_t,y_t)$. The associated complementary alpha $\alpha_1^c$ also comprises a plurality of values, one alpha value $\alpha_1^c(x_t,y_t)$ for each target pixel coordinate $(x_t,y_t)$. There is also a depth value $\hat{Z}_1(x_t,y_t)$ corresponding to each target pixel coordinate $(x_t,y_t)$, which is representative of the depth of the target image at that target pixel coordinate, or in other words, how far the target image appears from the viewer at that pixel location of the target image. There is also an associated perspective parameter value $\Sigma P_1(x_t,y_t)$ corresponding to each target pixel coordinate $(x_t,y_t)$, which in this embodiment is computed as per above: $\Sigma P_1(x_t,y_t)=P_a x_t + P_b y_t + P_c f$.

Perspective transform processing systems 1002b to 1002n work in a similar manner.

FIG. 31 illustrates a generalization in which each source video image $V_1$ to $V_n$ has a respective associated alpha $\alpha_{V1}$ to $\alpha_{Vn}$. If a particular video source image does not happen to have an associated alpha, one may be generated in which each value of the associated alpha is set to 1, which has the same effect as having no associated alpha.

The intersection effect system 1004 receives as an input the output of each of the perspective transform processing systems 1002a to 1002n and generates an intersection effect comprising a single video image $V_{out}$ displaying an intersection of pre-shaped target video images $\hat{F}_1$ to $\hat{F}_n$.

FIG. 32 illustrates an example implementation of the perspective transform processing system 1002a of FIG. 31, it being understood that the other perspective transform processing systems 1002b to 1002n may each have a similar implementation (but with different source video image/ associated alpha inputs).

With reference to FIG. 32, the perspective transform processing system 1002a comprises memory 1020, a raster-scan counter 1022, a perspective transform engine 1024, an interpolator 1026, an address generator 1028, a shaping alpha generator 1030, and a pre-shaper 1032. The raster-scan counter 1022 may be implemented, for example, by (or using) a digital counter circuit. The perspective transform engine 1024, interpolator 1026, address generator 1028, shaping alpha generator 1030, and pre-shaper 1032 may each be implemented, for example, using a general processing device (e.g. processor) and/or a specific integrated circuit configured to perform the specific operations discussed herein. For completeness, detailed example implementations of the perspective transform engine 1024, shaping alpha generator 1030, and pre-shaper 1032 are discussed below.

In operation, the perspective transform processing system 1002 receives as its input the source video image $V_1$ and associated alpha $\alpha_{V1}$ and stores them in the memory 1020. In some embodiments, the source video image $V_1$ and/or alpha $\alpha_{V1}$ may be subject to pre-filtering (not shown). The raster-scan counter 1022 may be used to write the source video image $V_1$ and associated alpha $\alpha_{V1}$ into the memory 1020 on a pixel-by-pixel basis.

A corresponding target image $F_1$, representing a transformed version of source video image $V_1$ (i.e. source video image $V_1$ having undergone a 3-D perspective effect), and a corresponding transformed associated alpha $\alpha_{F1}$, are then generated. The corresponding target image $F_1$ comprises a 2-D grid of target image pixels, each target image pixel having a target pixel coordinate $(x_t,y_t)$ and associated target pixel value $F_1(x_t,y_t)$. The transformed associated alpha $\alpha_{F1}$ also comprises a plurality of values, one alpha value $\hat{\alpha}_{V1}$ $(x_t,y_t)$ for each target pixel coordinate $(x_t,y_t)$.

The target image $F_1$ and corresponding transformed associated alpha $\alpha_{F1}$ are generated on a pixel-by-pixel basis using an inverse mapping function as follows. The raster-scan counter 1022 begins at $(x_t,y_t)=(0,0)$ and counts up to $(x_t,y_t)=(m,n)$ (assuming the target image $F_1$ comprises an $(m+1)\times(n+1)$ grid of pixels). For each target pixel coordinate $(x_t,y_t)$, the target coordinate values $x_t$ and $y_t$ are input into the perspective transform engine 1024, which computes the corresponding source pixel coordinate $(x_s,y_s)$ of the source video image $V_1$ stored in the memory 1020. The source pixel coordinate $(x_s,y_s)$ corresponding to the target pixel coordinate $(x_t,y_t)$ is a function of the manipulation being applied by the digital video effects and is defined by parameters 1034. In this embodiment, to obtain the corresponding x-coordinate of the source pixel (i.e. $x_s$) for a given target pixel coordinate $(x_t,y_t)$, the following computation is performed by the perspective transform engine 1024:

$$x_s = T_d + \frac{(T_a x_t + T_b y_t + T_c f)P_d}{P_a x_t + P_b y_t + P_c f} \quad \text{(i.e. Equation (5) above)}$$

To obtain the corresponding y-coordinate of the source pixel (i.e. $y_s$) for a given target pixel $(x_t,y_t)$, the following computation is performed by the perspective transform engine 1024:

$$y_s = T_h + \frac{(T_e x_t + T_f y_t + T_g f)P_d}{P_a x_t + P_b y_t + P_c f} \quad \text{(i.e. Equation (6) above).}$$

As discussed earlier, Equations (5) and (6) are based on mapping of a target pixel coordinate to a corresponding source pixel coordinate using the following inverse mapping function:

$$M^{-1} = \begin{bmatrix} T_a & T_b & T_c & T_d \\ T_e & T_f & T_g & T_h \\ P_a & P_b & P_c & -P_d \\ 0 & 0 & 0 & 1 \end{bmatrix} \quad \text{(i.e. Equation (7) above).}$$

In this example, $T_a$, $T_b$, $T_c$, $T_d$, $T_e$, $T_f$, $T_g$, $T_h$, $P_a$, $P_b$, $P_c$, $P_d$, and f are the parameters 1034, and their specific values are computed based on the specific effect requested by the user. For example, if a user indicated via a user interface (not shown) that it was desired to rotate the source video image $V_1$ and by 15 degrees and shrink the source video image $V_1$ and to half its size, then the user interface would electronically forward this request to the perspective transform processing system 1002a, which would compute the corresponding values of the parameters 1034, and forward these specific parameter values 1034 to the perspective transform engine 1024.

In general, the target pixel value $F_1(x_t,y_t)$ for the target image $F_1$ will be set as the corresponding source pixel value $V_1(x_s,y_s)$, which is stored in and retrieved from memory 1020. However, the corresponding source pixel coordinate $(x_s,y_s)$ computed by the perspective transform engine 1024 for a given target pixel coordinate $(x_t,y_t)$ will (in general) not be an integer, but will be a fractional value. For example, if $(x_t,y_t)=(12, 14)$ is input into the perspective transform engine 1024, then the corresponding source pixel coordinate $(x_s,y_s)$ may be, for example, $(x_s,y_s)=(23.63,17.27)$. Therefore, to compute the target pixel value $F_1(x_t,y_t)$, interpolation is used. In one embodiment, bilinear interpolation is used as follows: assume a source pixel coordinate of $(x_s,y_s)=(i+u, j+v)$ where $(i,j)$ is the integer and $(u,v)$ is the fraction. For example, in the example above of $(x_s,y_s)=(23.63,17.27)$, then $i=23$, $u=0.63$, $j=17$, and $v=0.27$. The source pixel values neighbouring $(x_s,y_s)=(i+u,j+v)$ are therefore $V_1(i,j)$, $V_1(i+1, j)$, $V_1(i,j+1)$, and $V_1(i+1,j+1)$. The target pixel value $F_1(x_t,y_t)$ is then computed as $F_1(x_t,y_t)=Y_j\times(1-v)+Y_{j+1}\times v$, where $Y_1= (i,j)\times(1-u)+V_1(i+1,j)\times u$ and where $Y_{j+1}=V_1(i,j+1)\times(1-u)+V_1(i+1,j+1)\times u$. To perform interpolation of this nature, the perspective transform processing system includes the interpolator 1026. It will be appreciated that another type of interpolation could be performed instead (e.g. a higher order of interpolation that uses a higher order of polynomial in the x-axis and y-axis).

The associated alpha $\alpha_{V1}$ is subject to the same perspective transform as the source video image $V_1$. In the example implementation shown in FIG. 32, the interpolator 1026 also produces transformed associated alpha $\alpha_{F1}$ in the same manner. That is, in general, for each target pixel coordinate $(x_t, y_t)$, the transformed associated alpha $\alpha_{F1}(x_t, y_t)$ will be set as the corresponding associated alpha value $\alpha_{V1}(x_s, y_s)$, which is stored in and retrieved from memory 1020. However, the corresponding source pixel coordinate $(x_s, y_s)$ computed by the perspective transform engine 1024 for a given target pixel coordinate $(x_t, y_t)$ will (in general) not be an integer, and so the interpolation described above is performed (e.g., bilinear interpretation in which $\alpha_{F1}(x_t, y_t) = Y_j \times (1-v) + Y_{j+1} \times v$, where $Y_j = \alpha_{V1}(i,j) \times (1-u) + \alpha_{V1}(i+1,j) \times u$ and where $Y_{j+1} = \alpha_{V1}(i,j+1) \times (1-u) + \alpha_{V1}(i+1,j+1) \times u$). Please note that although a single perspective transform engine 1024 and interpolator 1026 is illustrated for producing both the target image $F_1$ and the transformed alpha $\alpha_{F1}$, it may instead be the case in some embodiments that two independent perspective transform engines and interpolators are used: one to produce the target image $F_1$, and the other to produce the transformed alpha $\alpha_{F1}$. In such an embodiment, each perspective transform engine would have the same parameters 1034 and operate in the same way, as would the interpolators, except that for one interpolator only target image $F_1$ would be produced, and for the other interpolator only the transformed alpha $\alpha_{F1}$ would be produced.

As shown in FIG. 32, the perspective transform processing system 1002a also includes the address generator 1028, which uses the computed source pixel coordinate $(x_s, y_s)$ (e.g. $(x_s, y_s) = (23.63, 17.27)$) to generate the addresses of the source pixels to be used for the interpolation (e.g. (23,17), (23,18), (24,17), and (24,18)). The corresponding source pixel values indicated by the address generator 1028 are then read from memory 1020 and fed to interpolator 1026. The fractional values of the computed source pixel coordinate $(x_s, y_s)$ (e.g. 0.63 and 0.27) are also forwarded to the interpolator 1026 for use in the interpolation. The output of interpolator 1026 is the target pixel value $F_1(x_t, y_t)$ and the transformed associated alpha $\alpha_{F1}(x_t, y_t)$ value.

The process above is repeated for each target image coordinate $(x_t, y_t)$ such that the target image $F_1$ and associated transformed alpha $\alpha_{F1}$ is created on a pixel-by-pixel basis.

The target image $F_1$ and associated transformed alpha $\alpha_{F1}$ are fed to the pre-shaper, which operates in the manner described later.

As shown in FIG. 32, the output of the perspective transform engine 1024 also includes a overflow/underflow signal ("ovfl_unfl") which indicates if there was any overflow or underflow or data out-of-range conditions during the computations in the perspective transform engine 1024, such as situations in which $\Sigma P = P_a x_t + P_b y_t + P_c f = 0$ (e.g. a singularity that occurs when the target object is located at a vanishing line), or an effect causing an invisibility.

The perspective transform engine 1024 further outputs associated depth values $Z_1$, which in this embodiment are unified depth values (i.e. unified depth in terms of focus, like in equation (8)). The perspective transform engine 1024 further outputs associated perspective parameters values $\Sigma P_1$. Specifically, for each target pixel coordinate $(x_t, y_t)$ an associated depth value $Z_1(x_t, y_t)$ and an associated perspective parameter values $\Sigma P_1(x_t, y_t)$ are generated. The associated depth values are computed via equation (8) above:

$$Z_1(x_t, y_t) = \frac{P_d}{P_a x_t + P_b y_t + P_c f},$$

and the associated perspective parameter values are computed as: $\Sigma P_1(x_t, y_t) = P_a x_t + P_b y_t + P_c f$. An example of circuitry to compute the associated depth values and perspective parameter values is explained later.

The perspective transform processing system 1002a also includes the shaping alpha generator 1030, which computes the shaping alpha $\alpha_{shp}$ for the target image $F_1$ in the manner described in more detail below. The shaping alpha $\alpha_{shp}$ comprises a set of shaping alpha values $\{\alpha_{shp}(x_t, y_t)\}$, i.e. a set comprising one shaping alpha value $\alpha_{shp}(x_t, y_t)$ for each pixel coordinate $(x_t, y_t)$ in the target image $F_1$. As shown in FIG. 32, the shaping alpha generator 1030 receives as its input the coordinates of the source video image $(x_s, y_s)$ and the overflow/underflow signal ("ovfl_unfl") from the perspective transform engine 1024, and optionally (depending upon the implementation of the shaping alpha generator 1030), the associated perspective parameter values $\Sigma P_1$.

The perspective transform processing system 1002a further includes the pre-shaper 1032, which receives as its input the shaping alpha $\alpha_{shp}$, the target image $F_1$, the associated transformed alpha $\alpha_{F1}$, and the associated depth values $Z_1$. The pre-shaper 1032 modifies the depth values $Z_1$ (to produce $\hat{Z}_1$), pre-shapes the target image $F_1$ (to produce $\hat{F}_1$), and computes the complementary of the alpha $\alpha_1^c$ used to pre-shape the target image $F_1$. An example implementation of the pre-shaper 1032 will be explained in more detail later.

FIG. 33 illustrates an example implementation of the perspective transform engine 1024. As shown in FIG. 33, the perspective transform engine 1024 includes computational blocks 1102, 1104, and 1106 for respectively computing intermediary values $\Sigma X$, $\Sigma Y$, and $\Sigma P_1$. The perspective transform engine 1024 also includes divider 1108, multipliers 1110 and 1114, and adders 1112 and 1116. The computational blocks 1102, 1104, and 1106 may be implemented, for example, using digital adders and multipliers. The adders, multipliers, and divider may be implemented, for example, using digital logic for adding two input signals (in the case of the adders) or digital logic for multiplying two input signals (in the case of the multipliers) or digital logic for dividing two input signals (in the case of the divider).

As discussed above, the parameters 1034 include $T_a$, $T_b$, $T_c$, $T_d$, $T_e$, $T_f$, $T_g$, $T_h$, $P_a$, $P_b$, $P_c$, $P_d$, and f. These are computed in real-time before the target counts (of the raster scanner 1022) starts. These parameters may be re-calculated per video field or frame, repeatedly, or at least every time the effect being applied is modified.

In operation of the perspective transform engine 1024, the parameters $T_a$, $T_b$, $T_c$, and f are combined with target image coordinates $x_t$ and $y_t$ to compute $\Sigma X = T_a x_t + T_b y_t + T_c f$, as per computational block 1102. The parameters $T_e$, $T_f$, $T_g$, and f are combined with target image coordinates $x_t$ and $y_t$ to compute $\Sigma Y = T_e x_t + T_f y_t + T_g f$, as per computational block 1104. The parameters $P_a$, $P_b$, $P_c$, and f are combined with target image coordinates $x_t$ and $y_t$ to compute $\Sigma P_1 = P_a x_t + P_b y_t + P_c f$, as per computational block 1106. The parameter $P_d$ is divided by $\Sigma P = P_a x_t + P_b y_t + P_c f$ to generate $$\frac{P_d}{P_a x_t + P_b y_t + P_c f},$$

as per divider 1108.

This value is the associated depth, as per Equation (8), $$\text{i.e., } \overline{Z}_1 = \frac{P_d}{P_a x_t + P_b y_t + P_c f}.$$

The value $$\frac{P_d}{P_a x_t + P_b y_t + P_c f}$$

is then multiplied with $\Sigma X = T_a x_t + T_b y_t + T_c f$ at multiplier 1110 and this result subsequently added to parameter $T_d$ at adder 1112 to generate $$x_s = T_d + \frac{(T_a x_t + T_b y_t + T_c f) P_d}{P_a x_t + P_b y_t + P_c f}$$

(i.e. Equation (6)). Similarly, the value $$\frac{P_d}{P_a x_t + P_b y_t + P_c f}$$

is multiplied with $\Sigma Y = T_e x_t + T_f y_t + T_g f$ at multiplier 1114 and this result subsequently added to parameter $T_h$ at adder 1116 to generate $$y_s = T_h + \frac{(T_e x_t + T_f y_t + T_g f) P_d}{P_a x_t + P_b y_t + P_c f}$$

(i.e. Equation (6)).

In the illustrated embodiment, the perspective transform engine 1024 additionally includes overflow/underflow circuitry 1118, which detects any overflow or underflow or data out-of-range conditions when the computations of the perspective transform engine 1024 are performed and indicates this via output signal "ovfl_unfl". An example of overflow/underflow conditions that may be checked are as follows: (1) determine whether $\Sigma P_1 = P_a x_t + P_b y_t + P_c f$ is equal to zero, and if it is equal to zero, then indicate an overflow/underflow condition; and/or (2) determine whether $$\frac{P_d}{P_a x_t + P_b y_t + P_c f}$$

is less than zero, and if it is less than zero, then indicate an overflow/underflow condition; and/or (3) check whether the image coordinates $x_s$ and $y_s$ are out of bounds, and if one or both of them are out of bounds then indicate an overflow/underflow condition.

The shaping alpha generator 1030 and pre-shaper 1032 are also illustrated in FIG. 32 for context. Example implementations of these are provided later. As shown again in FIG. 32, the intermediary value $\Sigma P_1$ may or may not be fed into the shaping alpha generator 1030, depending upon the implementation of the shaping alpha generator 1030 (i.e. how the shaping alpha generator 1030 implements an anti-alias effect). For example, the shaping alpha generator 1030 may operate by determining whether the source pixel coordinate $(x_s, y_s)$ falls within a predetermined uniform area around the border of the source video image $V_1$, and if so, setting the shaping alpha value to be a value between zero and one depending upon the distance of the source pixel coordinate $(x_s, y_s)$ from the border. Such an implementation may not use the value $\Sigma P_1$. However, an example implementation for the shaping alpha generator 1030 is described below in which the value $\Sigma P_1$ is used.

FIG. 34 illustrates an example implementation of the shaping alpha generator 1030. As shown in FIG. 34, the shaping alpha generator 1030 of this example implementation includes four computational blocks 1202, 1204, 1206, and 1208, which may be referred to as processing paths or "channels". Each processing path computes a respective boundary shaping alpha value $\alpha_i(x_s, y_s)$, where i=L, R, T, and B. That is, left alpha processing path 1202 computes left boundary shaping alpha value $\alpha_L(x_s, y_s)$, right alpha processing path 1204 computes right boundary shaping alpha value $\alpha_R(x_s, y_s)$, top alpha processing path 1206 computes top boundary shaping alpha value $\alpha_T(x_s, y_s)$, and bottom alpha processing path 1208 computes bottom boundary shaping alpha value $\alpha_B(x_s, y_s)$. The processing paths 1202 to 1208 are implemented using adders, subtractors, multipliers, clipping/truncation circuitry, and computational circuitry for computing a softness range gain. For example, left alpha processing path 1202 includes subtractor 1210, adder 1211, multiplier 1214, clipper 1216, and softness range gain computational circuitry 1212. The multipliers, adders, and subtractors may be implemented, for example, using digital logic for subtracting two input signals (in the case of the subtractor) or digital logic for adding two input signals (in the case of the adder) or digital logic for multiplying two input signals (in the case of the multiplier). The clipper 1216 implements the clipping operation $$\alpha_L(x_s, y_s) = \begin{cases} 0, & \alpha'_L(x_s, y_s) < 0 \\ 1, & \alpha'_L(x_s, y_s) > 1 \\ \alpha'_L(x_s, y_s), & \text{else} \end{cases}$$

for example, using a comparator to evaluate whether $\alpha'_L(x_s, y_s)$ is less than zero, between zero or one, or greater than zero. The softness range gain computational circuitry 1212 determines or computes a gain value $G_L$. The specific circuitry of softness range gain computational circuitry 1212 is implementation specific and dependent upon the shaping alpha softness effect desired, and the gain value $G_L$ may be constant or dynamic. For example, in one embodiment the softness range gain computational circuitry 1212 may compute the gain value $G_L$ as the absolute value of $\Sigma P_1$ multiplied by a scaling parameter S, in which case the softness range gain computational circuitry 1212 would comprise digital logic for determining the absolute value of $\Sigma P_1$, followed by a multiplier for multiplying the absolute value of $\Sigma P_1$ with the scaling parameter S. This method uses the intermediary value $\Sigma P_1$, and it is assumed that a method such as this is used in the FIG. 34 implementation, which is why the FIG. 34 implementation shows $\Sigma P_1$ being fed to the softness range gain computational circuitry. U.S. patent application Ser. No. 14/479,989, filed on Sep. 8, 2014, entitled "Methods and Systems for Computing an Alpha Channel Value", and incorporated herein by reference, discloses different approaches for computing a shaping alpha value and provides a specific example of how softness range gain computational circuitry 1212 may be implemented.

The shaping alpha generator 1030 further includes fuzzy logic AND blocks 1220, 1224, and 1222, as well as multiplexer 1226. The fuzzy logic AND blocks may be implemented using computational circuitry configured to implement the fuzzy logic AND operations described herein (e.g. as described in more detail below with respect to FIGS. 35 and 36).

The shaping alpha generator 1030 of FIG. 34 uses four cropping values $C_L$, $C_R$, $C_T$, and $C_B$. A discussion of these cropping values is as follows.

The source image $V_1$ is defined by four boundaries: left, right, top, and bottom. More generally, given that cropping can be applied to the source image $V_1$, the source image can more generally be considered to be defined by four cropping lines (left, right, top, and bottom), which will be designated as left cropping boundary line $C_L$, right cropping boundary line $C_R$, top cropping boundary line $C_T$, and bottom cropping boundary line $C_B$. If there is no cropping, then these cropping lines are just the boundary lines. A cropping line can be denoted as:

$$C_i = \begin{cases} C_L & i = L \text{ (Left Cropping)} \\ C_R & i = R \text{ (Right Cropping)} \\ C_T & i = T \text{ (Top Cropping)} \\ C_B & i = B \text{ (Bottom Cropping)} \end{cases} \quad \text{Equation (41)}$$

Therefore, the four cropping values $C_L$, $C_R$, $C_T$, and $C_B$ are known as they define the boundaries of the source image $V_1$.

The shaping alpha defines the softness around these four cropping boundaries (i.e. the border of the source image). The amount of "softness" (i.e. the value of the shaping alpha) may be determined based on a distance of the inverse mapped source pixel (i.e. $(x_s,y_s)$ in FIG. 34) from each boundary. Therefore, a distance difference may be defined as:

$$\Delta D_i = \begin{cases} x_s - C_L & i = L \\ C_R - x_s & i = R \\ y_s - C_T & i = T \\ C_B - y_s & i = B \end{cases} \quad \text{Equation (42)}$$

In some embodiments, the cropping boundaries may be defined in higher precision (e.g. 6-bit fraction) to achieve sub-pixel movement. That is, sub-pixels (fractions of pixel coordinates) may be used in some embodiments, and in such embodiments the cropping boundaries may therefore be defined on a higher precision basis. Any movement of a cropping boundary on a sub-pixel basis may have a smoother look to a viewer.

Each processing path may compute an initial shaping alpha value as:

$$\alpha'_i = G_i \Delta D_i + \alpha_0, \quad \text{Equation (43)}$$

Note that in this context $\alpha'_i$ is referring to an initial shaping alpha value, not to a complementary alpha value. The $\alpha_0$ value is referred to as an "initial offset value". It is optional and is discussed later.

Thus, an initial shaping alpha value $\alpha'_i$ be computed for each border (boundary) of the source image, each initial shaping alpha value $\alpha'_i$ representing the distance of the (inversed mapped) source pixel coordinate from that border, the distance being measured along the coordinate axis perpendicular to the border.

The initial shaping alpha value $\alpha'_i$ may be truncated or clipped to unit range:

$$\alpha_i(x_s, y_s) = \begin{cases} 0 & \alpha'_i < 0 \\ 1 & \alpha'_i > 1, \text{ where } i = L, R, T, B \\ \alpha_i & \text{else} \end{cases} \quad \text{Equation (44)}$$

to obtain boundary shaping alpha value $\alpha_i(x_s,y_s)$, and then each boundary shaping alpha value $\alpha_i(x_s,y_s)$ for i=L, R, T, B may be combined using a fuzzy logic AND:

$$\alpha_{shp}(x_t, y_t) = \bigcap_{i=L,R,T,B} \alpha_i(x_s, y_s), \quad \text{Equation (45)}$$

to result in shaping alpha value $\alpha_{shp}(x_t,y_t)$

The computations above describe one way to compute the shaping alpha $\alpha_{shp}$, and in particular these are the computations performed by the shaping alpha generator 1030 illustrated in FIG. 34. Specifically, with reference to FIG. 34, in operation the left alpha processing path 1202 subtracts $C_L$ from $x_s$ via subtractor 1210 to obtain $\Delta D_L = x_s - C_L$, which is then multiplied by gain $G_L$ via multiplier 1214, which is then added to alpha offset value $\alpha_0$ via adder 1211 to obtain initial shaping alpha value $\alpha_L(x_s,y_s) = G_L \Delta D_L + \alpha_0$. The initial shaping alpha value $\alpha_L(x_s,y_s)$ is then subject to clipper 1216, which implements Equation (44) above, to obtain left boundary alpha value $\alpha_L(x_s,y_s)$.

Right alpha processing path 1204, top alpha processing path 1206, and bottom alpha processing path 1208 are of the same structure as left alpha processing path 1204, except that different parameter inputs are used to respectively compute right boundary shaping alpha value $\alpha_R(x_s,y_s)$, top boundary shaping alpha value $\alpha_T(x_s,y_s)$, and bottom boundary shaping alpha value $\alpha_B(x_s,y_s)$ as per the equations above.

The shaping alpha generator 1030 then implements Equation (45) as follows. The left and right boundary shaping alpha values $\alpha_L(x_s,y_s)$ and $\alpha_R(x_s,y_s)$ are used as the set of inputs for a first fuzzy logic AND $$\bigcap_{i=L,R} \alpha_i(x_s, y_s),$$

as at block 1220, and the top and bottom boundary shaping alpha values $\alpha_T(x_s,y_s)$ and $\alpha_B(x_s,y_s)$ are used as the set of inputs for a second fuzzy logic AND $$\bigcap_{i=T,B} \alpha_i(x_s, y_s),$$

as at block 1222, and then these two results are used as the set of inputs for a third fuzzy logic AND, as at block 1224, to generate the shaping alpha value $\alpha_{shp}(x_t,y_t)$ for the pixel coordinate $(x_t,y_t)$ of the target image. This can be considered parallel or cascade merging of multiple binary operation fuzzy logic ANDS to construct a fuzzy logic AND having more than 2 operands.

Then, as shown at 1226, the shaping alpha value $\alpha_{shp}(x_t, y_t)$ is multiplexed with the value "0", with the overflow/underflow choosing "0" (that is, overflow/underflow="true") if there was an overflow/underflow error in the computations. This multiplexer implements a switch that can switch between "0" and the shaping alpha value $\alpha_{shp}(x_t,y_t)$. By choosing "0", this results in the pixel being fully transparent if the overflow/underflow condition becomes true.

One example way to implement the fuzzy logic AND operations is illustrated in FIG. 35. As shown in FIG. 35, this implementation includes comparators and multiplexers arranged in the manner illustrated. Specifically, the minimum of left boundary shaping alpha value $\alpha_L(x_s,y_s)$ and right boundary shaping alpha value $\alpha_R(x_s,y_s)$ is selected via comparator 1262 and multiplexer 1264. Similarly, the minimum of top boundary shaping alpha value $\alpha_T(x_s,y_s)$ and bottom boundary shaping alpha value $\alpha_B(x_s,y_s)$ is selected via comparator 1266 and multiplexer 1268. The output of each of multiplexers 1264 and 1268 are then compared using comparator 1270 and the smallest value selected using multiplexer 1272. The output is:

$$\alpha_{shp}(x_t,y_t)=\min\{\alpha_L(x_s,y_s),\alpha_R(x_s,y_s),\alpha_T(x_s,y_s),\alpha_B(x_s,y_s)\}. \quad \text{Equation (46)}$$

This is considered a fuzzy logic implementation using an arithmetic minimum.

Another example way to implement the fuzzy logic AND operations is illustrated in FIG. 36. As shown in FIG. 36, this implementation includes multipliers arranged in the manner illustrated. Specifically, the left boundary shaping alpha value $\alpha_L(x_s,y_s)$ and the right boundary shaping alpha value $\alpha_L(x_s,y_s)$ are multiplied, as at 1282. Similarly, the top boundary shaping alpha value $\alpha_T(x_s,y_s)$ and the bottom boundary shaping alpha value $\alpha_B(x_s,y_s)$ are multiplied, as at 1284. The output of each of multipliers 1282 and 1284 are multiplied, as at 1286. The output is:

$$\alpha_{shp}(x_t,y_t)=\alpha_L(x_s,x_t)\times\alpha_R(x_s,x_t)\times\alpha_T(x_s,x_t)\times\alpha_B(x_s,y_s). \quad \text{Equation (47)}$$

This is considered a fuzzy logic implementation using arithmetic multiplication.

The FIG. 35 implementation tends to give a sharp-angled corner effect (i.e. sharper looking corners around the transformed source image), whereas the FIG. 36 implementation tends to give a rounded corner effect (i.e. more rounded looking corners around the transformed source image).

As explained above with reference to Equation (43), each processing path may compute an initial shaping alpha value $\alpha'_i$ as $\alpha'_i = G_i\Delta D_i + \alpha_0$, where $\alpha_0$ is an initial offset value. The initial offset value $\alpha_0$ is optional, but if used, it takes on a value of between 0 and 1. In some embodiments, the exact value of the initial offset value $\alpha_0$ may be controlled by the user, e.g., through a user interface (not shown). The initial offset value $\alpha_0$ is an effect. Specifically, it geometrically shifts where the softness area of the shaping alpha is located relative to the boundary of the target object. The higher the initial offset value $\alpha_0$, the more outwardly extended the softness area is. It will be appreciated that in some embodiments, a different initial offset value $\alpha_0$ may be chosen for each boundary, if desired.

Turning now to FIG. 37, this figure illustrates an example implementation of the pre-shaper 1032. As shown in FIG. 37, the pre-shaper includes a depth modifier 1302 and a video modifier 1304. The depth modifier 1302 comprises a comparator 1306 for comparing if two inputs are equal, and a multiplexer 1308 for selecting between two inputs. The comparator 1306 may be implemented, for example, using a digital logic circuit that compares two input signals and produces one output (e.g. "truth", which may be represented by the number "1", for example) if the two inputs equal each other, and otherwise produces another output (e.g. "false", which may be represented by the number "0", for example). The multiplexer 1308 may be implemented, for example, using digital logic circuitry to perform a multiplexer function (i.e. select between two input signals based on the value of a selection signal).

The video modifier 1304 comprises multipliers 1310 and 1312, as well as a subtractor 1314. The multipliers 1310 and 1312 each may be implemented, for example, by digital logic for multiplying two inputs signal. The subtractor 1314 may be implemented, for example, by digital logic for subtracting two input signals.

The depth modifier 1032 modifies each associated unified depth value $\overline{Z}_1$ to set the associated depth value $\overline{Z}_1$ to be infinity if the shaping alpha is zero (i.e. outside the bounds of the source image). Otherwise, the output of the depth modifier 1032 is $\overline{Z}_1$. That is, the depth modifier 1032 implements the following selection:

$$\hat{Z}_1 = \begin{cases} \overline{Z}_1 & \alpha_{shp} \neq 0 \\ \infty & \alpha_{shp} = 0 \end{cases}. \quad \text{Equation (48)}$$

In one implementation, a predetermined number is used to represent "infinity".

Equation (48) is implemented by the depth modifier 1032 in operation as follows: the comparator 1306 compares the shaping alpha value $\alpha_{shp}$ to zero for each target pixel coordinate. If $\alpha_{shp}=0$, then the multiplexer 1308 selects "infinity" as the depth value $\hat{Z}_1$. Otherwise, the multiplexer 1308 selects the associated depth value $\overline{Z}_1$ as the depth value $\hat{Z}_1$. The purpose of the depth modifier is to ensure that the areas of the image outside source boundaries have a depth that has a relatively large magnitude ("infinity"). This is because the areas of the image outside the source boundaries are not displayed. Such areas may therefore be considered as having an "infinite" depth such that they are not seen by the viewer. This relates to the shaping alpha value as follows: when the target pixels are in the source image, then the shaping alpha values for those pixels will be one; when the target pixels are in the softness range bordering the source image, then the shaping alpha values for those pixels are between zero and one; when the target pixels are outside the source image (and softness range bordering the source image), then the shaping alpha values for those pixels are zero. Therefore, the depth value is set to the predetermined number ("infinity") when the shaping alpha value is zero. By using an "infinite" (i.e. the predetermined number) depth value for target image pixels outside of source boundaries, it may avoid misusing depth data for calculation of the intersection effect, particularly for fuzzy intersection lines. That is, it may avoid the target image pixel outside the source boundary from incorrectly being considered nearer to the viewer and made visible.

The video modifier 1304 performs a function that is different from the depth modifier 1302. Specifically, the video modifier 1304 pre-shapes the target video image $F_1$ to produce pre-shaped target video image $\hat{F}_1$, and the video modifier 1304 also generates associated complementary alpha $\alpha_1^c$. In operation, the multiplier 1310 of the video modifier 1304 multiplies the transformed associated alpha $\alpha_{F1}$ with the shaping alpha $\alpha_{shp}$, and then this is multiplied by the target video image $F_1$ at multiplier 1312 to produce pre-shaped target video image $\hat{F}_1$. The complementary alpha $\alpha_1{}^c$ associated with the pre-shaped target video image $\hat{F}_1$ is obtained by computing $\alpha_1{}^c=1-\alpha_{F1}\alpha_{shp}$ at subtractor 1314.

As alluded to earlier, if the original video source image $V_1$ does not have an associated alpha $\alpha_{V1}$, then one may be generated in which each value of the associated alpha $\alpha_{V1}$ is set to 1. This will then allow for the generation of transformed associated alpha $\alpha_{F1}$ and ultimately pre-shaped target video image $\hat{F}_1$ and complementary alpha $\alpha_1{}^c$.

Note that pre-shaped target video image $\hat{F}_1$ is called "pre-shaped" because this shaping occurs before any wipe-based mix.

Example implementations for the intersection effect system 1004 of FIG. 31 will now be described.

Recall from the discussion of intersection effect above, if it is desired to intersect two transformed video images $F_1$ and $F_2$, then a wipe-based mix is performed via Equation (14) to obtain $O_{mix} = B\alpha_{1,2}{}^c + K_{1,2}$, where $$K_{1,2} = (\hat{F}_2\alpha_1{}^c + \hat{F}_1)w_{1,2}{}^c + (\hat{F}_1\alpha_2{}^c + \hat{F}_2)w_{1,2}. \quad \text{Equation (49)}$$

$K_{1,2}$ may be called a "key", and in this case $K_{1,2}$ represents a wipe between sources $\hat{F}_2\alpha_1{}^c + \hat{F}_1$ and $\hat{F}_1\alpha_2{}^c + \hat{F}_2$. More specifically, $K_{1,2}$ represents the intersection of images $\hat{F}_1$ and $\hat{F}_2$ (since $\hat{F}_2\alpha_1{}^c + \hat{F}_1$ is image $\hat{F}_1$ layered on top of $\hat{F}_2$, $\hat{F}_1\alpha_2{}^c + \hat{F}_2$ is image $\hat{F}_2$ layered on top of image $\hat{F}_1$, and the wipe pattern chooses with one of $\hat{F}_2\alpha_1{}^c + \hat{F}_1$ and $\hat{F}_1\alpha_2{}^c + \hat{F}_2$ to display based on the difference in depth between $\hat{F}_1$ and $\hat{F}_2$).

More generally, for two transformed video images $F_i$ and $F_{i+1}$, then the key $K_{i,i+1}$ is:

$$K_{i,i+1} = (\hat{F}_{i+1}\alpha_i{}^c + \hat{F}_i)w_{i,i+1}{}^c + (\hat{F}_i\alpha_{i+1}{}^c + \hat{F}_{i+1})w_{i,i+1}. \quad \text{Equation (50)}$$

Also recall from the discussion of intersection effect above that to obtain images $\hat{F}_3$ and $\hat{F}_4$ intersected and layered on top of intersected images $\hat{F}_1$ and $\hat{F}_2$, a wipe-based mix is performed via Equation (25) to obtain $O_{mix} = B\alpha_{1:4}{}^c + K_{1:4}$, where $$K_{1:4} = (K_{3,4}\alpha_{1,2}{}^c + K_{1,2})w_{1:4}{}^c + (K_{1,2}\alpha_{3,4}{}^c + K_{3,4})w_{1:4}. \quad \text{Equation (51)}$$

The key $K_{1:4}$ represents a wipe between previous keys $K_{1,2}$ and $K_{3,4}$.

It will be noted that Equations (50) and (51) have a similar form: in Equation (50) the input are source images (i.e. $F_i$ and $F_{i+1}$), whereas in Equation (51) the images are keys (i.e. $K_{1,2}$ and $K_{3,4}$). Mixes among keys (e.g. Equation (51)) may be referred to as "inter-pair mixes", whereas mixes among source videos (e.g. Equation (50)) may be called intra-pair mixes". In both cases they always output a shaped key K.

It will also be noted from the discussion of intersection effect that:

$$\alpha_{1,2}{}^c = \alpha_1{}^c\alpha_2{}^c, \quad \text{Equation (52)}$$

and $$\alpha_{1:4}{}^c = \alpha_{1,2}{}^c\alpha_{3,4}{}^c. \quad \text{Equation (53)}$$

Turning now to FIG. 38, there is illustrated an example implementation of a video mixer 1350 for implementing the mix discussed above with respect to Equations (49) to (51). The mixer 1350 comprises alpha processing path 1351 and video processing path 1352. The alpha processing path 1351 comprises multiplier 1354, and the video processing path 1352 comprises multipliers 1356, 1358, 1360, and 1362, adders 1364, 1366, and 1368, and subtractor 1370. The multipliers may be implemented, for example, by digital logic circuitry that multiplies two input signals together to obtain an output, the adders may be implemented, for example, by digital logic circuitry that adds two input signals together to obtain an output, and the subtractor may be implemented, for example, by digital logic circuitry that subtracts one input signal from another input signal to obtain an output.

The operation of the alpha processing path 1351 is as follows. An input complementary alpha $\alpha_i{}^c$ is multiplied via multiplier 1354 with input complementary alpha $\alpha_{i+1}{}^c$ to obtain $\alpha_{i,i+1}{}^c = \alpha_i{}^c\alpha_{i+1}{}^c$. Therefore, the alpha processing path 1351 may compute Equation (52) or (53).

The video processing path 1352 may compute Equation (50) (if the input is $\hat{F}_i$ and $\hat{F}_{i+1}$) or Equation (51) (if the input are keys $K_i = K_{1,2}$ and $K_{i+1} = K_{3,4}$) as follows. The complementary alpha $\alpha_i{}^c$ is multiplied by $\hat{F}_{i+1}$ (or $K_{i+1}$) at multiplier 1356 and the result is added to $\hat{F}_1$ (or $K_i$) at adder 1364 to obtain $\hat{F}_{i+1}\alpha_i{}^c + \hat{F}_i$ (or $K_{i+1}\alpha_i{}^c + K_i$). The complementary alpha $\alpha_{i+1}{}^c$ is multiplied by $\hat{F}_1$ (or $K_i$) at multiplier 1358 and the result added to $\hat{F}_{i+1}$ (or $K_i$) at adder 1366 to obtain $\hat{F}_i\alpha_{i+1}{}^c + \hat{F}_{i+1}$ (or $K_i\alpha_{i+1}{}^c + K_{i+1}$). The wipe value $w_{i,i+1}$ is received at subtractor 1370, which subtracts $w_{i,i+1}$ from the value one to obtain $w_{i,i+1}{}^c = 1 - w_{i,i+1}$. The output of adder 1364 is then multiplied by $w_{i,i+1}{}^c$ at multiplier 1360, and the output of adder 1370 is multiplied by $w_{i,i+1}$ at multiplier 1362, and the outputs of multipliers 1360 and 1362 added together via adder 1368 to obtain Equation (50): $K_{i,i+1} = (\hat{F}_{i+1}\alpha_i{}^c + \hat{F}_i)w_{i,i+1}{}^c + (\hat{F}_i\alpha_{i+1}{}^c + \hat{F}_{i+1})w_{i,i+1}$, or (if the input were keys $K_i = K_{1,2}$ and $K_{i+1} = K_{3,4}$ and complementary alpha values $\alpha_i{}^c = \alpha_{1,2}{}^c$ and $\alpha_{i+1}{}^c = \alpha_{3,4}{}^c$) to obtain Equation (51).

The video mixer 1350 may be considered to be blending the two input video images $\hat{F}_i$ and $\hat{F}_{i+1}$ (or $K_i$ and $K_{i+1}$) using wipe-based pattern $w_{i,i+1}$.

An example implementation for producing the wipe pattern of Equation (40) will now be described.

Recall that the wipe pattern of Equation (40) is:

$$w = \begin{cases} w_f & 0 < w_f < 1 \\ 1 & w_f \geq 1 \\ 0 & w_f \leq 0 \end{cases},$$

where $$w_f = (G(\Sigma P)^2 \Delta Z + 1)/2, \quad \text{Equation (54)}$$

and where $$G = \frac{1}{\tau|P_d(P_a + P_b)|}. \quad \text{Equation (55)}$$

The wipe pattern w is constructed based on a difference in depth between two images, which will be referred to as "image A" and "image B". The values of the wipe pattern w range from 0 to 1, where for a given pixel location in the target image, a value of w=0 indicates that the target pixel value at the target pixel location is the pixel value from a composite image A+B (i.e. A layered over B), a value of w=1 indicates that the target pixel value at the target pixel location is the pixel value from composite image B+A (i.e. B layered over A), and values between 0 and 1 introduce "softness" into the target display by having the target pixel value be a combination of the pixel value from composite image A+B and the pixel value from composite image B+A.

Turning now to FIG. 39, there is illustrated an example implementation of a wipe pattern generator 1402 for generating wipe pattern w defined in Equation (40) above. Specifically, for a given pixel location in the target image, the wipe pattern generator 1402 receives as its input the corresponding depth value $\hat{Z}_A$ of image A, the corresponding depth value $\hat{Z}_B$ of image B, a gain value $\hat{Z}_A$ of image A (which corresponds to Equation (55)) computed using the perspective transform parameters of image A), a gain value $G_B$ of image B (which corresponds to Equation (55)) computed using the perspective transform parameters of image B), and perspective parameters values $\Sigma P_A$ and $\Sigma P_B$. The wipe pattern generator 1402 outputs the specific wipe pattern value w for the given pixel location of the target image, as well as depth value $\hat{Z}_X$, gain value $G_X$, and perspective parameter value $\Sigma P_X$. The "X" will be either "A" or "B", depending upon which of image A and B is closest to the viewer (i.e. having the smallest depth magnitude). The depth value $\hat{Z}_X$, gain value $G_X$, and perspective parameter value $\Sigma P_X$ are output since they may be used in subsequent operations performed by other computational circuitry (e.g. subsequent computational layers may use pre-determined gains such $G_A$ or $G_B$, but may also or instead use the previous output gain $G_X$, depending on layer connection structures).

As shown in FIG. 39, the wipe pattern generator 1402 comprises subtractor 1404, comparator 1406, multipliers 1408, 1410, 1412, and 1413, multiplexers 1414, 1416, and 1418, and adder 1420. The subtractor 1404 may be implemented, for example, by digital logic circuitry that subtracts one input from another to produce an output. The comparator 1406 may be implemented, for example, using a digital logic circuitry that compares two input signals and produces one output (e.g. "1") if the two inputs equal each other, and otherwise produces another output (e.g. "0"). Each multiplier may be implemented, for example, by digital logic circuitry that multiplies one input signal with another to produce an output. The adder 1420 may be implemented, for example, by digital logic circuitry that adds one input signal with another to produce an output. The multiplexers may be implemented, for example, using digital logic circuitry to perform a multiplexer function (i.e. select between two input signals based on the value of a selection signal).

In operation, the comparator 1406 compares the depth value $\hat{Z}_A$ of image A and the depth value $\hat{Z}_B$ of image B and the smaller of the two depth values is chosen by multiplexer 1414 and output as depth value $\hat{Z}_X$. Note that these unified depth values are non-negative numbers. Otherwise, the underflow/overflow flag would be "true", indicating an underflow/overflow condition. The signal from the comparator 1406 is also used as the selection signal for multiplexers 1416 and 1418 to respectively select the gain value $G_X$ and perspective parameter value $\Sigma P_X$ corresponding to the image with the smallest magnitude depth. The perspective parameter value $\Sigma P_X$ is multiplied with itself at multiplier 1412 to obtain $(\Sigma P_X)^2$, and then $(\Sigma P_X)^2$ is multiplied with the gain value $G_X$ at multiplier 1410 to obtain $G_X (\Sigma P_X)^2$. The subtractor 1404 subtracts depth value $\hat{Z}_B$ of image B from depth value $\hat{Z}_A$ of image A to obtain a difference in depth $\Delta Z$, and this is multiplied by $G_X (\Sigma P_X)^2$ at multiplier 1408, and the result added to 1 via adder 1420, and then the output of the adder 1420 multiplied by 0.5 at multiplier 1413 to result in Equation (54): $w_f = (G(\Sigma P)^2 \Delta Z + 1)/2$.

The output multiplier 1413, i.e. $w_f$, is then fed to a clipper or truncator 1422, which implements Equation (40), i.e.:

$$w = \begin{cases} w_f & 0 < w_f < 1 \\ 1 & w_f \geq 1 \\ 0 & w_f \leq 0 \end{cases},$$

The clipper 1422 may be implemented, for example, using one or more comparators and/or multiplexers to compare the value $w_f$ to 1 and 0 and output the appropriate value depending upon whether $w_f \leq 0$ or $w_f \geq 0$ or $0 < w_f < 1$.

In the implementation described above with respect to FIG. 39, the gains $G_A$ and $G_B$ are user-controllable (via parameter $\tau$ in Equation (55)) and pre-calculated parameters, refreshed every video field or frame. Also, when more than two video images are being intersected, the preceding or lower layers' parameters, such as depth and perspective parameters may be forwarded to other layers for further blending or mixing. These parameters include the gain value $G_X$, the depth value $\hat{Z}_X$, and the perspective parameter value $\Sigma P_X$.

Turning now to FIG. 40, which includes FIGS. 40A and 40B, there is illustrated an example of a parallel structure to implement multiple wipe-based mixers to perform an intersection of multiple (and more than two) video images. Specifically, a parallel structure to perform an intersection between 16 video images $V_1$ to $V_{16}$ is illustrated in FIG. 40 as an example. As shown in FIG. 40A, there are 4 layers of wipe-based mixers: layer 1, layer 2, layer 3, and layer 4. Layer 1 includes 8 wipe-based mixers 1452, 1454, 1456, 1458, 1460, 1462, 1464, and 1466, each wipe-based mixer receiving a pair of inputs $V_i$ and $V_{i+1}$. Layer 2 includes 4 wipe-based mixers 1468, 1470, 1472, and 1474, each wipe-based mixer receiving as an input the output of each of a pair of adjacent wipe-based mixers in Layer 1. Layer 3 includes 2 wipe-based mixers 1476 and 1478, each wipe-based mixer receiving as an input the output of each of a pair of adjacent wipe-based mixers in Layer 2. Layer 4 includes one wipe-based mixer 1480, which receives as an input the output of each of the wipe-based mixers in Layer 3. In operation, each wipe-based mixer mixes its two input images to generate an output image that is an intersection of the two input images. The structure of each wipe-based mixer is identical, just the inputs are different, and the layered arrangement builds the final output $O_{mix}$ which comprises the intersection of all 16 input images, on a layer by layer basis, each layer intersecting intersected images from the previous layer. Input data from all video layers are arranged in a pre-determined order and then paired to feed into wipe-based mixes in the same order.

Example parallel mix structures are described in U.S. patent application Ser. No. 14/516,596, filed Oct. 17, 2014, entitled "PARALLEL VIDEO EFFECTS, MIX TREES, AND RELATED METHODS", and incorporated herein by reference.

The structure of each wipe-based mixer is described below.

The notation "$V_i$" (i.e. "$V_1$", "$V_2$", ... "$V_{16}$") represent a set of values. Specifically, the notation "$V_i$" represents the output of a perspective transform processing system in FIG. 31. That is, the notation "$V_i$" in FIG. 40 represents the pre-shaped transformed video image $\hat{F}_i$, the associated complementary alpha $\alpha_i^c$, the depth values $\hat{Z}_i$ representing the depth value at each pixel location, and the associated perspective parameters values $\Sigma P_i$ (a set of values, each value corresponding to a respective pixel location in the image).

FIG. 40B illustrates one embodiment of wipe-based mixers 1464, 1466, and 1474, it being understood that the other mixers have the same structure (just different input values). As shown in FIG. 40B, each wipe-based mixer includes the wipe pattern generator 1402 of FIG. 39 and the video mixer 1350 of FIG. 38. For example, consider wipe-based mixer 1466, which is responsible for generating an output key $K_{1,2}$ representing the intersection of images $\hat{F}_1$ and $\hat{F}_2$. The wipe pattern generator 1402 generates the wipe pattern $$w_{1,2} = \begin{cases} w_f & 0 < w_f < 1 \\ 1 & w_f \geq 1 \\ 0 & w_f \leq 0 \end{cases},$$

where $w_f=(G(\Sigma P)^2 \Delta Z+1)/2$, as described above with respect to FIG. 39. The video mixer 1350 then generates $\hat{F}_2\alpha_1^c+\hat{F}_1$ (i.e. Image $\hat{F}_1$ layered on top of $\hat{F}_2$) and $\hat{F}_1\alpha_2^c+\hat{F}_2$ (image $\hat{F}_2$ layered on top of image $\hat{F}_1$), and then applies the wipe pattern $w_{1,2}$ to obtain $K_{1,2}=(\hat{F}_2\alpha_1^c+\hat{F}_1)w_{1,2}^c+(\hat{F}_1\alpha_2^c+\hat{F}_2)w_{1,2}$, as described above with respect to FIG. 38.

The other wipe-based mixers in FIG. 40 operate in the same manner, but with different inputs. Note that the input data of each wipe-based mixer is pre-shaped as per the pre-shaper 1032 of FIG. 37 in this example.

Turning now to FIG. 41, there is illustrated an example of a cascade structure to implement multiple wipe-based mixers to perform an intersection of multiple (and more than two) video images. As shown in FIG. 41, there is a concatenation of n wipe-based mixers. Wipe-based mixers 1502a, 1502b, and 1502c are illustrated in more detail FIG. 41, it being understood that the other wipe-based mixers have the same structure (just different input values). As shown in FIG. 41, each wipe-based mixer includes the wipe pattern generator 1402 of FIG. 39 and the video mixer 1350 of FIG. 38 in this example. The wipe-based mixers of FIG. 41 have the same implementation as the wipe-based mixers of FIG. 40 in this example. The difference between FIGS. 40 and 41 is that FIG. 41 is a cascade implementation. That is, in FIG. 41, during operation, first and second video images $\hat{F}_1$ and $\hat{F}_2$ are subject to wipe-based mixer 1502a to generate an output image $K_{1,2}$ (called "key $K_{1,2}$") representing the intersection of the first and second video images $\hat{F}_1$ and $\hat{F}_2$. The key $K_{1,2}$ and image $\hat{F}_3$ are then subject to wipe-based mixer 1502b to generate key $K_{1:3}$ (i.e. an image representing image $K_{1,2}$ intersected with image $\hat{F}_3$). The key $K_{1:3}$ and image $\hat{F}_4$ are then subject to wipe-based mixer 1502c to generate key $K_{1:4}$, and this cascade process continues until the final image $O_{mix}$ is generated, which represents the intersection of all the input images. Each wipe-based mixer may be considered its own layer, and it will be appreciated that, except for the first wipe-based mixer (i.e. wipe-based mixer 1502a), all following input layers would be pipeline delayed in proper time to match the delay in each wipe-based mixer.

A possible drawback of the cascade implementation of FIG. 41, compared to the parallel implementation of FIG. 40, is that the cascade implementation may result in longer calculation delays due to the chain structure: the more video images to be combined, the longer the delay. On the other hand, in the parallel structure of FIG. 40, this delay may be reduced (relative to the cascade implementation) due to the parallel processing.

Recall that, as discussed earlier with reference to FIGS. 22 to 26, it may be the case that visual mistakes might occur depending upon the order in which the different layers are intersected. This may be addressed in some embodiments by changing the image layer orders on a pixel-by-pixel basis, that is, dynamic reassignment of swap pairs as necessary on a pixel-by-pixel basis. This means sorting the images on a pixel-by-pixel basis in terms of depth. As discussed earlier, any method that sorts a set of values may be implemented to perform such sorting. One example is a merge sort, an example of which was illustrated in FIG. 26.

FIG. 42 illustrates the parallel implementation of FIG. 40 modified to have a sorter 1602 sort the order of the images $V_1$ to $V_{16}$ in terms of depth on a pixel-by-pixel basis. As an example, the sorter 1602 may be the merger sorter of FIG. 26 modified to merge sort sixteen depth values instead of eight. FIG. 43 illustrates the cascade implementation of FIG. 41 modified to have a sorter 1604 sort the order of the images $V_1$ to $V_n$ in terms of depth on a pixel-by-pixel basis. As an example, the sorter 1604 may be the merger sorter of FIG. 26 modified to merge sort n depth values instead of eight.

Results of Experiments

Systems and methods in accordance with embodiments of the present disclosure were tested to perform an intersection effect, and specifically (in one testing example), the intersection of four images. This is discussed below in relation to FIGS. 44 to 46, which are black and white drawings meant to represent actual digital photographs (e.g. of actual simulated results). These drawings are simplified in some aspects compared to the actual photographs. Also, it will be appreciated that similar or different results from those discussed below could be obtained under different simulation conditions and/or actual operating conditions.

FIG. 44 illustrates four images prior to the intersection, respectively labelled Image 1, Image 2, Image 3, and Image 4. These are video images from four respective video channels. The images have each already been subjected to a perspective transform (that has provided manipulations such as rotation and translation).

FIG. 45 illustrates three different wipe patterns generated for the images, specifically:
(1) "Wipe 1,2", which is the wipe pattern for intersecting images 1 and 2. For this particular wipe pattern there is no line of intersection because the image 2 always has a depth that exceeds the depth of image 1 (i.e. image 1 always appears closer to the viewer than image 2).
(2) "Wipe 3,4", which is the wipe pattern for intersecting images 3 and 4.
(3) "Wipe 1:4", which the wipe pattern for intersecting $K_{1,2}$ (i.e. the intersection of images 1 and 2) and $K_{3,4}$ (i.e. the intersection of images 3 and 4).
That is, images 1 and 2 are paired (Wipe 1,2), images 3 and 4 are paired (Wipe 3,4), parallel to images 1 and 2, and then the two pairs are paired for the output.
The wipe patterns are generated based on Equation (40). The black in each wipe pattern in FIG. 45 represents w=0, the white in each wipe pattern in FIG. 45 represents w=1, and values between zero and one (i.e., 0<w<1) are represented by dotted lines (thicker black dots representing a value closer to w=0 and thinner black does representing a value closer to w=1).

As mentioned above, for Wipe 1,2 in FIG. 45, images 1 and 2 do not intersect, as image 1 always has a smaller magnitude depth (i.e. appears closer to the viewer) than image 2.

As can be seen from Wipe 3,4 in FIG. 45, images 3 and 4 intersect, but around the intersection line is a smooth transition due to a uniform tapering of wipe pattern values between 0 and 1 along the intersection line, as shown at 1702.

As can be seen from Wipe 1:4 in FIG. 45, the intersection of all four images also results in uniform tapering of wipe pattern values between 0 and 1 along each intersection line, as shown at 1704.

FIG. 46 illustrates the four images intersected using the wipe based mix. Although not seen in FIG. 46 (since it is not a close-up of the intersection lines), the intersection between each of the images has a smooth transition due to the use of the wipe patterns of FIG. 45.

The implementations above assume a field programmable gate array (FPGA) or application specific integrated circuit (ASIC) implementation in that separate computation circuitry (e.g. adding/multiplication circuitry) is illustrated. In an alternative embodiment, the computations above, such as the computations performed by the perspective transform processing systems 1002a to 1002n and the intersection effect system 1004 may instead be performed by a general processor having the relevant parameters stored in memory and instructions stored in memory that, when executed, cause the processor to perform the computations. An example of such a computational device (e.g. a computer) is illustrated in FIG. 47. As shown in FIG. 47, computational device 1802 includes a memory 1804, and a processor 1806. The computational device 1802 may include other components, such as a user interface, data buses, etc., which have been omitted for clarity. The memory 1804 stores the received video images and parameter values for each video image corresponding to the specific effect being applied to the video image (e.g. the specific values of $T_a$, $T_b$, $T_c$, $T_d$, $T_e$, $T_f$, $T_g$, $T_h$, $P_a$, $P_b$, $P_c$, $P_d$, and f for each video image). The processor 1806 performs the computations to perform the perspective transformations and generate an output image displaying the intersection effect in the manner described above. For example, the processor 1806 may perform the equivalent of the computations performed by the perspective transform engine 1024, the shaping alpha generator 1030, the pre-shaper 1032, the video mixer 1350, and the wipe pattern generator 1402 described earlier with respect to FIGS. 32 to 39. The processor 1806 may be, for example, a central processing unit (CPU), a graphics processing unit (GPU), or general-purpose computing on graphics processing units (GPGPU).

A possible benefit of a field programmable gate array (FPGA) or application specific integrated circuit (ASIC) implementation is that it may execute the computations faster, making it more desirable for real-time processing, such as when producing a live video (live production). The general processor implementation shown in FIG. 47 is perhaps better suited for non-real-time video post-production (i.e. not live video production).

In the embodiments described above, it is assumed that the images are digital video images, e.g., each image a field or frame of digital video, where the digital video comprises a series of digital images displayed in rapid succession. In such embodiments, the intersection effect described above may, for example, be a DVE device feature in a DVE device embedded in a production switcher in a video application. However, the methods above may also be applied to a non-video environment. Specifically, in a non-video environment, one could perform the methods above with digital images (e.g. digital pictures) to perform an intersection effect for two or more digital images. This may be useful, for example, in a computer graphics application.

CONCLUSION

Various embodiments have been described above, including embodiments in which an intersection effect is created using a wipe-based mix. Since the intersection effect is created using the wipe-based mix in the manner described above, it may meet the "strong rule of seamless switching" discussed above and therefore be considered to be a high quality intersection effect. In some embodiments, a depth difference based wipe pattern that aims to provide uniform softness along an intersection line to achieve anti-alias effects is also described. In some embodiments, a video mixer and a wipe pattern generator are disclosed for performing the intersection effect. In some embodiments, additional system components are disclosed, such as a perspective transform engine, an alpha shaping generator (which may produce an anti-alias shaping alpha), and a pre-shaper. In some embodiments, different implementation structures for performing the intersection effect among multiple video layers are disclosed, including a parallel structure (with or without pixel-by-pixel depth based sorting for dynamic pairing of video layers to try to eliminate potential visual mistakes), and a cascade structure (with or without pixel-by-pixel depth based sorting for dynamic pairing of video layers to try to eliminate potential visual mistakes).

In some embodiments described above, the general layering process for multiple video sources and the rule of seamless switching are discussed and used as a starting point, and a wipe-based mix for intersection effect is derived, and then softness is introduced into a wipe pattern to mix intersected video layers. The wipe pattern of such embodiments is based upon depth differences, but dynamically modulated (i.e. scaled) by parameters from perspective transforms. In some embodiments, the wipe pattern(s) is/are constructed using image depth difference, and the wipe pattern(s) is applied to multiple video layers for a general wipe transition.

In some embodiments, a wipe-based mix between two video layers is provided that may meet the "strong rule of seamless switching" discussed above. The two video layers may each have an alpha component or channel for transparency (e.g. an "associated alpha"), as discussed earlier. A wipe pattern is also provided to mix the two layers in a way that may provide uniform softness (or "fuzziness") along an intersection line on the target display screen. The wipe pattern may be produced from a depth difference between two video layers, the depth difference modified (or scaled or modulated) by perspective data dynamically, as described above.

In some embodiments, a parallel or cascade structure is disclosed to connect multiple wipe-based mixes. A dynamic pairing function may sort depths from all video layers in order (e.g. descending order). The sorting may be on a pixel-by-pixel basis and may be any effective sorting method. Merge sort, described earlier, is only one possible sorting function.

In some embodiments, the system for producing the intersection effect receives as data inputs perspective data parameters and depth data (computed as part of the perspective transformation), shaping alpha data, video data that was subject to the 3D manipulation (e.g. from an interpolation function in a perspective transform engine), and associated alpha data subject to the 3D manipulation (e.g. from an interpolation function in a perspective transform engine).

In some embodiments, the wipe-based mix circuitry may include a video path, which has as an input two video data paths plus a wipe pattern, and has as an output a composite of video data (e.g. video processing path 1352 in FIG. 38). The video data inputs may be from pre-shaped video sources or from earlier outputs of previous composite video data. The pre-shaped video sources may be re-shaped by shaping alphas. In some embodiments, the wipe-based mix circuitry may further include an alpha path having as an input two alpha data paths and outputting a complementary composite alpha (e.g. alpha processing path 1351 in FIG. 38). The two input alpha data paths may be from pre-shaped associated alpha sources or from earlier outputs of previous composite alpha values. The pre-shaped associated alpha sources may be re-shaped by shaping alphas.

In some embodiments, the circuitry for computing the wipe pattern may include two groups of inputs, each input including a perspective data parameter ΣP, pre-shaped depth value $\hat{z}$, and gain parameter G (e.g. FIG. 39). The circuitry may further include a selection signal based on/produced by the depth difference and multiplexers that use the selection signal to switch between two groups of data (e.g. FIG. 39). The circuitry may further include a multiplier (e.g. multiplier 1410) for multiplying a selected gain with a selected squared perspective data ($\Sigma P^2$). The circuitry may output a selected group. The pre-shaped input depth may be re-shaped by a shaping alpha ahead of wipe pattern generation.

In some embodiments, the gain parameter G may be computed using parameters in a homogeneous matrix that are determined by a homogeneous matrix (e.g. parameters from Equation (7)) and a user-controllable parameter (e.g. Σ) to achieve a visual effect.

As described above with respect to FIG. 19, in one embodiment there is provided a method of intersecting a first digital image and a second digital image, which includes: mixing the first digital image and the second digital image to produce a first composite image in which the first digital image is layered on top of the second digital image; mixing the first digital image and the second digital image to produce a second composite image in which the second digital image is layered on top of the first digital image; and mixing the first composite image and the second composite image using a wipe pattern to produce a target digital image comprising the intersection of the first digital image and the second digital image. The wipe pattern is a function of a difference in depth between the first digital image and the second digital image.

With regard to FIG. 48, there is illustrated an apparatus 2002 to intersect a first digital image and a second digital image. The apparatus 2002 comprises a first mixer 2004 to mix the first digital image and the second digital image to produce a first composite image in which the first digital image is layered on top of the second digital image. The apparatus 2002 further comprises a second mixer 2006 to mix the first digital image and the second digital image to produce a second composite image in which the second digital image is layered on top of the first digital image. The apparatus 2002 further comprises a third mixer 2008 to mix the first composite image and the second composite image using a wipe pattern to produce a target digital image comprising the intersection of the first digital image and the second digital image. The apparatus 2002 further comprises a wipe pattern generator 2010 to generate the wipe pattern as a function of a difference in depth between the first digital image and the second digital image. Although the first mixer 2004, second mixer 2006, and third mixer 2008 are shown as separate blocks in FIG. 48, they may instead be a single circuit or set of circuitry (e.g. as in FIG. 18). Similarly, in some embodiments, the wipe pattern generator 2010 may be part of the same circuitry used to implement the first, second, and third mixers. In general, a mixer may include at least one multiplier to multiply a complementary alpha value with one video layer, as well as at least one adder to add a second video layer value.

Although the foregoing has been described with reference to certain specific embodiments, various modifications thereof will be apparent to those skilled in the art without departing from the scope of the claims appended hereto.

The invention claimed is:

1. A method of intersecting a first digital image and a second digital image, the method comprising:
   mixing the first digital image and the second digital image to produce a first composite image in which the first digital image is layered on top of the second digital image;
   mixing the first digital image and the second digital image to produce a second composite image in which the second digital image is layered on top of the first digital image;
   mixing the first composite image and the second composite image using a wipe pattern to produce a target digital image comprising the intersection of the first digital image and the second digital image;
   wherein the wipe pattern is a function of a difference in depth between the first digital image and the second digital image.

2. The method of claim 1, wherein the wipe pattern comprises a set of values, the set of values comprising one value for each pixel location of a plurality of pixel locations in the target digital image, and wherein for a pixel location of the plurality of pixel locations in the target digital image, the wipe pattern has a value that is a function of a difference between a depth value associated with the first digital image at the pixel location and a depth value associated with the second digital image at the pixel location.

3. The method of claim 2, wherein said mixing the first composite image and the second composite image using the wipe pattern comprises:
   computing the difference between the depth value associated with the first digital image at the pixel location and the depth value associated with the second digital image at the pixel location to obtain a depth difference value; and
   as a function of the depth difference value, setting a pixel value of the target digital image at the pixel location as: a pixel value of the first composite image at the pixel location, or a pixel value of the second composite image at the pixel location, or a combination of the pixel value of the first composite image at the pixel location and the pixel value of the second composite image at the pixel location.

4. The method of claim 3, comprising providing a uniform softness around an intersection line in the target digital image by performing operations including:
   modifying the depth difference value to obtain a wipe pattern value $w_f$, the depth difference value being modified based on at least the pixel location and at least some parameters defining a perspective transformation of an original source image; and
   setting the pixel value of the target digital image at the pixel location, the pixel value being set as the pixel value of the first composite image at the pixel location where $w_f$ is greater than a first threshold, the pixel value being set as the pixel value of the second composite image at the pixel location where $w_f$ is less than a second threshold, and the pixel value otherwise being set as the combination of the pixel value of the first composite image at the pixel location and the pixel value of the second composite image at the pixel location.

5. The method of claim 4, wherein modifying the depth difference value to obtain the wipe pattern value $w_f$ comprises multiplying the depth difference value by: (i) a gain value dependent upon at least some parameters defining the perspective transformation, and (ii) another value dependent upon at least the target image coordinate values $x_t$ and $y_t$ of the pixel location and at least some parameters defining the perspective transformation.

6. The method of claim 2, wherein at least one of the depth value associated with the first digital image at the pixel location and the depth value associated with the second digital image at the pixel location is computed using: (i) at least some parameter values that define a transformation of an original source image, and (ii) the target image coordinate values $x_t$ and $y_t$ of the pixel location.

7. The method of claim 1, further comprising intersecting the target digital image with a third digital image by:
   mixing the target digital image and the third digital image to produce a third composite image in which the third digital image is layered on top of the target digital image;
   mixing the target digital image and the third digital image to produce a fourth composite image in which the target digital image is layered on top of the third digital image;
   mixing the third composite image and the fourth composite image using another wipe pattern that is a function of a difference in depth between the target digital image and the third digital image.

8. The method of claim 7, wherein the third digital image represents the intersection of further digital images.

9. The method of claim 1, further comprising intersecting a plurality of digital images by performing operations including intersecting the target digital image with another input digital image to obtain an output digital image and then further intersecting the output digital image with a further input digital image.

10. An apparatus to intersect a first digital image and a second digital image, the apparatus comprising:
   a first mixer to mix the first digital image and the second digital image to produce a first composite image in which the first digital image is layered on top of the second digital image;
   a second mixer to mix the first digital image and the second digital image to produce a second composite image in which the second digital image is layered on top of the first digital image;
   a third mixer to mix the first composite image and the second composite image using a wipe pattern to produce a target digital image comprising the intersection of the first digital image and the second digital image;
   a wipe pattern generator to generate the wipe pattern as a function of a difference in depth between the first digital image and the second digital image.

11. The apparatus of claim 10, wherein the first mixer, the second mixer, the third mixer, and the wipe pattern generator are implemented by one or more integrated circuits; wherein said one or more integrated circuits comprise at least one of a field-programmable gate array (FPGA) and an application-specific integrated circuit (ASIC).

12. The apparatus of claim 10, wherein the wipe pattern comprises a set of values, the set of values comprising one value for each pixel location of a plurality of pixel locations in the target digital image, and wherein for a pixel location of the plurality of pixel locations in the target digital image, the wipe pattern has a value that is a function of a difference between a depth value associated with the first digital image at the pixel location and a depth value associated with the second digital image at the pixel location.

13. The apparatus of claim 12, wherein the apparatus comprises circuitry to:
   compute the difference between the depth value associated with the first digital image at the pixel location and the depth value associated with the second digital image at the pixel location to obtain a depth difference value; and
   as a function of the depth difference value, set a pixel value of the target digital image at the pixel location as: a pixel value of the first composite image at the pixel location, or a pixel value of the second composite image at the pixel location, or a combination of the pixel value of the first composite image at the pixel location and the pixel value of the second composite image at the pixel location.

14. The apparatus of claim 13, wherein the apparatus comprises circuitry to provide a uniform softness around an intersection line in the target digital image by:
   modifying the depth difference value to obtain a wipe pattern value $w_f$, the depth difference value being modified based on at least the pixel location and at least some parameters defining a perspective transformation of an original source image; and
   setting the pixel value of the target digital image at the pixel location, the pixel value being set as the pixel value of the first composite image at the pixel location where $w_f$ is greater than a first threshold, the pixel value being set as the pixel value of the second composite image at the pixel location where $w_f$ is less than a second threshold, and the pixel value otherwise being set as the combination of the pixel value of the first composite image at the pixel location and the pixel value of the second composite image at the pixel location.

15. The apparatus of claim 14, comprising a multiplier to modify the depth difference value to obtain the wipe pattern value $w_f$ by multiplying the depth difference value by: (i) a gain value dependent upon at least some parameters defining the perspective transformation, and (ii) another value dependent upon at least the target image coordinate values $x_t$ and $y_t$ of the pixel location and at least some parameters defining the perspective transformation.

16. The apparatus of claim 12, comprising circuitry to compute at least one of the depth value associated with the first digital image at the pixel location and the depth value associated with the second digital image at the pixel location using: (i) at least some parameter values that define a transformation of an original source image, and (ii) the target image coordinate values $x_t$ and $y_t$ of the pixel location.

17. The apparatus of claim 10, further comprising:
   a fourth mixer to mix the target digital image and a third digital image to produce a third composite image in which the third digital image is layered on top of the target digital image;
   a fifth mixer to mix the target digital image and the third digital image to produce a fourth composite image in which the target digital image is layered on top of the third digital image;
   a sixth mixer to intersect the target digital image with the third digital image by mixing the third composite image and the fourth composite image using another wipe pattern that is a function of a difference in depth between the target digital image and the third digital image.

18. The apparatus of claim 17, wherein the third digital image represents the intersection of further digital images.

19. An apparatus to intersect more than two digital images, the apparatus comprising a plurality of identical computation circuitry, each one of the plurality of identical computational circuitry comprising the apparatus of claim 10 to receive as an input a pair of input digital images and to produce as an output a target digital image comprising the intersection of the pair of input digital images;

wherein the plurality of identical computational circuitry are arranged so that an output target digital image of one of said plurality of identical computational circuitry is used as an input digital image of another of said plurality of identical computational circuitry.

20. The method of claim 19, wherein two of said plurality of identical computational circuitry are arranged in parallel to each other, the output of each of said two of said plurality of identical computational circuitry fed to an input of another of said plurality of identical computational circuitry.

\* \* \* \* \*